United States Patent [19]

Fosdick

[11] 4,370,709

[45] Jan. 25, 1983

[54] COMPUTER EMULATOR WITH THREE SEGMENT MICROCODE MEMORY AND TWO SEPARATE MICROCONTROLLERS FOR OPERAND DERIVATION AND EXECUTION PHASES

[75] Inventor: Robert E. Fosdick, Austin, Tex.

[73] Assignee: Tracor, Inc., Austin, Tex.

[21] Appl. No.: 174,721

[22] Filed: Aug. 1, 1980

[51] Int. Cl.[3] .......................... G06F 9/44; G06F 9/22; G06F 9/46
[52] U.S. Cl. ................................... 364/200; 364/578
[58] Field of Search ... 364/200 MS File, 900 MS File, 364/578

[56] References Cited

U.S. PATENT DOCUMENTS

| | | | |
|---|---|---|---|
| 3,544,969 | 12/1970 | Rakoczi et al. | 364/200 |
| 3,651,482 | 3/1972 | Benson et al. | 364/200 |
| 3,760,365 | 9/1973 | Kurtzberg et al. | 364/200 |
| 3,766,532 | 10/1973 | Liebel, Jr. | 364/200 |
| 3,766,533 | 10/1973 | Black et al. | 364/200 |
| 3,955,180 | 5/1976 | Hirtle | 364/200 |
| 4,041,461 | 9/1977 | Kratz | 364/200 |
| 4,096,467 | 6/1978 | Millard et al. | 364/200 |
| 4,156,903 | 5/1979 | Barton et al. | 364/200 |
| 4,167,781 | 9/1979 | Beccia et al. | 364/200 |
| 4,199,811 | 4/1980 | Borgerson et al. | 364/200 |
| 4,266,281 | 5/1981 | Struger et al. | 364/900 |
| 4,313,161 | 1/1982 | Hardin et al. | 364/200 |
| 4,325,116 | 4/1982 | Kranz et al. | 364/200 |

OTHER PUBLICATIONS

R. E. Fosdick, *Technical Proposal for CMOS/SOS Standard Computer Emulation*, Apr. 14, 1978.

R. Fosdick, *CMOS/SOS Standard Computer Emulation*, Sep., 1978.

N. Tinkelpaugh & R. E. Conklin, *A Radiation Hardened Microprocessor Circuit Set and Its Application*, May, 1979.

R. Fosdick, *CMOS/SOS Standard Computer Simulation AN/UKY-20 Emulator*, Design Report-8/79, Final Design Report-2/80.

*Primary Examiner*—James D. Thomas
*Assistant Examiner*—Archie E. Williams, Jr.
*Attorney, Agent, or Firm*—Arnold, White & Durkee

[57] ABSTRACT

A microcoded central processing unit (CPU) is used to emulate the macroinstructions of a target computer. Each macroinstruction emulated is divided into two phases, an operand derivation or classification phase and an instruction execution phase. A microcontroller is provided to control each of the two separate phases. The two microcontrollers operate in parallel and simultaneously in performing their respective operations. The two microcontrollers are synchronized together so that when one microcontroller needs access to CPU resources that are currently under control of the opposite controller, the requesting microcontroller is put to sleep until the needed resource comes available before it continues its operations. Microcode is minimized by sectionalizing the micromemory such that certain microcode can be shared by both microcontrollers where common microcode is needed to emulate different macroinstructions. A three section micromemory is provided with the right section normally associated with the operand derivation, the left section associated with the instruction execution, and the middle micromemory available to either microcontroller. Either microcontroller may specify the address of any one of the three sections in micromemory. As a result of the manner in which the middle memory is shared by the microcontrollers, when a phase requires resources controlled by the commonly used microcode, those resources can be obtained without necessarily having to stop the operation of the other microcontroller. Throughput of the emulator is thereby increased.

The emulator also includes an interrupt unit for handing a priority system of peripheral interrupt requests.

7 Claims, 25 Drawing Figures

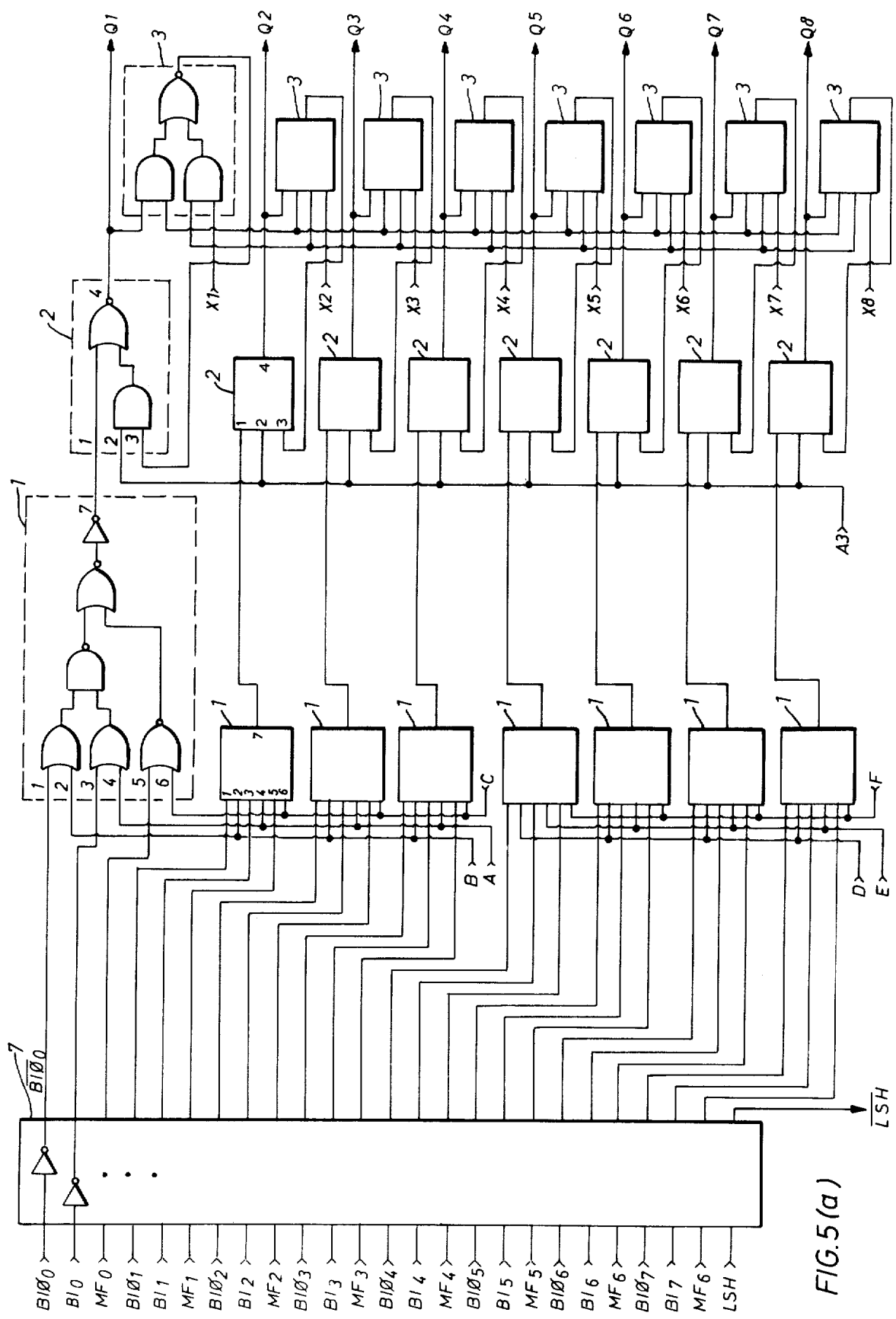

FIG. 6

| TYPE | BIT 15 14 13 12 | 11 | 10 9 | 8 7 6 5 4 | 3 2 1 0 |
|---|---|---|---|---|---|
| RR RI TYPE 2 RL | 0 | | f | a | m |
| RI TYPE 1 | o | | 01 x | D | |
| RK RX | 0 | | f | a | m |
| | y | | | | |

DEFINITION OF FIELDS

- o  OPERATION (FUNCTION) CODE
- f  FORMAT DESIGNATOR
  - 00 = FORMAT RR, REGISTER TO REGISTER OR RL-1 FORMAT
  - 01 = FORMAT RI, REGISTER INDIRECT MEMORY OR RL-2 FORMAT
  - 10 = FORMAT RK, REGISTER LITERAL CONSTANT OR RL-3 FORMAT
  - 11 = FORMAT RX, REGISTER INDEXED ADDRESS, CONSTANT OR RL-4 FORMAT
- a  GENERAL REGISTER OR SUBFUNCTION DESIGNATOR
- m  GENERAL REGISTER OR SUBFUNCTION DESIGNATOR
     4 BIT UNSIGNED LITERAL CONSTANT IN RL FORMAT
- xD SIGNED DEVIATION VALUE (TWO'S COMPLEMENT)
- y  ADDRESS OR ARITHMETIC CONSTANT

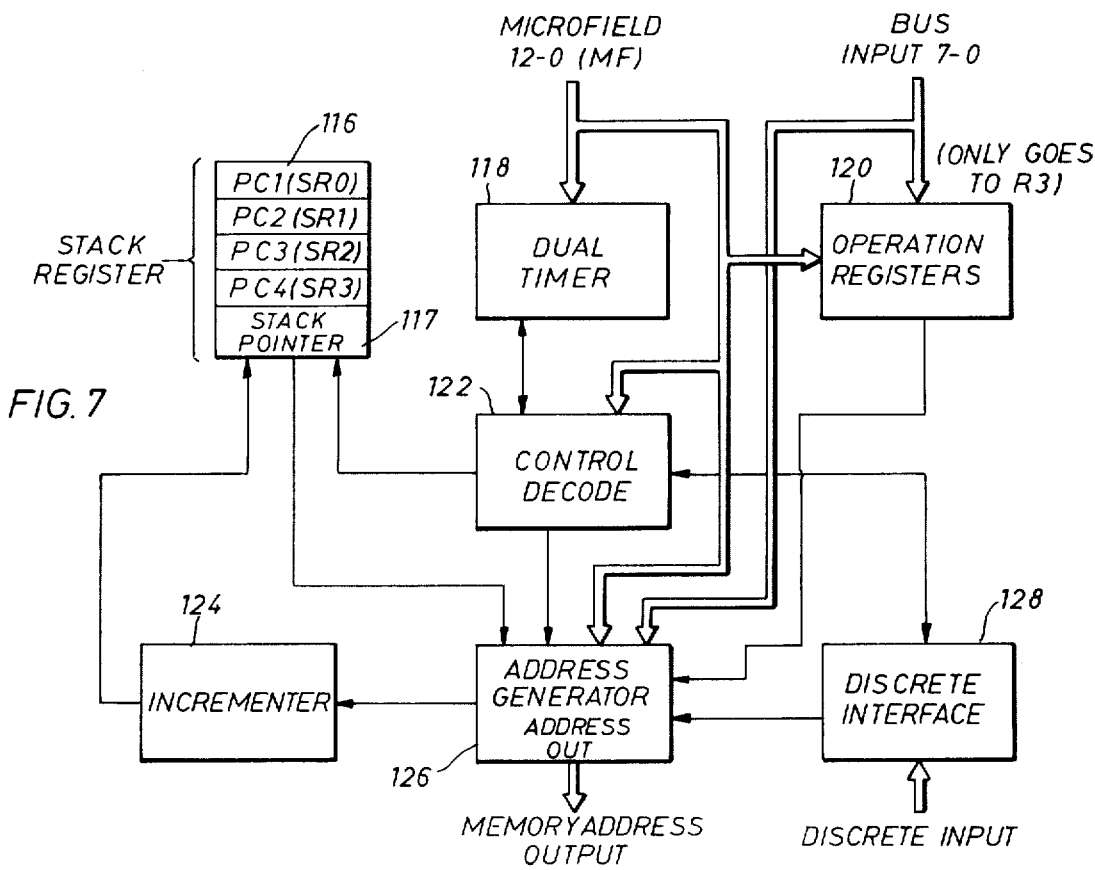

FIG. 7

COMPUTER EMULATOR WITH THREE SEGMENT MICROCODE MEMORY AND TWO SEPARATE MICROCONTROLLERS FOR OPERAND DERIVATION AND EXECUTION PHASES

TABLE OF CONTENTS

BACKGROUND OF THE INVENTION
SUMMARY OF THE INVENTION
BRIEF DESCRIPTION OF THE DRAWINGS
DETAILED DESCRIPTION OF THE PREFERRED EMBODIMENT

- A Block Diagram of the Computer Emulator Architecture
- The General Processor Unit
- The Register Select Unit
- The Microcontroller Unit
- The Bus Interface Unit
- The Address Selection Unit
- The Interrupt Unit
- The Microcode
- The Op-Code Transform ROM
- A Microinstruction Emulation Example

CLAIMS

BACKGROUND OF THE INVENTION

This invention relates to computers. More particularly, the invention relates to a microcoded computer design which executes the instruction set of another computer, otherwise known as a computer emulator.

Every computer has an instruction set which the computer is designed to execute. While the hardware cost to purchase these computers involve an expenditure of money, this initial hardware cost is small in comparison to the cost of producing the computer programs that are run on the computer. For this reason, new applications requiring the use of a computer would best be served economically if the computer selected could execute computer programs already written. Unfortunately, some of these new applications require a computer that is not available. Such requirements as low power consumption, small size, radiation harden circuits, and severe environment operating conditions, along with the ability to execute these pre-written computer programs, make it impossible for existing designs to be acceptable. Usually, the manufacturer of the computer for these already existing usable application programs does not offer a model of computer which meets these requirements.

To solve the problem of supplying a new computer which is able to meet these stringent specification requirements, such as the low power, small size, etc., and at the same time execute the instruction set of an already existing computer design, a new type of computer has evolved—computer emulators. A computer emulator is a special type of computer which uses microcoded instructions in firmware to control its internal circuits in response to the macroinstructions of another computer to achieve the same external results as the macroinstructions achieve in its own computer, and do so without a substantial reduction in program execution time. To the macroinstruction of the other computer, the computer emulator looks the same as its own computer, even though the internal circuit structure of the computer emulator may be entirely different than that for the other computer.

Prior-art computer emulators have used microcoded firmware routines to carry out the instructions of another computer. A mapping ROM is used to map each macroinstruction into one of these microcoded firmware routines that will emulate the macroinstruction. For this design approach, there is much duplication of microcode. This duplication results in an increase in power consumption due to the increase in the dize of the micromemory required to store the microcode. The complexity of the instruction set further controls the size of micromemory, the more complex the instruction set, the larger the memory size and resulting power consumption.

A further problem present in prior-art emulators is the throughput rate of each macroinstruction. The emulator should not significantly reduce the time required to execute each macroinstruction from the normal time for that same macroinstruction to run on its own machine. Because these prior-art emulators executed each macroinstruction, including operand derivation and instruction execution, in a sequential fashion, extra microcycles must be used where the operand deviation phase of the emulation results in more data being required from memory before the execution phase of the instruction can proceed. These extra macrocycles tend to decrease throughput rate of the emulator.

Accordingly, it would be advantageous to provide a low-power, ruggedized computer emulator capable of executing the instruction set of another computer without a significant reduction in macroinstruction emulation time by providing dual microcontrollers operating in parallel to respectively handle the operand derivation phase and the instruction execution phase of each macroinstruction. It would also be advantageous to provide a sectionalized micromemory for storing the microcode routines so that the same microcode used by various macroinstructions need not be duplicated for each macroinstruction, but is available to both microcontrollers on a need to have basis.

SUMMARY OF THE INVENTION

In accordance with the present invention, a microcoded central processing unit for emulating the macroinstructions of another computer is disclosed. Each macroinstruction emulation is divided into two phases, the operand address derivation phase and the instruction execution phase. Both phases of the macroinstruction emulation occur simultaneously and in parallel to the extent that it is possible. Where a computer resource is required in both phases at the same time, one phase must pause and wait until that resource become available, and sometimes, one phase must wait until the other phase has completed its operations before it can begin its own operations.

The central processing unit of the present invention includes a micromemory comprising a plurality of micromemory units including at least a right, a middle, and a left micromemory unit. The micromemory has an address space in which the microcoded instructions are stored. Each micromemory unit is separately addressed. Controlling the operand address derivation phase and the instruction execution phase of each macroinstruction emulation is a first and a second microcontroller, respectively.

The first microcontroller is associated with the right micromemory unit and responds to the microcode stored therein for generating the micromemory address of the next microcoded instruction to be outputted from said right micromemory unit. The second microcontroller is associated with the left micromemory unit and responds to the microcode stored therein for generating the micromemory address of the next coded instruction to be outputted from the left micromemory unit. The micromemory address that is generated by either the first or the second microcontroller may be used to address not only its associated micromemory unit but also, each additional micromemory unit in the micromemory. This includes the middle micromemory unit and the micromemory associated with the other microcontroller.

Further included in the present invention is a plurality of address selection units, with each address selection unit associated with one of the plurality of micromemory units comprising the micromemory. Each address selection unit temporarily stores and outputs to its associated micromemory unit a micromemory address from a selected one of the microcontrollers. Each address selection unit generates clocking signals to the CPU resources controlled by the microcode stored in its associated micromemory unit. Each address selection unit receives the micromemory address generated by both the first and the second microcontrollers.

An op-code mapping means is provided for mapping each macroinstruction into the micromemory address space at the starting addresses of the microcoded routines which will control the operand address derivation and the instruction execution phases for each macroinstruction emulation. A bus interface means is provided for coupling the main memory and the peripherals of the computer system to the CPU, and for carrying out selected internal data bus transfers between the various functional blocks that comprise the computer architecture.

Associated with the first and second microcontrollers are first and second processing units, respectively. The processing units respond to the bus interface means and to the microcode to perform logical operation on the digital data of the CPU whereby the emulation of the macroinstructions are achieved. Each processing unit includes an artithmetic logic unit. During the emulation of each macroinstruction, the right and left microcontrollers operate concurrently and in parallel so that the operand address derivation and the execution of each macroinstruction can proceed at the same time. During the emulation of each macroinstruction, selected ones of the address selection units will be inhibited for a period of time from generating their clocking signals when the microcode from a micromemory unit requests CPU resources controlled by another micromemory unit and those resources are not then available for use by the requesting microcode.

The present invention further includes an interrupt unit for handling a priority system of peripheral interrupt requests.

A BRIEF DESCRIPTION OF THE DRAWINGS

A computer emulator for executing the macroinstructions of another computer constructed in accordance with the preferred embodiment of the invention is illustrated in the accompanying drawings in which, FIG. 1 is a block diagram of the computer emulator architecture;

Figure 1:
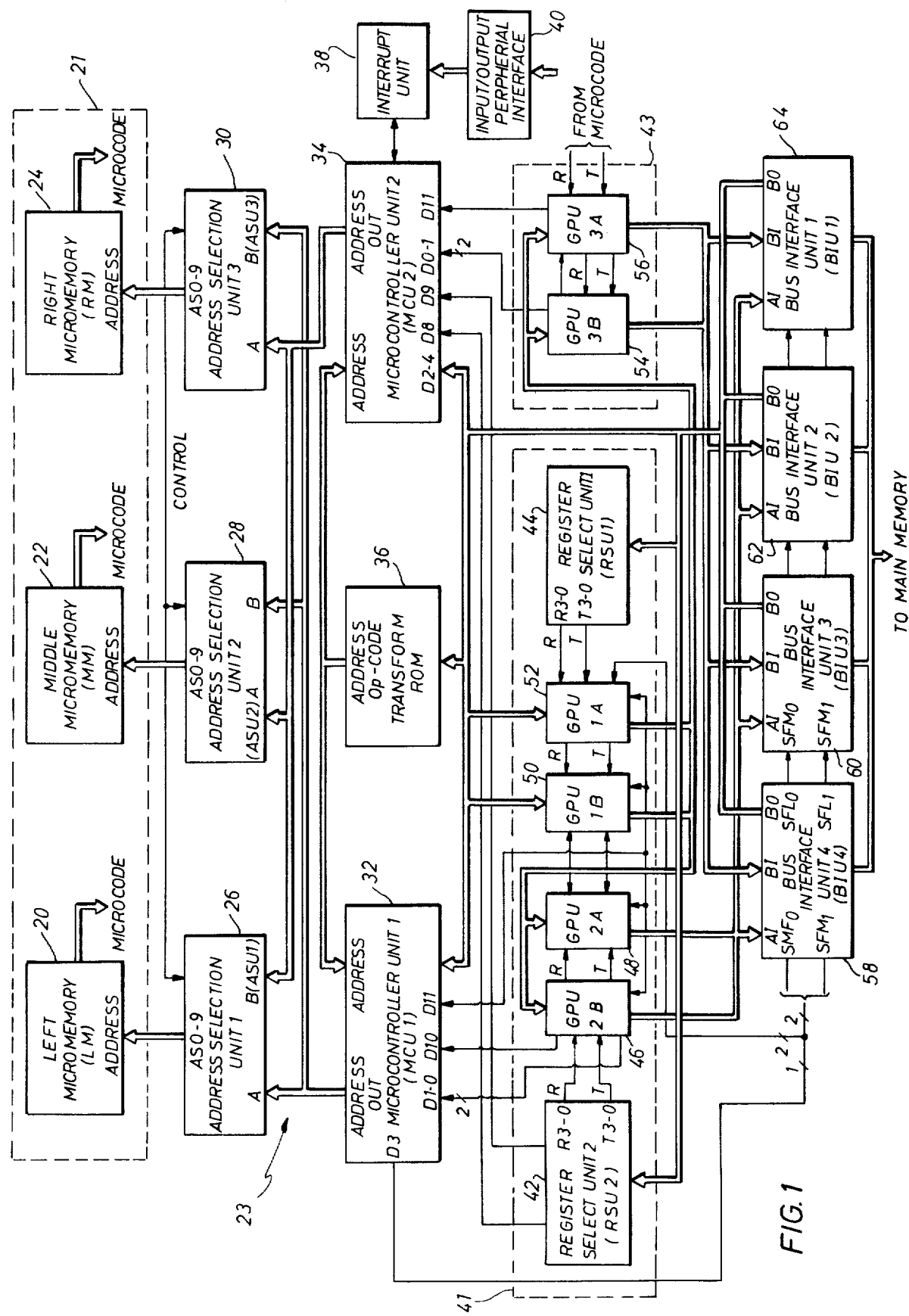
Figure 4:
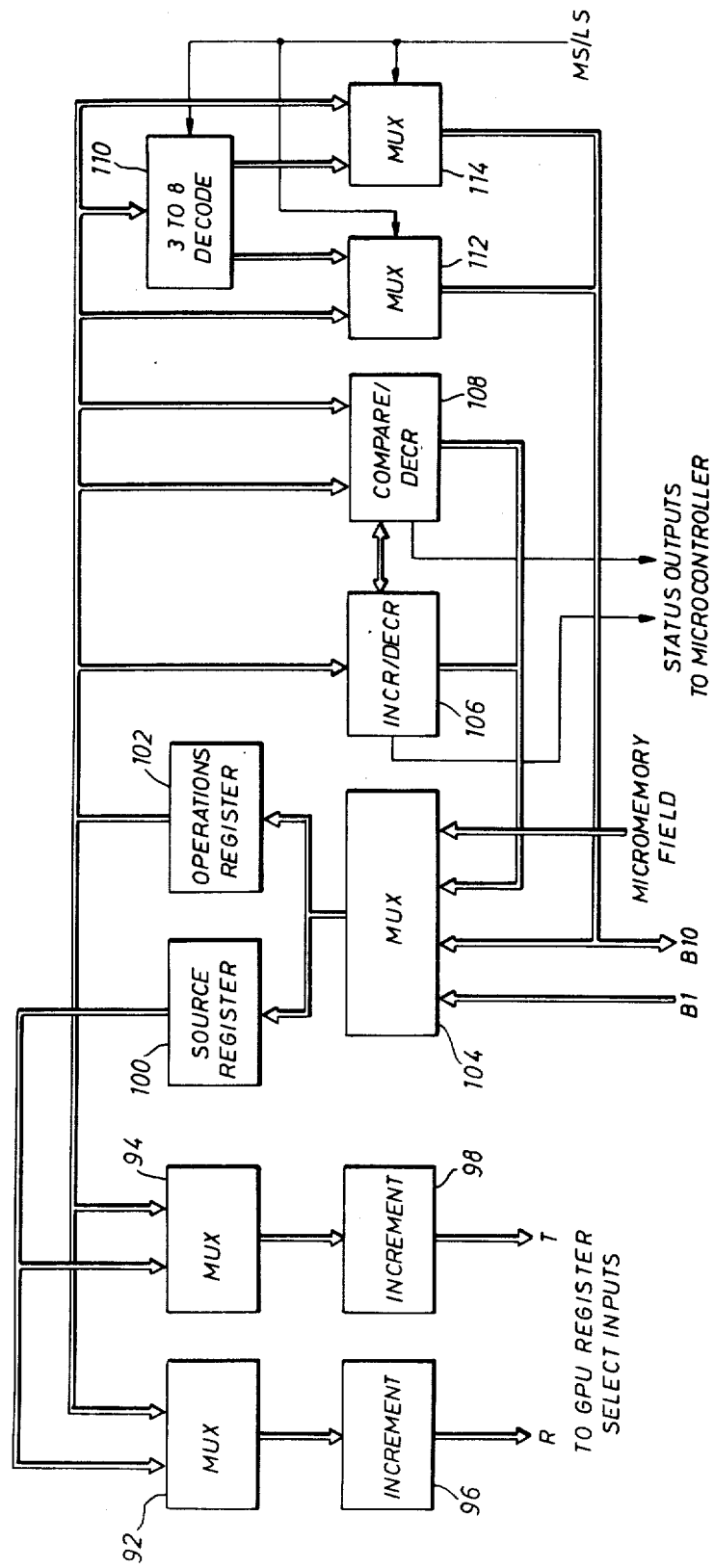
FIG. 4 is a functional block diagram of a typical register select units shown in FIG. 1.
Figure 5B:
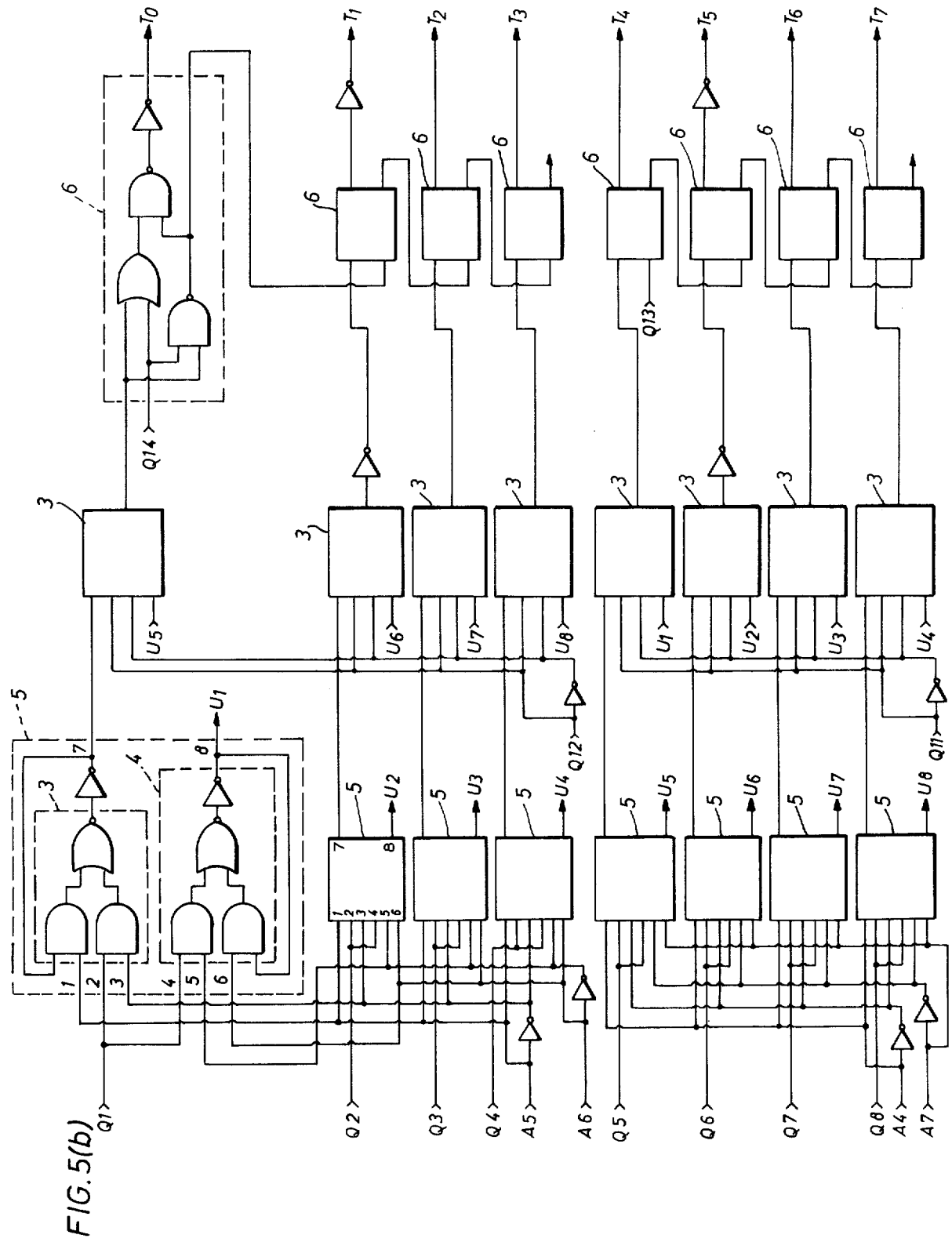
Figure 5C:
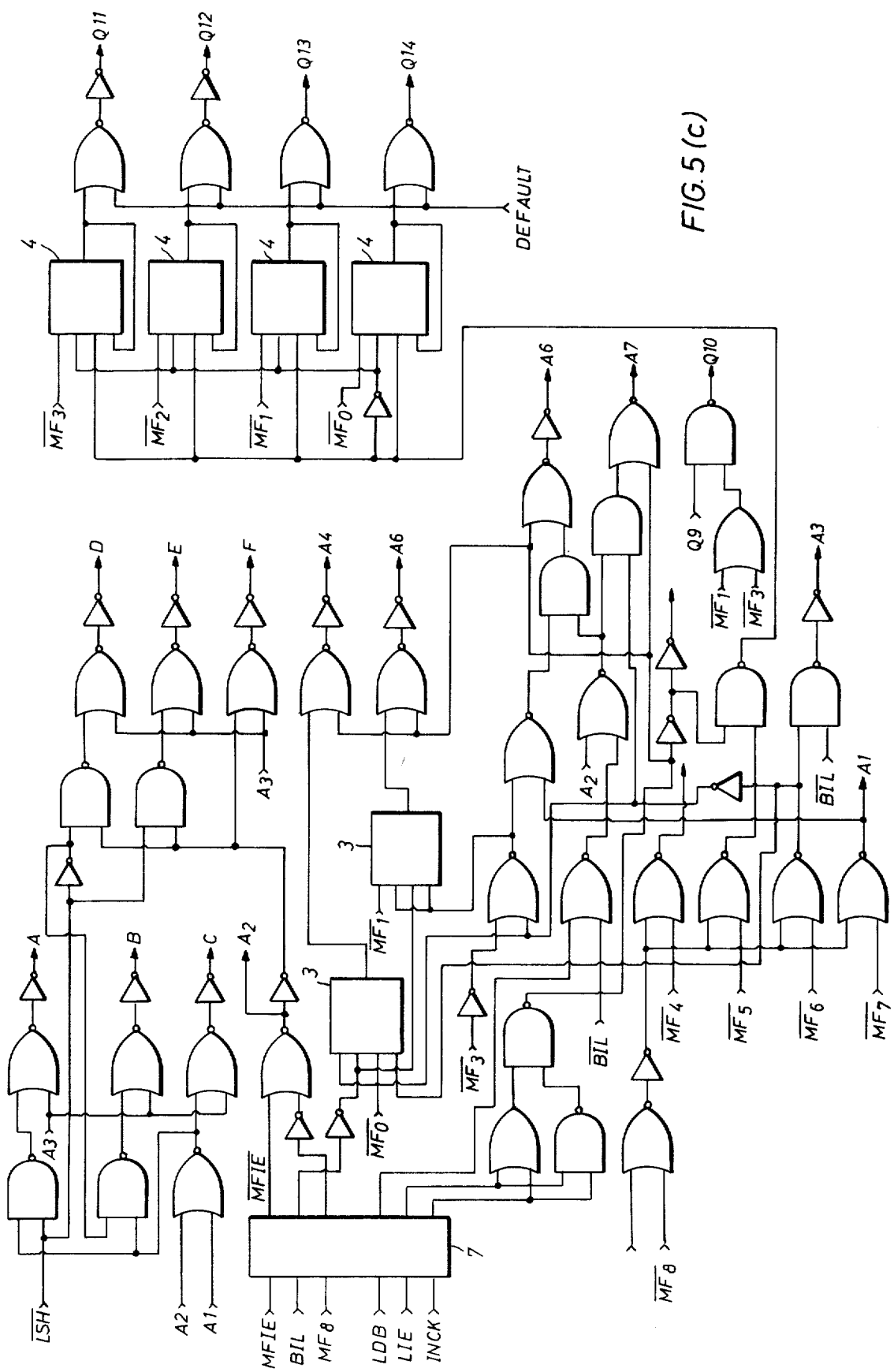
Figure 5D:
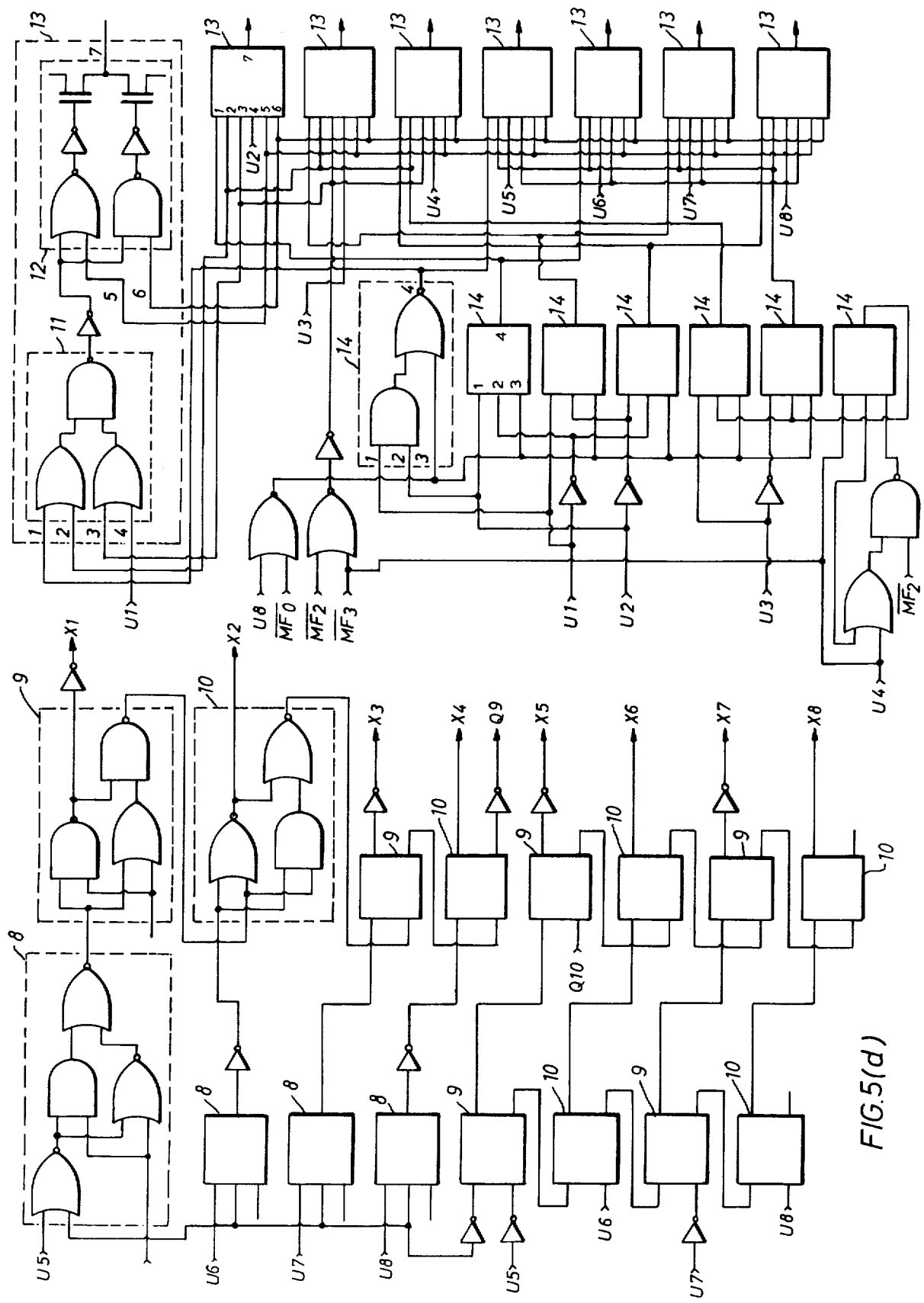
Figure 8:
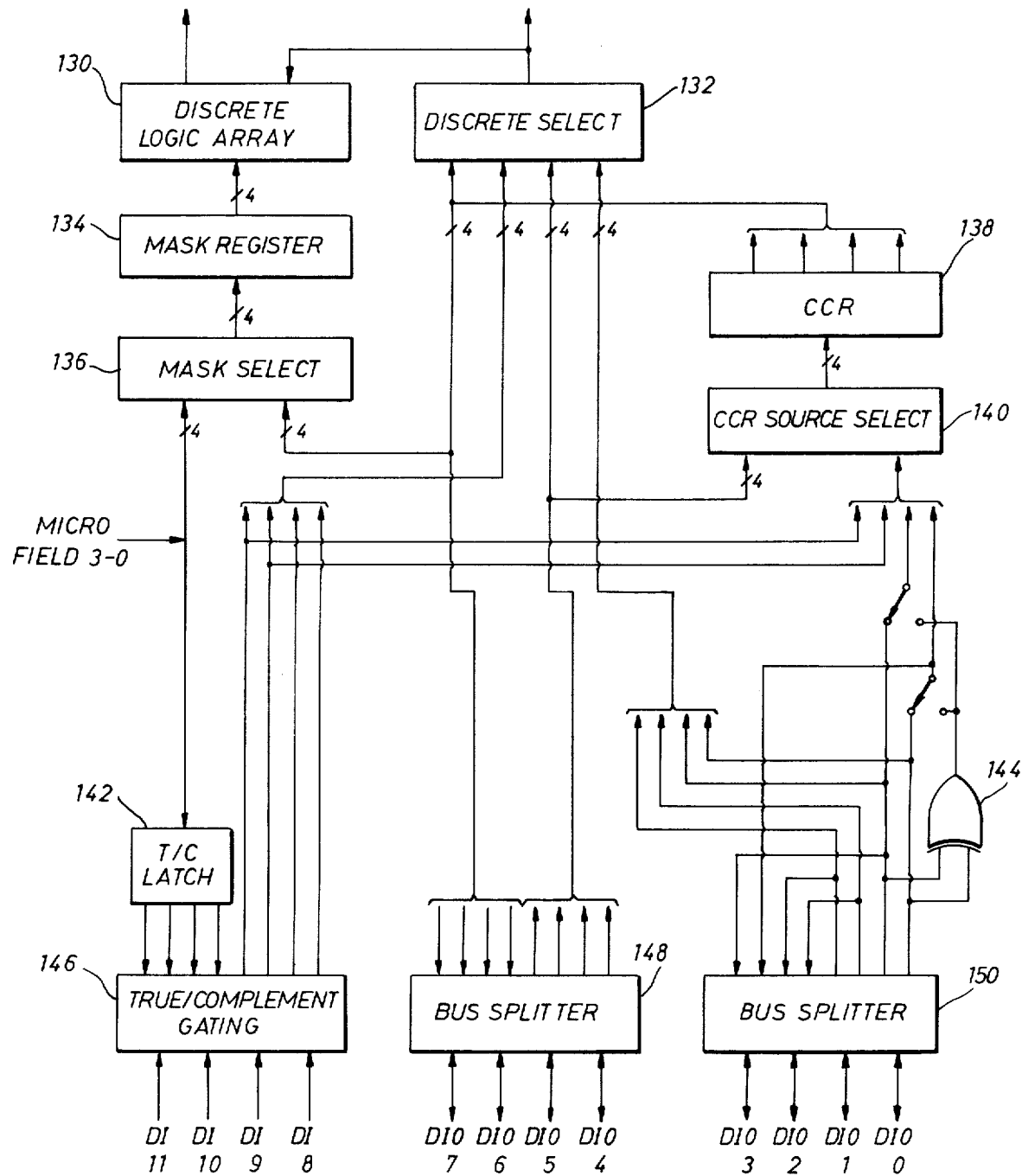
Figure 9:
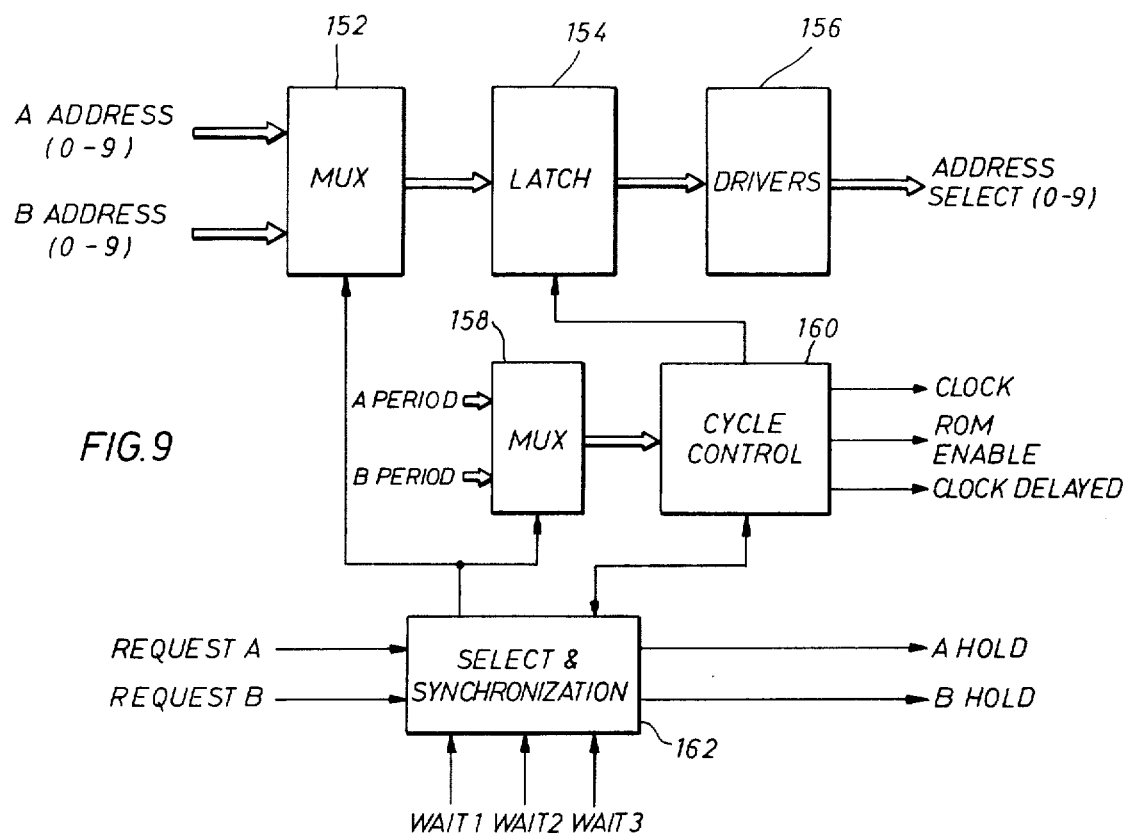
Figure 13:
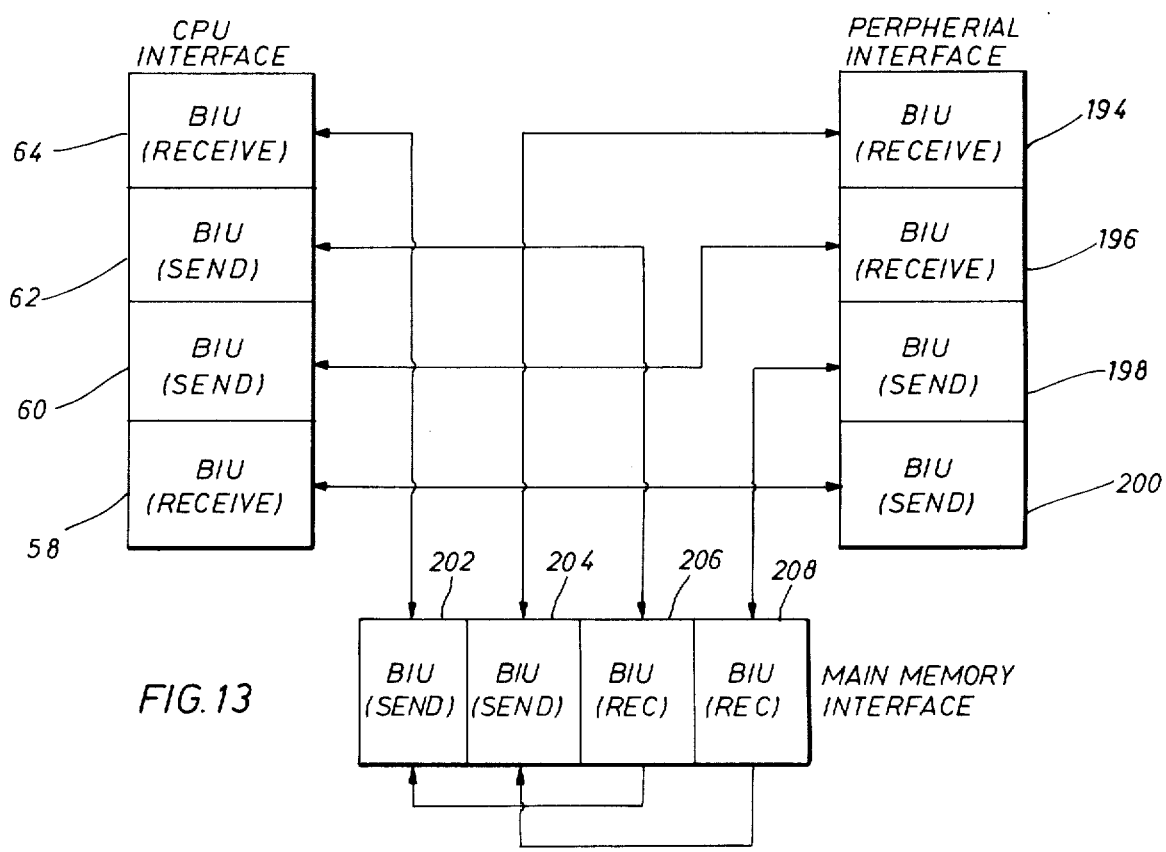
Figure 10A:
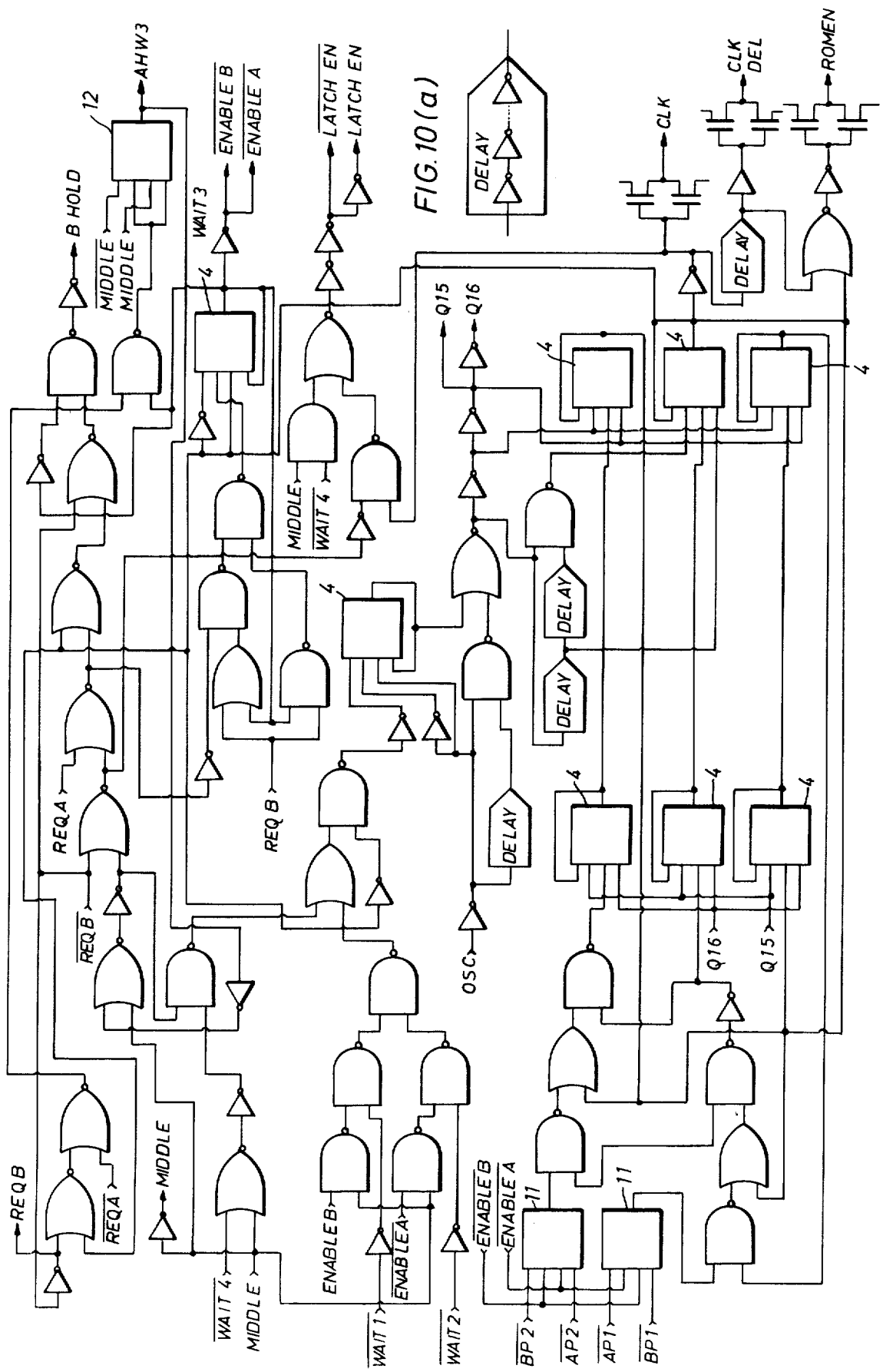
Figure 11:
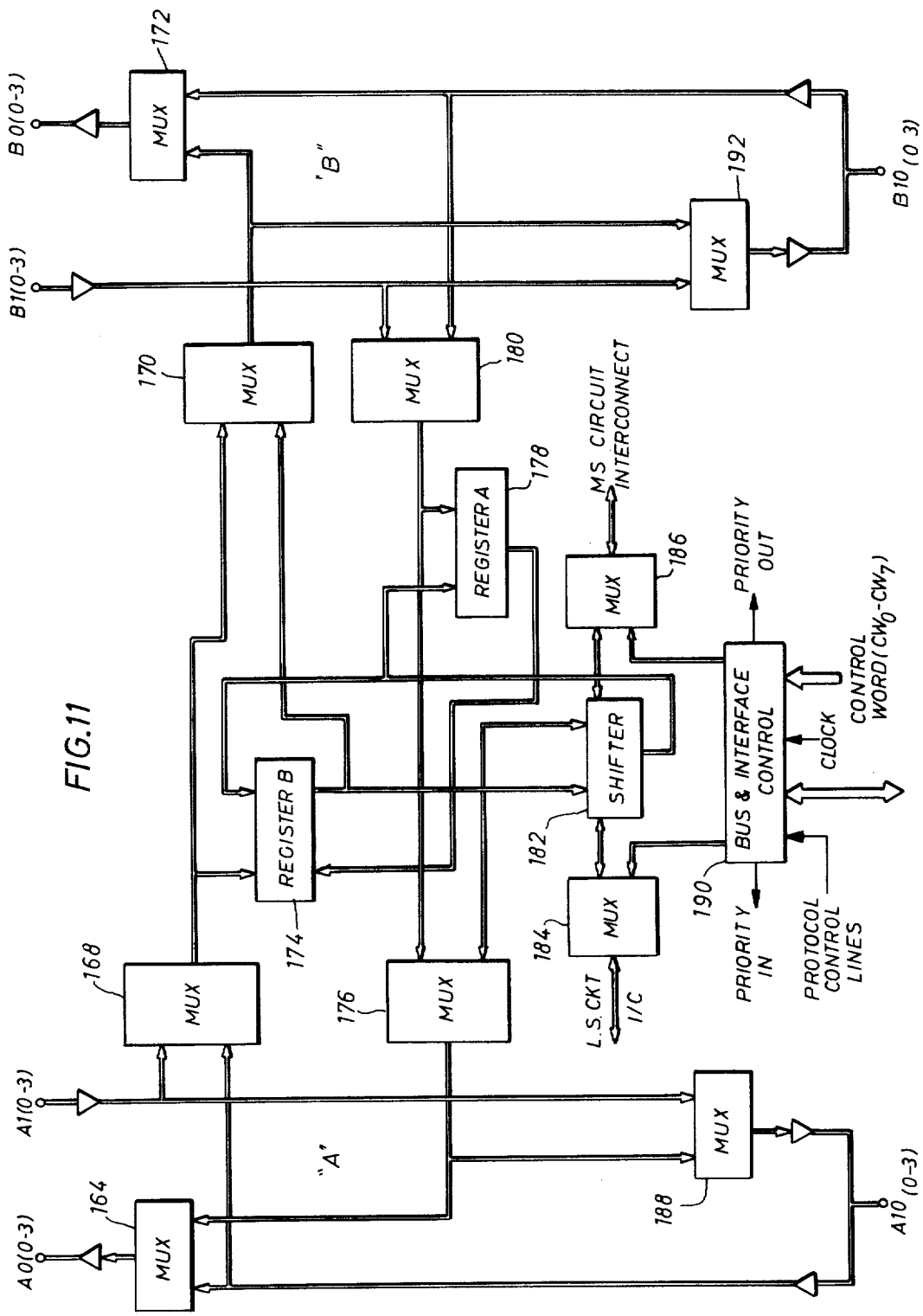
Figure 12:
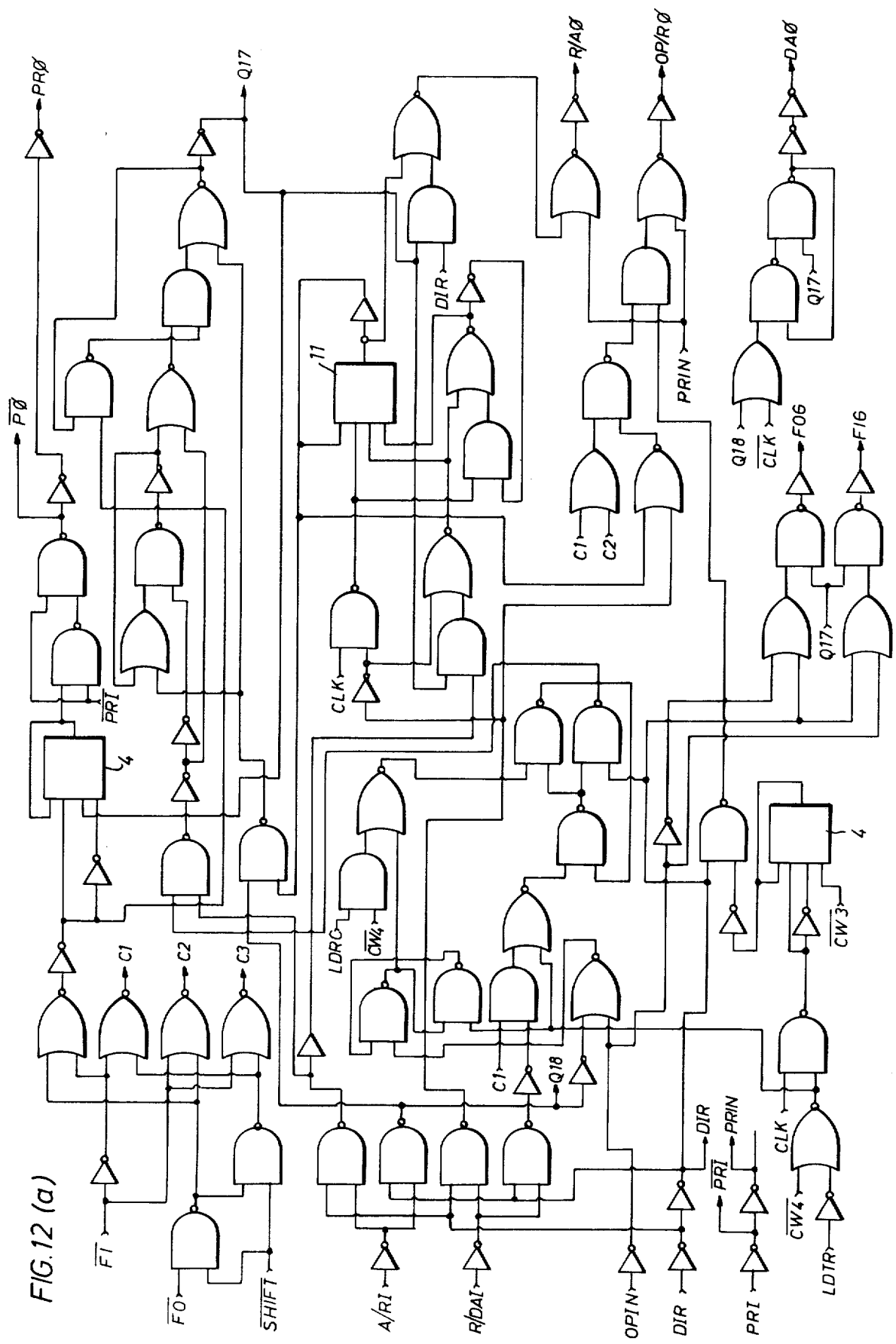
Figure 12B:
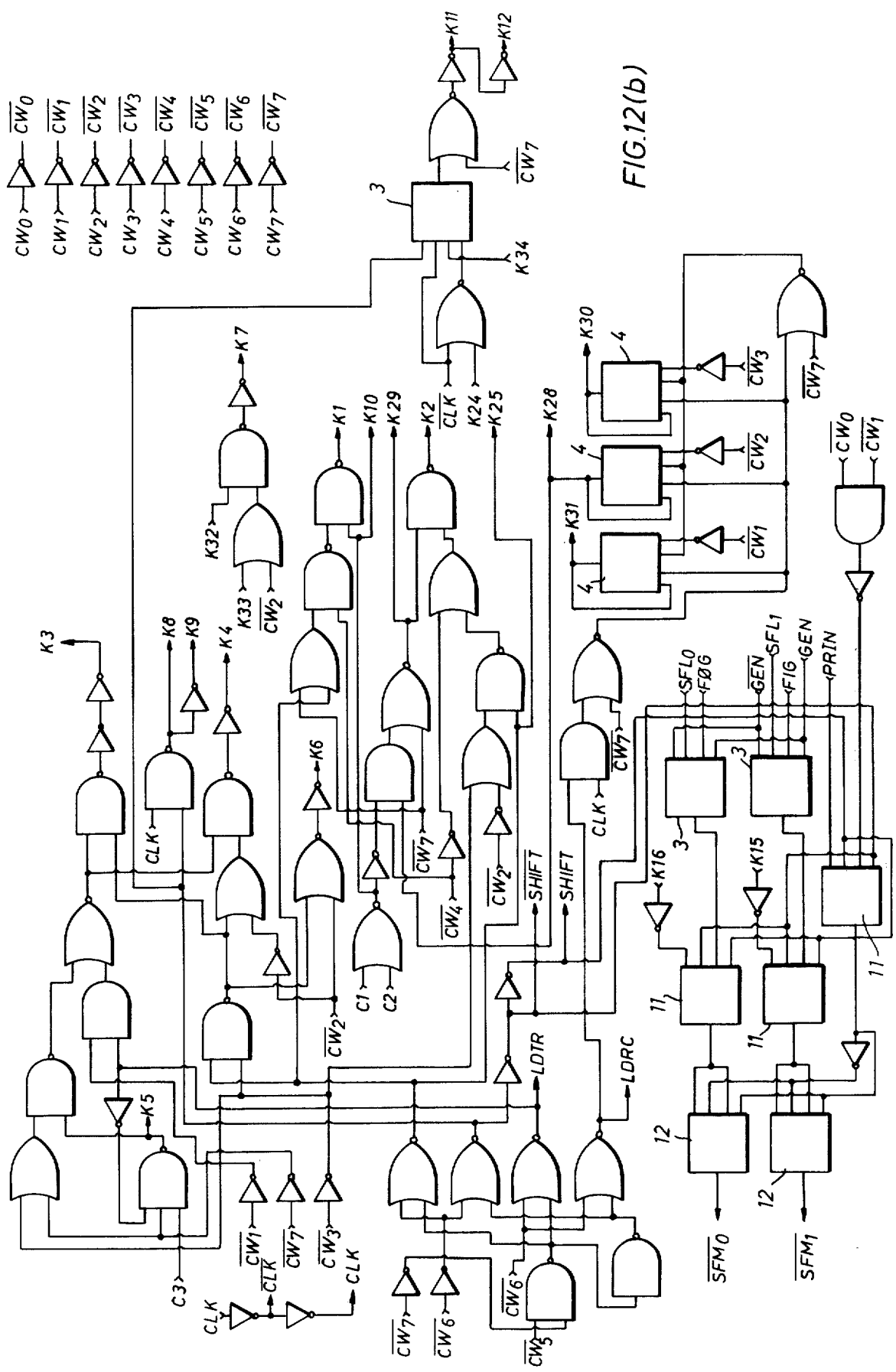
Figure 12C:
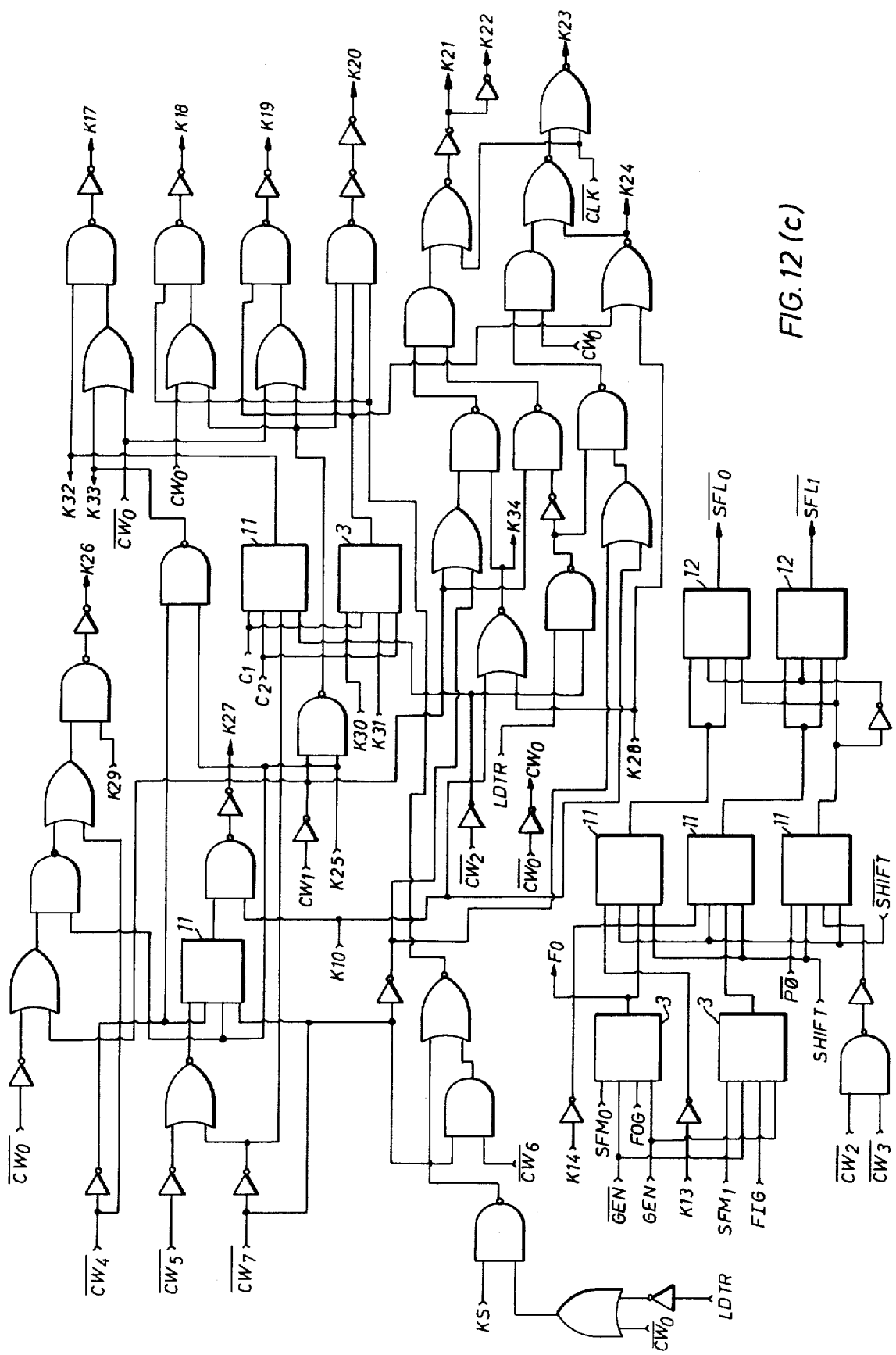
Figure 12D:
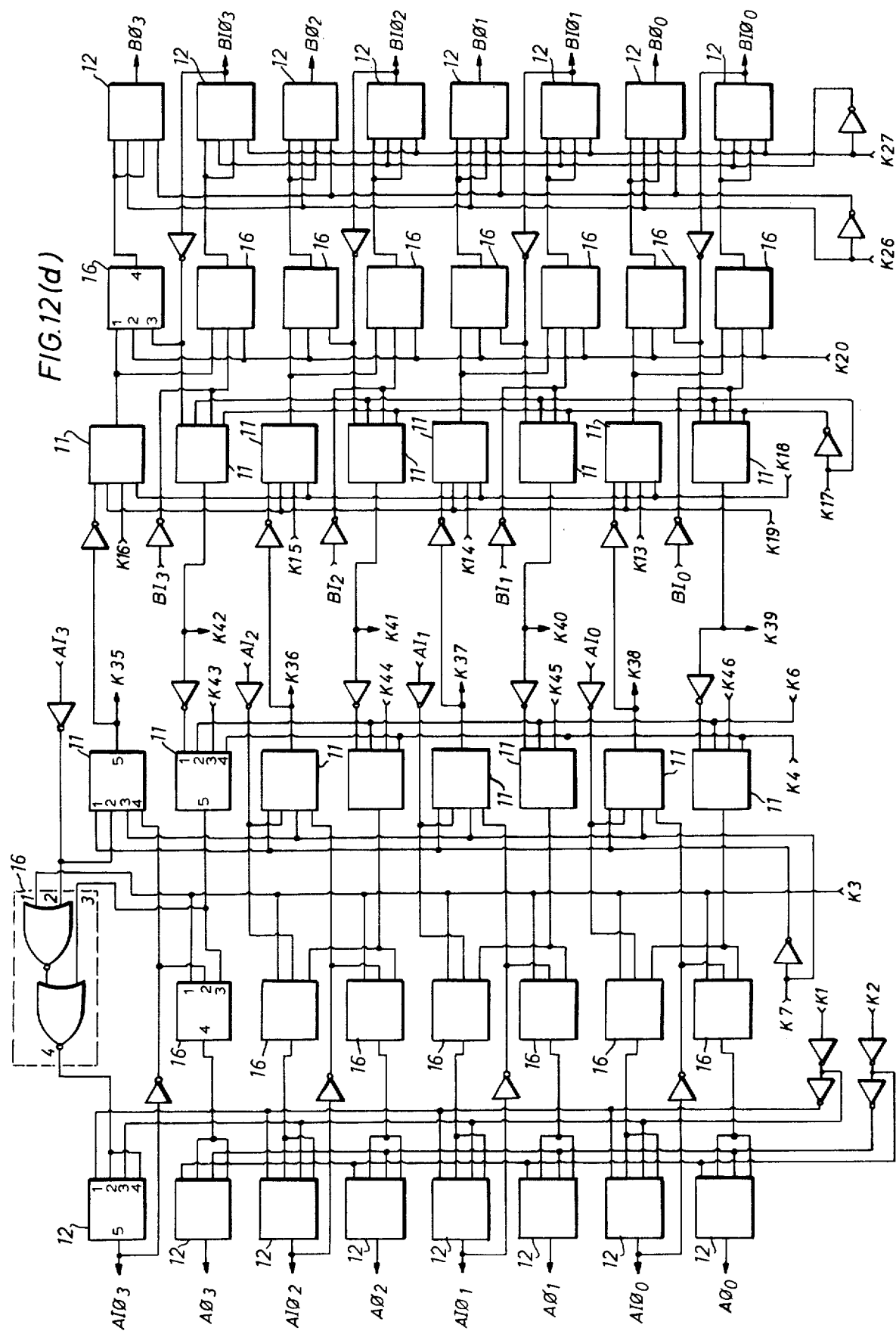
Figure 12E:
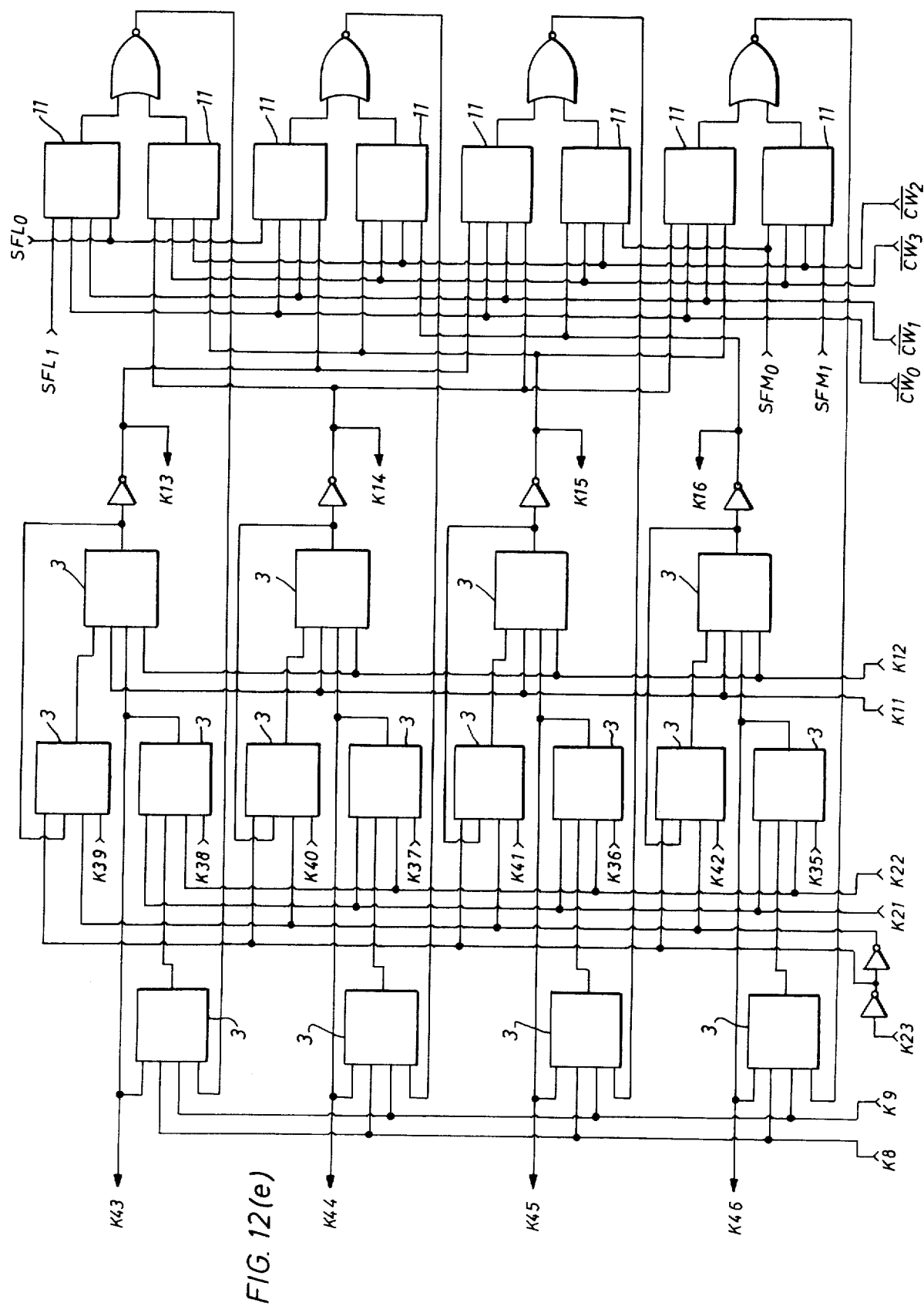
Figure 14:
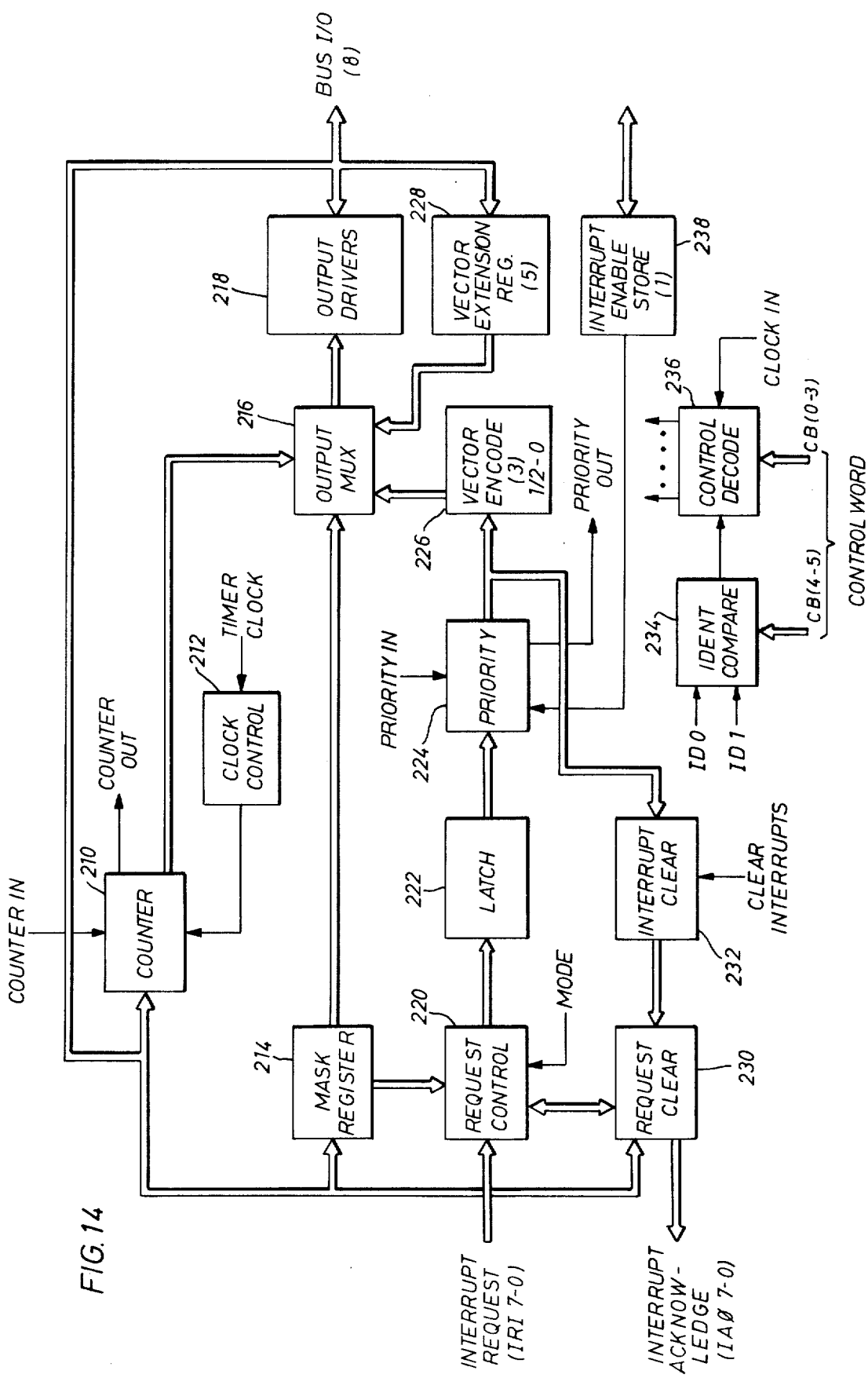
Figure 15A:
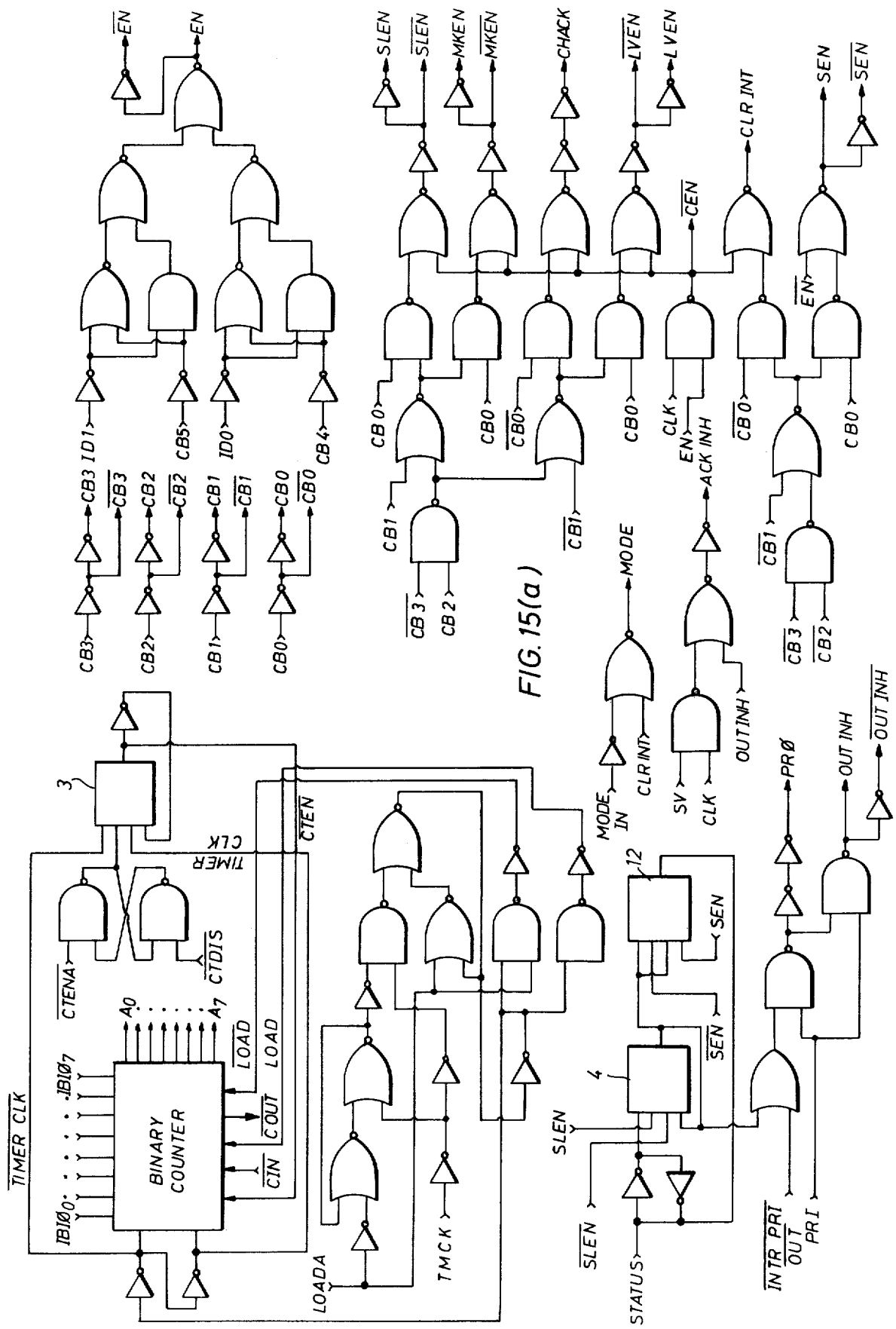

FIGS. 5(a), (b), (c) and (d) comprise a more detailed circuit diagram of the register select unit illustrated in FIG. 4;

FIG. 6 is a format diagram of the instruction set for an emulated computer instruction set;

FIG. 7 is a functional block diagram of the microcontroller shown in FIG. 1;

FIG. 8 is a functional block diagram of the discrete interface illustrated in FIG. 7;

FIG. 9 is a functional block diagram of a typical address selection unit shown in FIG. 1;

FIGS. 10(a) and (b) comprise a more detailed circuit diagram of the address selection unit illustrated in FIG. 9;

FIG. 11 is a functional block diagram of a typical bus innerface unit illustrated in FIG. 1;

FIGS. 12(a), (b), (c), (d) and (e) comprise a more detailed circuit diagram of the bus innerface unit shown in FIG. 11;

FIG. 13 is a functional bock diagram of the bus interface means of the invention as constructed from individual bus interface units shown in FIGS. 11 and 12;

FIG. 14 is a functional block diagram of the interrupt unit shown in FIG. 1; and FIGS. 15(a), (b) and (c) is a detailed circuit diagram of the interrupt unit as shown in FIG. 14.

Similar reference numerals refer to similar parts throughout the several views of the drawings.

DETAILED DESCRIPTION OF THE PREFERRED EMBODIMENT OF THE INVENTION

Several of the drawings accompanying the disclosure of the invention are detailed logic circuit diagrams of various functional portions of the invention. In these drawings, where repeated logic circuits occur, rectangular functional blocks have been substituted for those circuits with an appropriate reference number to identify the circuit diagram contained inside each functional block. At least one detailed circuit diagram of the circuits contained in each of these functional blocks are given in at least one of the drawings.

A Block Diagram of the Computer Emulator Architecture

Turning now to the figures, and first to FIG. 1, a functional block diagram of the architecture of the invention is shown. The invention consists of a micromemory 21 consisting of a plurality of micromemory units 20, 22, 24; a plurality of address selection units 26, 28, 30 respectively associated with the left memory unit 20 (LM), the middle memory unit 22 (MM) and the right memory unit 24 (RM) memory units; microcontroller units 1 32 (MCU1) and unit 2 34 (MCU2); and op-code transform ROM 36; interrupt unit 38; input/output peripheral interface unit 40; first and second processing means 41, 43; and bus interface units 58 (BIU4), 60 (BIU3), 62 (BIU2) and 64 (BIU1).

The micromemory unit 21 is used to store the firmware microcoded instructions which are used to control the internal circuits of the processor to emulate the macroinstructions of the other computer. The micromemory 21 consists of three micromemory units, left micromemory 20 (LM), middle micromemory unit 22 (MM) and right micromemory unit 24 (RM). Associated with each micromemory unit 20, 22, 24 is an associated address selection unit (ASU) 26, 28, 30. The output from each ASU is a 10-bit binary address to its associated micromemory unit. Inputted to each ASU are two 10-bit binary addresses, one address each from MCU1 32 and MCU2 34. As illustrated in FIG. 1, the two 10-bit binary addresses supplied from the MCU units are inputted either to the A or the B inputs of the ASUs. For the MCU1 32, the 10-bit binary address is supplied to the A input of ASU1 26 and to the B inputs of ASU2 28 and ASU3 30. For MCU2 34, the 10-bit address is inputted to the A input of the ASU2 28 and ASU3 30 and to the B input of the ASU1 26. The internal circuits of the ASUs are designed to provide a priority to the A input address if a request is issued to the address selection unit to input both the A and the B address at the same time.

Figure 2:
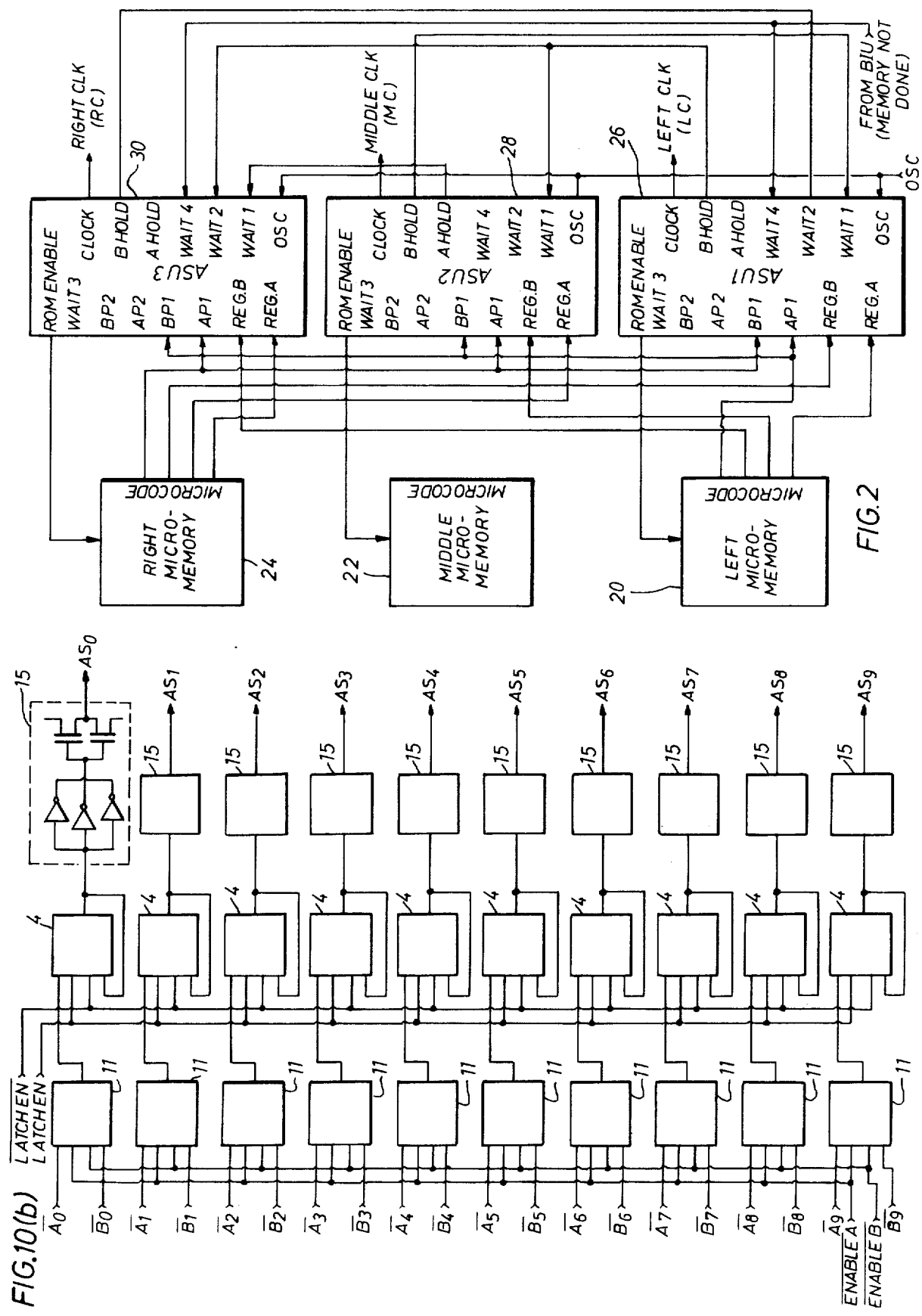
FIG. 2 is a more detailed block diagram of the signal connections between the address selection units and their associated micromemory units.

Referring now to FIG. 2, a more detailed block diagram of the control signal connections between the three micromemory units 20, 22, 24 and their associated ASU units 26, 28, 30 is shown. The illustrated signal lines do not show the address lines. Each ASU unit has a REQ A and a REQ B input control signal. A REQ A requests the 10-bit address on the A input of the ASU to be outputted to the associated micromemory unit while a REQ B requests the 10-bit binary address on the B input lines be outputted. As previously mentioned, when both the REQ A and REQ B signal occur simultaneously, priority is given to the REQ A input signal and the 10-bit address on the A input lines will be temporarily stored and outputted to the associated micromemory unit. As will be more fully discussed below, MCU1 normally addresses the LM 20 for the microcode stored therein that is needed during the execution phase of each macroinstruction emulation sequence, while the MCU2 addresses the RM 24 to obtain the microcode to control the operand derivation phase of the macroinstruction emulation. However, it is possible for MCU1 or MCU2 to supply the address to each and every one of the micromemory units 20, 22, 24. The microcode from each micromemory unit controls certain CPU resources.

When a particular macroinstruction requires the use of the operand derivation controller or the execution phase controller to have access to a particular CPU resource not normally under its control, the microcode from the micromemory units will request the address selection unit associated with the micromemory unit controlling the desired CPU resource to cause that address selection unit to select the 10-bit address from the microcontroller requesting the additional CPU resource. If the CPU resource is available, the appropriate address will be strobed into the address selection unit and forwarded to the associated micromemory unit. If however, the address selection unit receiving the request is currently being used by the other microcontroller, the address selection unit receiving the request will return a "hold" signal to the address selection unit associated with the requesting microcontroller. This hold signal, A HOLD or B HOLD, is inputted to either WAIT 1, WAIT 2, or WAIT 4 of the ASU associated with the requesting microcontroller. If a wait signal is received back from a requesting ASU unit, the ASU unit will be inhibited from generating a microcycle clock signal for the computer resources under control of the ASU unit. In other words, that ASU unit goes to sleep until the hold signal is dropped indicating that the CPU resources are available for the requesting microcontroller unit to continue its instruction emulation sequence. As soon as the CPU resource becomes available, the HOLD signal will be negated permitting the requesting microcontroller unit's address to be inputted to the address selection units to bring out the next microcoded instruction needed to control the desired CPU resource.

Still referring to FIG. 2, the clock signals generated by the ASU units, left clock (LC), middle clock (MC) and right clock (RC) are shown. These three clock signals are supplied to the various CPU resources controlled by the microcode stored in the micromemory unit associated with the ASU unit generating the clock. In certain computer macroinstructions, such as a 32-bit add, an increase in one of the phases of the generated microcycle clock signal is needed in order to provide certain CPU resource circuits enough time to perform the extended arithmetic function. Inputs AP1, BP1, AP2 and BP2 are provided to permit microcode control of the length of the two clock phases, Phase 1 (P1) or Phase 2 (P2).

Referring once again to FIG. 1, a catenated connection of the bus interface unit (BIU4-1) is shown for interfacing the input/output data busses of various functional blocks of the invention and for connecting main memory to the CPU. The output bus (system bus) from BIU4-1 contains the address and data bus lines to the main memory. As shown in FIG. 13, a similar arrangement of bus interface units is shown for connecting the address and data bus lines to the main memory interface and to a peripheral interface. Each BIU is identical in circuit design, with control-protocol signals controlling the function of the unit to be bidirectional (send) or unidirectional (receive).

Each microinstruction received and applied to the B0 output bus lines of the BIU 58, 60, 62 and 64 is applied as an address to the op-code transform ROM 36. The op-code transform ROM 36 strips the operand derivation and instruction execution information from each macroinstruction to generate two 8-bit addresses to the operand derivation MCU2 34 and the instruction execution MCU1 32.

To perform the logical operations on the digital data of the computer, general processing means 41 and 43 are provided. General processing means 41 is associated with the MCU1 32 for performing the instruction execution phase of the emulation sequence, while the general processing means 43 is associated with the MCU2 34 for performing the operand derivation phase of the emulation. For the general processing means 41, general processor units (GPU) 46, 48, 50, 52 are connected for 32-bit operation. Each GPU 46, 48, 50, 52 is identical, and comprises an 8-bit slice processor. Associated with GPU 46, 48 is a register select unit 2 (RSU2) 42. Register select unit 1 (RSU1) 44 is associated with GPU 50, 52. The general processing means 43 associated with MCU2 34 comprises only GPU 54, 56 connected for 16-bit operation. Control of the general processing means 43 is directly from macrocode while control of the GPU units of the general processing means 41 are supplied by the RSU units 42, 44.

Still referring to FIG. 1, the computation section of the CPU emulator 23 contains 2 pairs of General Processor Units (GPUs) 46, 48 and 50, 52. The GPU pairs are referred to as an "upper arithmetic logic unit (ALU)" 46, 48 and a "lower ALU" 50, 52 deriving their designations from the respective most and least-significant halves of 32-bit arithmetic computations. Since each GPU is an 8-bit slice, the dual 16-bit ALU arrangement provides the 32-bit parallel arithmetic capability.

Each GPU pair contains sixteen 16-bit registers. The sixteen general register assignments are identical in the two GPU pairs. In other words, at the end of each macroinstruction, the contents of the registers of the upper ALU are the same as the contents of the respectively addressed registers of the lower ALU.

The dual 16-bit ALU is employed for a number of reasons. First, the ability to configure a 32-bit parallel ALU simplifies the implementation of double-precision shift, double-precision arithmetic and floating-point arithmetic macroinstructions. This simplification is directly reflected in the utilization of less microprogram memory to implement these functions. When performing single precision (16-bit) operations, both GPU pairs 46, 48 and 50, 52 peform the same function at the same time.

The 32-bit parallel ALU capability also enhances the execution speed of many of the double precision macroinstructions. Most affected are the double precision macroinstructions that, once fetched, require more than one microinstruction cycle (microcycle) to perform their assigned function, such as multiplication, division, and floating-point. At the completion of double precision operations, the corresponding register in the opposite GPU pair has to be loaded with the new result. There are data paths within the CPU to accomplish this correction in one microcycle. However, because of the added correction cycle, the execution speed for simple double precision macroinstructions, such as add and subtract, is not improved over a conventional single 16-bit ALU.

A third reason for replicating the general registers in both GPU pairs 46, 48 and 50, 52 is to avoid the need to multiplex the GPU status signals to be loaded into the status register (not shown). With register replication, the carry output, overflow and sign bit are always available at the upper GPU pair regardless of whether a single or a double precision operation is in progress. Also, register selection control can address the double precision pair of registers independent of whether an even or odd register address was referenced. If some of the general registers were in one GPU pair and the rest in the other, then multiplexers would be required to obtain the status signals from the GPU containing the register of interest. With register replication, the zero detect spans the full 32-bits of both GPU pairs. Single precision zero detection is obtained by instructing both GPU pairs to test the same single precision quantity. Although examining both GPU pairs, the zero detect will obtain the appropriate result because both GPU pairs possess the identical result.

Referring momentarily to FIG. 6, the macroinstruction format for a Univac AN/UYK-20 16-bit minicomputer is shown. The preferred embodiment of the invention is disclosed and discussed herein with regard to the emulation of the macroinstruction set for this computer, and is provided merely for purposes of illustrating an example of how the invention functions to emulate another computer.

The two internal GPU register sources for register-to-register operations are addressed by the GPU "R" and "T" inputs. Only the "R" input address references the destination register to be loaded. In most UYK-20 macroinstructions, the destination register is specified by the "a" field. Therefore, the emulator 23 associates the "a" field with the "R" input and the "m" field with the "T" input. Separate register select units (RSU 2 and RSU 1) are used to provide the "R" and "T" inputs to each pair of GPUs 46, 48 and 50, 52, respectively. Each RSU contains two 8-bit registers known as the source register, "SR", and the operand register "OR". When a new macroinstruction is processed, the "a" and "m" fields are loaded into both the "SR" and the "OR" registers of both RSUs.

During normal operation, the source of the "R" and "T" outputs are defined by a 4-bit internal RSU register called the register select register. The register select register is loaded via the macroinstruction through the RSU MF inputs. The function controlled by each MF bit is as follows:

| Source of Register Select Register Bit | Function | When Low | When High |
|---|---|---|---|
| MF3 | "R" Output Multiplexer | "SR" bits 70-4 | "OR" bits 3-0 |
| MF2 | "R" Output Incrementer | No Increment | Increment |
| MF1 | "T" Output Multiplexer | "S" bits 3-0 | "OR" bits 7-4 |
| MF0 | "T" Output Incrementer | No Increment | Increment |

Therefore, by loading the lower half of the macroinstruction into both the "SR" and "OR", the microprogrammer can select (a,m), (a,a), (m,a), or (m,m) for the GPU register select inputs.

The RSU also has a DEFAULT input to force the register select register outputs to a known state without changing its contents. When activated, the outputs are forced low resulting in the selection of the four most-significant bits of "SR" to the "R" output and the four least-significant bits of "SR" to the "T" output. Neither select output is incremented. Since "SR" is loaded with the macroinstruction "a" and "m" fields in its four most and least significant bit positions, respectively, the default is used to quickly provide "a" at "R" and "m" at "T" independent of the contents of the register select register. This feature allows for the storage of register select controls for double precision and the use of the DEFAULT line for single precision.

RSU1 and RSU2 have the ability, under microcontrol, to displace the register being addressed in the GPU by one count or position. In other words, the register being addressed in the most significant GPU pair 46, 48 would be "a" and the register being addressed in the second GPU pair 50, 52 would be "a+2". This ability to increment the register address loaded from the instruction field of the macroinstruction is built into the RSU units. This structure, while adding several circuits, provides several features that result in a more efficient architecture.

With the ability to offset the address of the selected register and with replication of the data stored in the registers, the ALU is always set up for immediate double precision operations. Also, the structure is not dependent on having even numbered register assignments referenced in double precision instructions. When single precision instructions are executed, the operation is duplicated in both GPU pairs. A very important feature of this approach is that all arithmetic status information to the microcontroller is generated from the same place for both single and double precision operations. No additional circuitry or operations are required to combine sequentially generated arithmetic status. The only overhead associated with this approach is that after a double precision operation, the register in each GPU pair that changed in the other pair has to be updated to the new value. The cross switching in the BIU units 58, 60, 62, 64 allows for the simultaneous update of both GPU pairs 46, 48 and 50, 52 in one microcycle clock time.

As previously mentioned, the dual GPU pairs represent a reconfigurable 16-bit/32-bit ALU. What is referred to as the accumulator extension register is contained within the BIU units. This extension register is used for other purposes to be described later. The most significant outputs of the shifter in the BIU units are connected to the least significant outputs of the lower GPU pair 50, 52 shift out. Now with the proper placement and zero fill (for single precision) of the multiplicand or dividend in the ALU and using the BIU extension register to hold the multiplier and divisor, the same basic multiply and divide microcommands are used for all multiply and divide executions (single precision, double precision, and floating point).

As mentioned earlier, one of the advantages in the design of the invention is the minimization of micromemory resulting in power savings. The structure and control of the ALU is, therefore, designed with the intent that only one series of microcode is required to execute all identical operations in which the only differences are precision or operand derivation. The functional requirements of the RSU and BIU circuits are integral to the ALU and provide for the efficient handling of these features without paying a severe time penalty.

Still referring to FIG. 1, four concatenanted BIU circuits (see discussion in section entitled "The Bus Interface Unit") form the two bidirectional to unidirection interfaces that connect the CPU function to the system bus. Each interface has a temporary register (TA & TB) to allow the interface to complete data transfers on the bus without continuous CPU control. The BIU also contains a shifter which uses TA as the source and TB as the slave. For the multiply and divide implementations, the BIU registers and shifter are used for the ALU extension register. Bus transfers would not be required by the CPU while performing the multiply and divide iteration sequences.

Connection is made from the most significant output of the BIU to the least significant input of the lower ALU. For multiply, the multiplier is loaded into the BIU register. The operation to be performed in the ALU to form the product is determined by looking at the LSB of the BIU shift out. For divide, the least significant portion of the dividend is loaded into the BIU register. As it is shifted into the ALU dividend register, the bits forming the quotient are shifted in behind it.

By extending the multiplicand and division with zeros, the single precision multiply and divide iterations can be done with the ALU configured for 32-bit parallel operation. With this configuration the same basic multiply and divide operation microcode can be used for both single and double precision executions. The extension is also used for floating point alignment and normalization. Also contained in the BIU are multiplexers to move data from the unidirectional input on one side to the unidirectional output on the other. Therefore, the extension of CPU data paths to allow the single cycle double precision register updates, and parallel inputs to the ALUs for single precision are contained in the BIU.

The emulator 23 architecture shown in FIG. 1 incorporates two independent microcontrollers, MCU1 32 and MCU2 34. The approach incorporates several concepts designed for more efficient utilization of micromemory 21 and at the same time maintain macroinstructions speeds for register-to-register operations. The dual-controller approach is based upon the observation that performance of most macroinstructions can be accomplished with two sequences of microcode, both of which can be independently common to other macroinstructions. One sequence is called classification or operand derivation. Macroinstructions are classified by whether they use a second general register, a general register pair, a macroinstruction literal field, a bit-position mask, a memory word, or a memory double word as an operand source. In most cases this could be called the operand derivation. The other sequence is by mathematical function. Among these functions are load, add, subtract, one's complement, negate (two's complement), compare, and logical AND and OR. This sequence is referred to as execution.

A macroinstruction being input to the CPU first passes through an op-code transform ROM 36. The output is two micromemory entry points. The first is to the classification controller and the other is to the execution controller. Both controllers proceed to access micromemory based on their respective entry points.

The micromemory 21 is divided into three sections, LM 20, MM 22 and RM 24. The ASU units 26, 28 and 30 provide the means by which each section can be allocated to either controller in a well defined manner. One section, RM 24, is primarily addressed by the classification controller MCU2 34. This section contains most of the control fields to the circuits that are used mainly for fetch, operand derivation, and interrupt control. Another section LM 20, is primarily addressed by the execution controller, MCU1 32. This section contains most of the common controls necessary to perform function execution of the macroinstruction. The third section is in the middle, MM 22, and control of it is passed from the MCU2 34 when operand derivation is complete to MCU1 32 to finish function processing. The middle section provides the missing control signals indicating where to get the operand.

This architecture is designed to give optimum performance with no duplication of microcode. The same microcode that performs a single precision add is used for all corresponding addressing and data formats. This approach also allows for better packing of microcode. As previously mentioned, in conventional prior-art architectures with single micromemory address, the controls associated with execution would remain a no-op while operand derivation was occurring, and the complement would hold true during execution. With sectioned micromemory much of the respective microcode can occupy the same address space and operand derivation and function execution can proceed in parallel and at the same time.

The program being executed in each Controller, MCU1 32 and MCU2 34, may at times require the entire processor to perform its task. For example, MCU2 34 needs access to general registers located in the arithmetic computation GPUs for use as index registers. In the other direction, MCU1 32 needs access to temporary registers located in the address GPUs. For this reason, each portion of the microprogram memory must be available to both MCUs. The means by which the MCUs request and receives control of the sections of micromemory is incorporated in the address select units (ASU1-3) 26, 28 and 30. Refer to the section entitled "The Address Selection Unit" for a more detailed discussion of these units.

The AN/UYK-20 computer has instructions referencing bit, literal, and byte data. The formating of this data for input to the ALU is accomplished in the RSU circuits. The data referenced by all of these operations is contained in the lower 8 bits of the macroinstruction which is loaded into both RSUs 42, 44 at the beginning of each macroinstruction cycle.

Each RSU contains all of the source data and can output eight bits of the formatted data. Each RSU can be selected to output either the most or least significant 8 bits of the literal expansion, byte expansion, or 1-of-16 bit mask. The two RSUs 42, 44 operating together generate the full 16-bit operand.

The General Processor Unit

Figure 3:
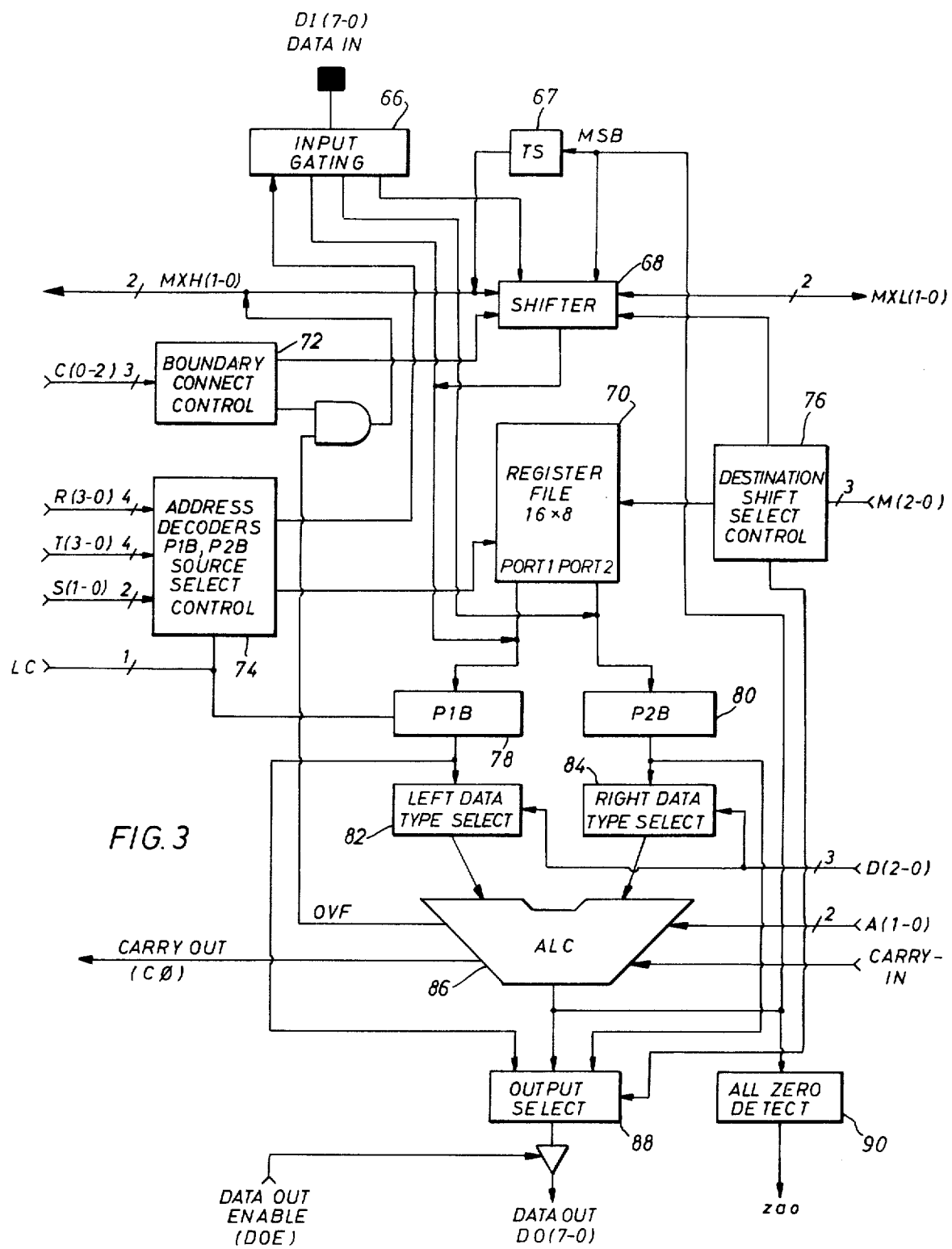
FIG. 3 is a functional block diagram of the general processing unit shown in FIG. 1.

Referring now to both FIGS. 1 and 3, each GPU 46, 48, 50, 52, 54, 56 is an 8-bit bit-slice processor consisting of: a 16-word by 8-bit dual access register file 70, two port buffers (P1B 78, P2B 80), extensive data type selection multiplexing, arithmetic logic circuit (ALC) 86 and powerful shifting capability. It has separate 8 bit data input and data output paths. Data can be input directly to the register file 70, P1B 78 or P2B 80. Data can be output from P1B 78, P2B 80 or from the ALC 86. The data paths are designed to facilitate the implementation of complex algorithms. For example, two bit multiply data paths consisting of a right shift of one bit into the ALC 86, and right shift of one or two bits into the register file 70 are implemented in the unit.

The GPU Architecture

Table 1 contains a description of the I/O signals of each GPU unit. The I/O signals can be classified by function as:

Data (DI, DO, CI, CO, AZO, MXH, MXL)
Addresses (R, T)
Control (A, C, D, M, S, DOE, LC)

Data Out (DO) is an 8-bit parallel tri-state output controlled by the data out enable (active low) input. CO is the carry-out. All zero is an open collector output. MXH and MXL(0) are bidirectional input/output pins. MXL(1) is a tri-state output. The function of the GPU is the result of the coordinated exercise of 10 distinct subfunctions which are described as follows:

TABLE 1

| Mnemonic | GPU SIGNAL LIST Description |
|---|---|
| DO(3) | Data Output bit 3 |
| DO(4) | Data Output bit 4 |
| DO(5) | Data Output bit 5 |
| DO(6) | Data Output bit 6 |
| DO(7) | Data Output bit 7 |
| CO | Carry Out |
| DOE | Data Out Enable (active low) |
| AZO | All Zero Detect Out |
| MXH(0) | Multiplexer Shift High bit 0 |
| MXH(1) | Multiplexer Shift High bit 1 |
| C0 | Boundary, Connect Control bit 0 |

TABLE 1-continued

| Mnemonic | GPU SIGNAL LIST Description |
|---|---|
| C1 | Boundary, Connect Control bit 1 |
| C2 | Boundary, Connect Control bit 2 |
| DI(7) | Data Input bit 7 |
| DI(6) | Data Input bit 6 |
| DI(5) | Data Input bit 5 |
| DI(4) | Data Input bit 4 |
| DI(3) | Data Input bit 3 |
| DI(2) | Data Input bit 2 |
| DI(1) | Data Input bit 1 |
| DI(0) | Data Input bit 0 |
| S1 | Source Select Control bit 1 |
| S0 | Source Select Control bit 0 |
| R2 | Port 1 Register Select bit 2 |
| R3 | Port 1 Register Select bit 3 |
| T2 | Port 1 Register Select bit 2 |
| T3 | Port 1 Register Select bit 3 |
| R1 | Port 1 Register Select bit 1 |
| T1 | Port 1 Register Select bit 1 |
| T0 | Port 1 Register Select bit 0 |
| R0 | Port 1 Register Select bit 0 |
| M1 | Destination Select Control bit 1 |
| M0 | Destination Select Control bit 0 |
| M2 | Destination Select Control bit 2 |
| MXL(0) | Multiplexer Shift Low bit 0 |
| MXL(1) | Multiplexer Shift Low bit 1 |
| LC | Latch Clock |
| D2 | Data Type Select Control bit 2 |
| A0 | Adder Logic Circuit Control bit 0 |
| A1 | Adder Logic Circuit Control bit 1 |
| CI | Carry In |
| D1 | Data Type Select Control bit 1 |
| D0 | Data Type Select Control bit 0 |
| DO(0) | Data Output bit 0 |
| DO(1) | Data Output bit 1 |
| DO(2) | Data Output bit 2 |

Two Port Register File 70

Referring now to FIG. 3, the register file 70 contains 16 words of 8 bits each. Any two words addressed by the addresses R and T can be read simultaneously at port 1 and port 2, respectively. Identical data appears at both ports if R and T are equal. Data can be written into the register file 70 at address R if the load clock (LC) is high. The M-bits determine the source of the data to be written into the register file 70. If M=LLL (L=logic low H=logic high) and S=LH Data In (DI) is written into the register file 70. If M=LLH, LHL or LHH the output of the shifter 68 is written into the register file 70. If M=HLL the load clock is internally suppressed (forced low) and thus no writing into the register file takes place. If M=HLH, HHL or HHH the output of the ALC 86 is written into the register file 70. If the S-bits are HH, the least significant bit of the R-address is internally forced to 1. Table 2 illustrates the source for data loaded into the register file 70.

TABLE 2

| REGISTER FILE INPUT SOURCE SELECTION | | |
|---|---|---|
| M | SOURCE | NOTES |
| LLL | DATA IN (DI) | S=LH Required |
| LLH | SHIFTER | |
| LHL | SHIFTER | |
| LHH | SHIFTER | |
| HLL | LC DISABLED-NO WRITE | |
| HLH | ALC | |
| HHL | ALC | |
| HHH | ALC | |

The Port 1 Buffer (P1B) 78

The port 1 buffer (P1B) 78 can operate in 3 modes: as a slave to the register addressed by R (i.e. to port 1), as a falling edge triggered master/slave register with port 1 as input, or as a latch to data in (DI). The mode is determined by the M-bits and by the S-bits. If S=LL, HL or HH, P1B 78 operates as a slave to the register addressed by R. Together Reg(R) and P1B form a falling edge triggered master/slave register. Thus the value of P1B 78 will remain stable while LC=H and REG(R) is being written. When LC=L, P1B will follow the value appearing on port 1. P1B will change value while LC=L, if R is changed.

If S=LH and M=LLL, P1B operates as a master/slave register. Its input is port 1 of the register file 70. In this mode, P1B 70 changes value only with the falling edge of LC. Unlike in the previously described mode, if R is changed while LC=L, P1B will not follow port 1. Note that in this mode DI is being written into the register dile 70. If S=LH and M=LLL, P1B functions as a latch for DI. In this mode P1B follows DI while LC=L and does not change while LC=H, retaining the value of DI at the time of the rising edge of LC.

Mode switching should take place when the load clock is low. If M changes to LLL while S=LH, P1B will retain the value of DI at the time M changed, until the falling edge of LC. If DI and M change simultaneously the new value of DI will be retained. Table 3 illustrates the operating modes for P1B 78.

TABLE 3

| | | P1B OPERATING MODES |
|---|---|---|
| S=LH | M=LLL | MODE |
| NO | DON'T CARE | SLAVE TO REG(T) |
| YES | NO | DISABLED, VALUE NOT CHANGING |
| YES | YES | MASTER/SLAVE REGISTER FOLLOWS REG(R) |

The Port 2 Buffer P2B 80

The Port 2 Buffer P2B 80 can operate in 3 modes: as a slave to the register addressed by T (i.e. to port 2), as a transparent latch for DI, or disabled. If S=LL or LH and A=LL, HL or HH as well as when S=HL or HH and A=LH, P2B 80 functions as a slave to the register addressed by T. Together, Reg(T) and P2B 80 form a falling edge triggered master/slave register. Thus the value of P2B 80 remains stable when LC=H, even if Reg(T) is being written into (if R=T). When LC=L, P2B will follow the value appearing on Port 2. P2B will change value while LC=L, if T is changed.

If S=HL or HH and A=LL, HL or HH, P2B operates as a transparent latch for DI. In this mode P2B 80 always follows DI. If S=LL or LH and A=LH, all inputs to P2B 80 are disabled and P2B 80 retains the value it held when it was disabled, until the mode is changed. In this manner values appearing on port 2 or on DI can be stored indefinitely in P2B 80. Table 4 illustrates the operating modes for port P2B 80.

TABLE 4

| | P2B OPERATING MODES | |
|---|---|---|
| S | A | MODE |
| LL, LH | LL, HL, HH | SLAVE TO REG(T) |
| LL, LH | LH | DISABLED, VALUE NOT CHANGING |
| HL, HH | LL, HL, HH | FOLLOWS |
| HL, HH | LH | DI UNCONDITIONALLY SLAVE TO REG(T) |

The Left Data Type Selector 82

Still referring to FIG. 3, the left data type selector 82 supplies the left operand to the ALC 86. The left operand can be: P1B 78, the 1's complement of P1B 78 (P1B), zero, or P1B 78 shifted right 1 bit. The left data type selector 82 is mainly controlled by the D-bits. The A-bits and C-bits enter into consideration in some cases. The left operand of the ALC 86 is P1B 78 when D=LLH, HLH or HHH. When D=LHH the left operand of the ALC 86 is P1B. Zero is used as the left operand of the ALC when D=LLL or HLL. If D=LHL or HHL the left operand of the ALC 86 is P1B if A=LL, HL or HH and is P1B 78 shifted right 1 bit if A=LH.

In the case where the left operand of the ALC 86 is P1B 78 shifted right 1 bit, the most significant bit is controlled by the C-bits. For C=LLL or LLH, the most significant bit of the left ALC 86 operand equals the input value applied to the pin MXH(1). For C=HLL a sign extended shift is used, i.e., the most significant bit equals bit 7 of P1B. If C=HLH, the most significant bit of the left of the ALB 86 operand is equal to the value of the flip-flop TS. If C=HHL or HHH the most significant bit of the left ALC 86 operand is equal to bit 7 of P2B 80. The values C=LHL and LHH should be avoided when the left ALC 86 operand is P1B shifted right 1 bit, because the value of the most significant bit of the left ALC 86 operand is undefined for this control setting.

The Right Data Type Selector

The right data type selector 84 supplies the right operand to the ALC 86. The right operand can be P2B 80, the 1's complement of P2B (P2B), or sero. The right ALC 86 operand is determined by the D-bits as follows. The right ALC operand is P2B if D=HLL, HLH or HHL. It is P2B if D=LLL, LLH or LHL, and it is zero if D=LHH or HHH. Table 5 illustrates the ALC 86 operands from the left and right data type selectors 82, 84 for the various conditions of the D and A bits. Table 6 illustrates the most significant bit when ½ of the P1B part 78 is input to the ALC 86.

TABLE 5

| | ALC OPERANDS | | |
|---|---|---|---|
| D | A=LH | LEFT | RIGHT |
| LLL | Don't Care | 0 | $\overline{P2B}$ |
| LLH | Don't Care | P1B | $\overline{P2B}$ |
| LHL | No | $\overline{P1B}$ | $\overline{P2B}$ |
| LHL | Yes | ½ * P1B | $\overline{P2B}$ |
| LHH | Don't Care | $\overline{P1B}$ | 0 |
| HLL | Don't Care | 0 | P2B |
| HLH | Don't Care | P1B | P2B |

TABLE 5-continued

| D | A=LH | LEFT | RIGHT |
|---|---|---|---|
| | ALC OPERANDS | | |
| HHL | No | $\overline{P1B}$ | P2B |
| HHL | Yes | ½ * P1B | P2B |
| HHH | Don't Care | P1B | 0 |

TABLE 6

MSB FOR 1/1 * P1B AS LEFT ALC OPERAND

| C | MSB |
|---|---|
| LLL | MXH(1) |
| LLH | MXH(1) |
| LHL | Undefined |
| LHH | Undefined |
| HLL | P1B(7) |
| HLH | TS |
| HHL | P2B(7) |
| HHH | P2B(7) |

The Arithmetic Logic Circuit (ALC) 86

The ALC 86 can perform addition and the logical operations AND and OR on the operands supplied by the left and right data type selectors 82, 84, respectively. A carry-in can be externally supplied by means of the input pin CI. In addition to the 8-bit result, the ALC 86 produces a carry-out on the output pin CO, an overflow indication which can be routed to MXH(1) if C=LHL or C=LHH, and an all-zero signal which causes the AZO pin to be in a high impedance state when the ALC result is zero, and to be grounded if it is not zero.

The function of the ALC 86 is controlled by the A-bits. The ALC 86 adds when A=LL or A=LH, it performs AND if A=HL, and if performs OR when A=HH. The carry-out is computed using carry look-ahead. For both logical operations the carry-out equals the carry-in. Overflow is computed as the exclusive-OR of the carry into and out of the most significant bit. Table 7 illustrates the ALC 86 functions as a function of the A(1-0) bits.

TABLE 7

| A | FUNCTION |
|---|---|
| | ALC 86 FUNCTIONS |
| LL | ADD |
| LH | ADD |
| HL | AND |
| HH | OR |

The Shifter 68

The Shifter 68 is capable of shifting the output of ALC 86 one bit to the right, two bits to the right or one bit to the left. The M-bits select one of the these 3 shifts. If M=LLH the output of the shifter 68 is the output of ALC 86 shifted left 1 bit. If M=LHL the output of the shifter 68 is the output of ALC 86 shifted right 1 bit. If M=LHH the output of the shifter 68 is the output of the ALC 86 shifted right 2 bits. For all other values of the M-bits the function of the shifter is of no consequence, as no output or storage element state depends on it. Table 8 illustrates the function of the shifter 68 as a function of the M(2-0) bits.

TABLE 8

| M | FUNCTION |
|---|---|
| | SHIFTER 68 FUNCTIONS |
| LLH | SHIFT ALC OUTPUT LEFT 1 BIT |
| LHL | SHIFT ALC OUTPUT RIGHT 1 BIT |
| LHH | SHIFT ALC OUTPUT RIGHT 2 BITS. |

The value of the shift carries (i.e., the values entered into the bit positions left vacant as a result of a shift operation) is controlled mainly by the C-bits. For left shifts of 1 bit, the least significant bit is set to 0 if C=LHH, to 1 if C=LHL, and set equal to the value of MXL(0) (which is in input mode) for any other value of the C-bits. Table 9 illustrates the shifter carry for left shifts of 1 bit in the shifter 68 as a function of the C(2-0) bits.

TABLE 9

| C | VALUE OUTPUT BY SHIFTER BIT 0 |
|---|---|
| | SHIFT-CARRY FOR LEFT SHIFTS OF 1 BIT |
| LLL | MXL(0) |
| LLH | MXL(0) |
| LHL | 1 |
| LHH | 0 |
| HLL | MXL(0) |
| HLH | MXL(0) |
| HHL | MXL(0) |
| HHH | MXL(0) |

For right shifts of 1 bit, the most significant bit is set to 0 if C=LHH, and to 1 if C=LHL. If C=LLL or C=HLL the most significant bit is set to the value of bit 7 of the ALC 86 output, unless there is an overflow in the ALC; in that case the most significant bit is set to the complement of bit 7 of the ALC 86 output. If C=LLH, HLH, HHL or HHH the most significant bit is set to the value of MXH(0) (which is in input mode). Table 10 illustrates the shift-carry for right shifts of 1 bit in the shifter 68 as a function of the C(2-0) bits.

TABLE 10

| C | VALUE OUTPUT BY SHIFTER BIT 7 |
|---|---|
| | SHIFT-CARRY FOR RIGHT SHIFTS OF 1 BIT |
| LLL | ALC(7) ⊕ OVF |
| LLH | MXH(0) |
| LHL | 1 |
| LHH | 0 |
| HLL | ALC(7) ⊕ OVF |
| HLH | MXH(0) |
| HHL | MXH(0) |
| HHH | MXH(0) |

For right shifts of 2 bits, the two most significant bits are set to 0 if C=LHH, and to 1 if C=LHL. If C=LLL or C=HLL, the two most significant bits are set to the value of bit 7 of the ALC 86 output, unless there is an overflow in the ALC; in that case the two most significant bits are set to the complement of bit 7 of the ALC output. If C=LLH, bit 7 is set equal to the input value on MXH(1) and bit 6 is set equal to the input value of MXH(0). If C=HLH, bit 7 is set equal to the value of the flip-flop TS and bit 6 is set equal to the input on MXH(0). If C=HHL or C=HHH, bit 7 is set equal to bit 7 of P2B 80 and bit 6 is set equal to the input on MXH(0). Table 11 illustrates the shift-carry for right shifts of 2 bits in the shifter 68 as a function of the C(2-0) bits.

TABLE 11
SHIFT-CARRY FOR RIGHT SHIFTS OF 2 BIT

| C | Value Output by Shifter Bit 7 | Value Output by Shifter Bit 6 |
|---|---|---|
| LLL | ALC(7) ⊕ OVF | ALC(7) ⊕ OVF |
| LLH | MXH(1) | MXH(0) |
| LHL | 1 | 1 |
| LHH | 0 | 0 |
| HLL | ALC(7) ⊕ OVF | ALC(7) ⊕ OVF |
| HLH | TS | MXH(0) |
| HHL | P2B(7) | MXH(0) |
| HHH | P2B(7) | MXH(0) |

The Boundary and Connect Control 72

The output values appearing on the pins MXH(1), MXH(0), MXL(1) and MXL(0) are controlled mainly by the C-bits and the M-bits. MXH(1) is in input mode if C=LLL or C=LLH. If C=LHL or C=LHH the overflow signal from the ALC 86 is output on MXH(1). If C=HLL, the value of bit 6 of the ALC 86 output is output on MXH(1). If C=HLH, the value output on MXH(1) is the value of the flip-flop TS 67. If C=HHL or C=HHH, bit 7 of P2B 80 is output on MXH(1). Table 12 illustrates the MXH(1) function as a function of the C(2-0) bits.

TABLE 12

| C | MXH(1) FUNCTION |
|---|---|
| LLL | INPUT |
| LLH | INPUT |
| LHL | OUTPUT OVF |
| LHH | OUTPUT OVF |
| HLL | OUTPUT ALC(6) |
| HLH | OUTPUT TS |
| HHL | OUTPUT P2B(7) |
| HHH | OUTPUT P2B(7) |

MXH(0) is in input mode if C=LLL or if M=LHL or M=LHH. At all other times the value of bit 7 of the ALC 86 output is output on MXH(0).

MXL(1) is in output mode if M=LHH or if A=LH and D=LHL or D=HHL. If A=LH and either D=LHL or D=HHL, the value of bit 0 of P1B 78 is output on MCL(1). If A=LH or D=xLH, but M=LHH, the value of bit 1 of the ALC 86 output is output on MXL(1). If MXL(1) is not in output mode, it is placed into a high impedance state. Table 13 illustrates the MXL(1) function as a function of the A, D and M bits.

TABLE 13

| MXL(1) FUNCTION | | |
|---|---|---|
| (A=LH)Λ(D=xHL) | M=LHH | FUNCTION |
| NO | NO | HIGH Z STATE |
| NO | YES | OUTPUT ALC(1) |
| YES | NO | OUTPUT P1B(0) |
| YES | YES | OUTPUT P1B(0) |

MXL(0) is in input mode unless M=LHL or M=LHH. If M=LHL or LHH, the value of bit 0 of the ALC 86 output is output on MXL(0).

Data Output

The GPU can output 8 bits in parallel on the data output (DO) bus. There is one tri-state driver for each bit in DO. All 8 drivers can be disabled by a high input on the data out enable pin (DOE).

One of three values can be output on DO: the output of the ALC 86, the output of P1B 78, or the output of P2B 80. The M-bits control which of these is output on DO. If M=HHH, P1B 78 is output on DO. If M=HHL, P2B 80 is output on DO. For any other value of M, the output of the ALC 86 is output on DO.

The Flip-Flop TS 67

Bit 7 of the ALC 86 output can be latched into the D flip-flop TS 67. TS 67 is enabled for input whenever C=HHH.

The Control Function

The function performed by the GPU is determined by the set of 15 control inputs. The effects of the various settings of these control signals are discussed in the following sections.

The S-Bits

The two S-bits affect the function of the register file 70, of P1B 78, and of P2B 80. The register file 70 is affected by the S-bits in two ways. First, when S=HH, the least significant bit of the R address is forced to 1 and thus only odd-address registers can be accessed. Second, to write incoming data from data in (DI) into the register file 70, the S-bits must be set to LH (in addition to setting M=LLL).

The operating mode of the port 1 buffer 78 is determined by the value of the S-bits and M-bits. If S=LL, HL or HH, P1B 78 operates as a slave to Reg(R). If S=LH and M=LLL, P1B 78 operates as a latch for data in (DI). If S=LH and M=LLL, P1B 78 operates as a falling edge triggered master/slave register and followed Reg(R).

The operating mode of P2B 80 depends on the most significant of the two S-bits ($S_1$) and on the A-bits. If $S_1$=L and A=LH of if $S_1$=H and A=LH, P2B 80 operates as a slave to Reg(T). If $S_1$=L and A=LH, P2B 80 is disabled in the sense that its value does not change until either $S_1$ or the A-bits change. If $S_1$=H and A=LH, P2B 80 operates as a transparent latch for data in (DI) in the sense that the output of P2B 80 follows DI unconditionally. Table 14 illustrates the effects of the S-bit settings.

TABLE 14
EFFECTS OF S-BIT SETTINGS

| S | REGISTER FILE | | P1B | P2B | |
|---|---|---|---|---|---|
| LL | M≠LLL | No Effect | SLAVE TO REG(R) | A≠LH | SLAVE TO REG(T) |
|  | M=LLL | Write Inhibit |  | A=LH | DISABLED |
| LH | M≠LLL | No Effect | M≠LLL Latch for DI | A≠LH | SLAVE TO REG(T) |
|  | M=LLL | Write Enable | M=LLL Master/Slave Mode | A=LH | DISABLED |
| HL | M≠LLL | No Effect | SLAVE TO REG(R) | A≠LH | FOLLOWS DI |
|  | M=LLL | Write Inhibit |  | A=LH | SLAVE TO REG(T) |

TABLE 14-continued

EFFECTS OF S-BIT SETTINGS

| S | REGISTER FILE | | P1B | P2B |
|---|---|---|---|---|
| HH | M≠LLL | R(0)←1 | SLAVE TO REG(R+1) | A≠LH FOLLOWS DI |
|  | M=LLL | Write Inhibit | | A=LH SLAVE TO REG(T) |

The D-Bits

The Three D-bits affect the function of the data type selectors and MXL(1). The left data type selector 82 outputs the value of P1B 78 if D=LLH, HLH or HHH. It outputs zero if D=LLL or LLH. The output of the left data type selector 82 is P1B 78 either if D=LHH or alternately if D=xHL (x means "don't care") and A=LH. If D=xHL and A=LH the output of the left data type selector 82 is P1B 78 shifted right 1 bit. In the latter case the value of the most significant bit of the left data type selector 82 output is determined by the C-bits.

The right data type selector 84 outputs P2B 80 if D=HLL, HLH or HHL. If D=LLL, LLH or LHL the output is P2B 80. Zero is output by the right data type selector 84 if D=LHH or HHH. The output pin MXL(1) outputs bit 0 of P1B 78 if D=xHL and A=LH. If the D-bits have any value other than LHL or HHL (or if A=LH), the M-bits determine the function of MXL(1). If M-LHH, MXL(1) outputs bit 1 of the ALC 86 output. Otherwise MXL(1) is in a high impedance state. Table 15 illustrates the effects of the D-bit settings.

TABLE 15

EFFECTS OF D-BIT SETTINGS

| D | Left Data Type Select | Right Data Type Select | | MXL(1) | |
|---|---|---|---|---|---|
| LLL | 0 | | M≠LHH | HIGH Z | |
| | | P2B | M=LHH | ALC(1) | |
| LLH | P1B | | M≠LHH | HIGH Z | |
| | | P2B | M=LHH | ALC(1) | |
| LHL | A≠LH | P2B | M≠LHH | A≠LH HIGH Z | |
| | A=LH P1B | | | A=LH P1B(0) | |
| | ↓ * P1B | | | | |
| | | | M=LHH | ALC(1) | |
| LHH | | 0 | M≠LHH | HIGH Z | |
| | P1B | | M=LHH | ALC(1) | |
| HLL | 0 | P2B | M≠LHH | HIGH Z | |
| | | | M=LHH | ALC(1) | |
| HLH | P1B | P2B | M≠LHH | HIGH Z | |
| | | | M=LHH | ALC(1) | |
| HHL | A≠LH | P2B | M≠LHH | A≠LH HIGH Z | |
| | A=LH P1B | | | A=LH P1B(0) | |
| | ↓ * P1B | | | | |
| | | | M=LHH | ALC(1) | |
| | | | M≠LHH | HIGH Z | |
| HHH | P1B | 0 | | | |

TABLE 15-continued

EFFECTS OF D-BIT SETTINGS

| D | Left Data Type Select | Right Data Type Select | MXL(1) | |
|---|---|---|---|---|
| | | | M=LHH | ALC(1) |

The A-Bits

The two A-bits affect the function of the ALC 86, P2B 80, the left data type selector 82 and of MXL(1). The function performed by the ALC 86 is determined by the A-bits. If A=LL or LH the ALC 86 adds. If A=HL the logical operation AND is performed in the ALC, and if A=HH the logical operation OR is performed in the ALC. When the ALC adds the carry-out CO is computed by carry look-ahead. For logical operations the carry-out CO equals the carry-in CI. Overflow (which may be output on MXH(1) and which plays a role in both left shift-carries) is always zero when logical operations are performed.

The operating mode of P2B 80 is determined by the A-bits and by the most significant of the two S-bits ($S_1$). When A=LH, P2B 80 operates as a slave to Reg(T) if $S_1$=L, and the output of P2B follows DI unconditionally if $S_1$=H. When A=LH, P2B is disabled as long as $S_1$=L, and it acts as a slave to Reg(T) if $S_1$=H. The function the left data type selector 82 depends on the value of A-bits only when D=LHL or HHL. In these two cases, the output of the left data type selector is P1B if A=H, and to the output is P1B 78 shifted right on ebit if A=LH.

The output pin MXL(1) outputs bit 0 of P1B 78 if A=LH and D=xHL. If the A-bits have any other value (or if D=xHL), the M-bits determine the function of MXL(1). if M=LHH, MXL(1) outputs bit 1 of the ALC 86 output. Otherwise MXL(1) is in a high impedance state.

The M-Bits

The three M-bits affect the function of the data output (DO), of the shifter 68, of the MXH and MXL pins, of the register file 70 and of P1B 78. The load clock (LC) is internally disabled if M-HLL. The data output is a tri-state 8-bit set of output signals. If DOE=H all 8 pins are placed in a high impedance state. If DOE=L the M-bits determine the value to be output on DO. If M=HHH the value of P1B 78 is output. If M=HHL the value of P2B 80 is output. For all other values of the M-bits the output of ALC 86 is output through DO. Table 16 illustrates the effect of the A bits, while Table 17 illustrates the effects of the M-bits.

TABLE 16

EFFECTS OF THE A-BITS

| A | ALC | | P2B | Left Data Type Select | | MXL(1) |
|---|---|---|---|---|---|---|
| LL | ADD | S=Lx | Slave to Reg(T) | D≠xHL | No Effect | M≠LHH High Z |
| | | S=Hx | Follows DI Uncond. | D=xHL P1B | M=LHH | ALC(1) |
| LH | ADD | S=Lx | Disabled | D≠xHL | No Effect | D≠xHL M≠LHH High Z |

TABLE 16-continued

EFFECTS OF THE A-BITS

| A | ALC | P2B | | Left Data Type Select | | MXL(1) | |
|---|---|---|---|---|---|---|---|
| HL | AND, CO=CI, OVF=0 | S=Hx<br>S=Lx | Slave to Reg(T)<br>Slave to Reg(T) | D=xHL<br>D≠xHL | ǐ * P1B<br>No Effect | D=xHL<br>M≠LHH | M=LHH ALC(1)<br>P1B(0)<br>High Z |
| HH | OR, CO=CI, OVF =0 | S=Hx<br>S=Lx | Follows DI Uncond.<br>Slave to Reg(T) | D=xHL<br>D≠xHL | $\overline{P1B}$<br>No Effect | M=LHH<br>M≠LHH | ALC(1)<br>High Z |
| | | S=Hx | Follows DI Uncond. | D=xHL | $\overline{P1B}$ | M=LHH | ALC(1) |

TABLE 17

EFFECTS OF THE M-BITS

| M | DO* | SHIFTER | MXL(1) | | MXL(0) | MXH(0) | | LC | Source of Write-Data for Register File | | P1B MODE | |
|---|---|---|---|---|---|---|---|---|---|---|---|---|
| LLL | ALC | | D≠xHL<br>or<br>A≠LH | High Z | INPUT | C≠LLL | ALC(7) | Enabled | S≠LH | Write Inhibit | S≠LH | Slave to Reg(R) |
| | | | D=xHL<br>and<br>A=LH | P1B(0) | | C=LLL | INPUT | | S=LH | DI | S=LH | Master/Slave to Reg(R) |
| LLH | ALC | Shift left 1 bit | D≠xHL<br>or<br>A≠LH | High Z | INPUT | C≠LLL | ALC(7) | Enabled | SHIFTER | | S≠LH | Slave to Reg(R) |
| | | | D=xHL<br>and<br>A=LH | P1B(0) | | C=LLL | INPUT | | | | S=LH | Latch for DI |
| LHL | ALC | Shift left 1 bit | D≠HL<br>or<br>A≠LH | High Z | ALC(0) | INPUT | | Enabled | SHIFTER | | S≠LH | Slave to Reg(R) |
| | | | D=xHL<br>and<br>A=LH | P1B(0) | | | | | | | S=LH | Latch for DI |
| LHH | ALC | Shift right 2 bits | D≠xHL<br>or<br>A≠LH | ALC(1) | ALC(0) | INPUT | | Enabled | SHIFTER | | S≠LH | Slave to Reg(R) |
| | | | D=xHL<br>and<br>A=HL | P1B(0) | | | | | | | S=LH | Latch for DI |
| HLL | ALC | | D≠xHL<br>or<br>A≠HL | High Z | INPUT | C≠LLL | ALC(7) | Disabled | WRITE INHIBIT | | S≠LH | Slave to Reg(R) |
| | | | D=xHL<br>and<br>A=LH | P1B(0) | | C=LLL | INPUT | | | | S=LH | Latch for DI |
| HLH | ALC | | D≠xHL<br>or<br>A≠LH | High 2 | INPUT | C≠LLL | ALC(7) | Enabled | ALC | | S≠LH | Slave to Reg(R) |
| | | | D=xHL<br>and<br>A=LH | P1B(0) | | C=LLL | INPUT | | | | S=LH | Latch for DI |
| HHL | P2B | | D≠xHL<br>or<br>A≠LH | High Z | INPUT | C≠LLL | ALC(7) | Enabled | ALC | | S≠LH | Slave to Reg(R) |
| | | | D=xHL<br>and<br>A=LH | P1B(0) | | C=LLL | INPUT | | | | S=LH | Latch for DI |
| HHH | P1B | | D≠xHL<br>or<br>A≠LH | High Z | INPUT | C≠LLL | ALC(7) | Enabled | ALC | | S≠LH | Slave to Reg(R) |
| | | | D=xHL<br>and<br>A=LH | P1B(0) | | C=LLL | INPUT | | | | S=LH | Latch for DI |

*When DOE = H the DO pins are in a high impedance state.

The function of the shifter 68 is controlled by the M-bits. When M=LLH, the shifter performs a 1 bit left shift. When M=LHL, the shifter performs a 1 bit right shift. When M=LHH, the shifter performs a 2 bit right shift. For all other values of the M-bits the function of the shifter is of no consequence (don't care) since it does not affect the state of any storage element or of any output signal.

The output pin MXL(1) outputs the value of bit 1 of the ALC 86 output if M=LHH and either D=xHL or A=HL. If D=xHL and A=LH then MXL(1) outputs bit 0 of P1B 78. If M=LHH and either D=HL or A=LH then MXL(1) is placed in a high impedance state. The bidirectional pin MXL(0) outputs the value of bit 0 of the ALC 86 output if M=LHL or M=LHH. If M=LHx, MXL(0) is in input mode. The bidirectional pin MXH(0) outputs the value of bit 7 of the ALC 86 output if C=LLL and M=LHx. If C=LLL or M=LHL, MXH(0) is in input mode.

The register file 70 is affected by the M-bits in two ways. First, the M bits determine the source of the data to be written into the register file 70. Second, if M=HLL the load clock (LC) is disabled and thus nothing can be written into the register file. The function of P1B 78 is controlled by the S-bits and by the M-bits. If S=LH and M=LLL, P1B operates as a master/slave register and retains the value of Reg(R) from the time of the last falling clock edge. If S=LH but M=LLL, P1B operates as a latch for data input (DI). If S=LH, P1B operates as a slave to Reg(R), regardless of the value of the M-bits.

The C-Bits

The three C-bits affect the shift-carries into the shifter 68 and into the left data type selector 82 when P1B 78 when P1B 78 is shifted right, as well as MXH(1), MCH(0) and the flip-flop TS 67. The shift-carries are values entered into the bit positions left vacant as a result of a shift operation. For left shifts of 1 bit, the least significant bit is left vacant. It is set to 0 if C=LHH, to 1 if C=LHL, or it is set equal to the value applied at the pin MXL(0) (which is in input mode during left shifts) if C=LHx.

For right shifts of 1 bit, the most significant bit is left vacant. It is set to 0 if C=LHH, or to 1 if C=LHL. If C=LLL or C=HLL the most significant bit is set to the value of bit 7 of the ALC 86 output, unless there is an overflow in the ALC. In that case, the most significant bit is set to the complement of bit 7 of the ALC output. If C=LLH, HLH, HHL or HHH the most significant bit is set to the value of MXH(0) (which is in input mode during right shifts).

For right shifts of 2 bits, the two most significant bits are left vacant. Both are set to 0 if C=LHH and both are set to 1 if C=LHL. If C=LLL or C=HLL both are set equal to bit 7 of the ALC output, unless there is an overflow in the ALC; in that case both bits are set to the complement of bit 7 of the ALC output. If C=LLH, bit 7 of the output of the shifter 68 is set equal to the input value on MXH(1) and bit 6 of the shifter 68 output is set equal to the value of the flip-flop TS 67 and bit 6 of the shifter 68 output is set equal to the input on MXH(0). If C=HHL or C=HHH bit 7 of the shifter 68 output is set equal to the value of bit 7 of P2B and bit 6 of the shifter 68 output is set equal to the input on MCH(0).

In the case when D=LHL or HLL and A=LH, the output of the left data type selector 82 is P1B shifted right 1 bit. If C=LLL or LLH the most significant bit of the left data type selector's 82 output is set equal to value input on MXH(1). For C=HHL the most significant bit of the left data type selector's output is set equal to bit 7 of P1B. For C=HLH the value of the flip-flop TS 67 is used as the most significant bit of the left data type selector's output. If C=HHL or C=HHH the most significant bit of the left data type selector's output is set equal to bit 7 of P2B. The values C=LHL and C=LHH should be avoided when P1B shifted right 1 bit is selected in the left data type selector, because the value of the most significant bit of the left data type selector's output is undefined and unpredictable for this setting of the control bits.

The bidirectional pin MXH(1) is controlled entirely by the C-bits. If C=LLL or C=LLH, MXH(1) is in input mode. If C=LHL or C=LHH, the overflow signal from the ALC is output on MXH(1). If C=HLL bit 6 of the ALC output is output on MXH(1). If C=HLH the value of the flip-flop TS is output on MXH(1). If C=HHL or HHH bit 7 of P2B is output on MXH(1). Table 18 illustrates the effects of the C-bits.

TABLE 18

EFFECTS OF THE C-BITS

| | Shift Carries | | | | Left Data Type Select* | | | |
|---|---|---|---|---|---|---|---|---|
| | Left 1 Bit | Right 1 Bit | Right 2 Bits | | | | | |
| C | Bit 0 | Bit 7 | Bit 7 | Bit 6 | Bit 7 | MXH(1) | MXH(0) | TS |
| LLL | MXL(0) | ALC(7).OVF | ALC(7).OVF | ALC(7).OVF | MXH(1) | INPUT | INPUT | DISABLED |
| LLH | MXL(0) | MXH(0) | MXH(1) | MXH(0) | MXH(1) | INPUT | M≠LHx ALC(7)<br>M=LHx Input | DISABLED |
| LHL | 1 | 1 | 1 | 1 | UNDEF. | OVF | M≠LHx ALC(7)<br>M=LHx Input | DISABLED |
| LHH | 0 | 0 | 0 | 0 | UNDEF. | OVF | M≠LHx ALC(7)<br>M=LHx Input | DISABLED |
| HLL | MXL(0) | ALC(7).OVF | ALC(7).OVF | ALC(7).OVF | P1B(7) | ALC(6) | M≠LHx ALC(7)<br>M=LHx Input | DISABLED |
| HLH | MXL(0) | MXH(0) | TS | MXH(0) | TS | TS | M≠LHx ALC(7)<br>M=LHx Input | DISABLED |
| HHL | MXL(0) | MXH(0) | P2B(7) | MXH(0) | P2B(7) | P2B(7) | M≠LHx ALC(7)<br>M=LHx Input | DISABLED |
| HHH | MXL(0) | MXH(0) | P2B(7) | MXH(0) | P2B(7) | P2B(7) | M≠LHx ALC(7)<br>M=LHx Input | ENABLED |

*Applicable only when D=xHL and A=LH.

The bidirectional pin MXH(0) is in input mode if C=LLL of if M=LHx. Otherwise bit 7 of the ALC output is output on MXH(0). The flip-flop TS 67 is controlled by the C-bits. If C=HHH the value of TS 67 follows bit 7 of output of ALC. For any other value of the C-bits, TS 67 retains its value.

The Tri-State Control Bit DOE

The control bit DOE serves to enable/disable the tri-state outputs for the 8 data output (DO) bits. If DOE=H the tri-state drivers are placed in a high impedance state. If DOE=L data is being output by the tri-state drivers for DO.

The Load Clock (LC)

The load clock controls the operation of the register file 70, of P1B 78 and of P2B 80. The load clock controls writing of the register file 70. As long as LC=H, the register selected by the R-address (Reg(R)) follows the input to the register file 70. When LC=L all registers remain unchanged. Writing of the register file can be prevented when LC=H by setting M=HLL. Also if M=LLL and S=LH is specified, no writing will take place.

The register file 70 alone is a level mode storage array. The register file 70, however, functions in conjunction with the buffers P1B and P2B. In conjunction with P1B and P2B, the registers selected by the addresses R and T form master/slave registers. When P1B operates as a slave to Reg(R), Reg(R) is write-enabled only when LC=H while P1B is write-enabled only when LC=L, the net effect being that Reg(R) and P1B form a falling edge triggered register.

P2B followed Reg(T) when LC=L. When LC=H, however, P2B is disconnected from port 2 and thus retains its value while LC=H. The net effect is that Reg(T) and P2B form a trailing edge triggered register. When R=T this of no consequence since in that situation Reg(T) cannot be written into. However, when R=T, Reg(T) may change while LC=H, but P2B only follows when the falling edge of LC occurs.

When P1B and P2B operate in the mode of slaves to Reg(R) and Reg(T) respectively, their value could change while LC=L due to a change in the address R or T respectively. When P1B is used in the master/slave mode, its value can only change immediately following the falling edge of the Load Clock. Even if R changes, P1B will then not change until the next falling edge of the load clock. When P1B operates as a latch for DI, P1B follows DI as long as LC=L and retains its value while LC=H.

The Register Select Unit

Referring now to FIG. 4, a block diagram of a RSU unit is shown. The primary functions provided by the RSU circuit are: (1) provide GPU register file select inputs from instruction file or micromemory; (2) generate BIT masks; (3) expand literal and byte data formats; (4) iterate counts outside microcontroller (shift); (5) register select increment and compare for load and store multiple operations; and (6) emit constants (data or address) from micromemory. The RSU has three sets of 8-bit data input ports. The first source is the bus input (BI) port. The second input source is the bus input-output (BIO) port, which not only can receive data from the associated 8-bit, but also can transmit data as well by means of tri-state drivers. The third input data source is the microfield (MF) which can be used to enter constants from the micromemory when not needed for internal control of the RSU.

The data source selection and internal operations are determined by five microcontrol bits. The bus input load (BIL) bit commands that one of the bus input sources be loaded. The bus select designator (BSD) determines which bus is selected and the bus load designator (BLD) determines where the data are to be stored. The micro-field (MF) is selected as data when the micro-field input enable (MFIE) bit is true and the micro-command (MC) bit is false.

The RSU has two internal 8-bit registers that can be loaded in 4-bit groups. The source register (SR) 100 normally will contain the R and T register designators for the GPU(s) associated with an RSU. The upper 4-bits in the SR ($SR_{7-4}$) normally supplies the R field for the GPU and the lower 4-bits of the SR ($SR_{3-0}$) normally supplies the T field.

The second internal RSU register is the operations register (OR) 102. The (OR) may be used as a temporary register for transferring constants from micromemory to a GPU, as a shift count register, as an alternate source for the register select outputs, and as a split counter where the upper 4-bits are incremented until they are equal to the lower 4-bits. By proper selection of micro-field bits, either half of the SR 100 may be loaded with the incremented or decremented OR 102 values at the same time that the new values are loaded into the OR.

The RSU also contains a temporary register which holds the updated OR value for one-half clock period. This register is used only to isolate the previous and next values of the OR and cannot be used for additional internal storage.

The R and T outputs of the RSU are each 4-bit outputs intended to control the register selection inputs to a bank of CPUs. Each output set (4 bits) has a 2:1 multiplexer and a half-adder. The ($R_{3-0}$) outputs can present $SR_{7-4}$, ($SR_{7-4}$)+1, $OR_{3-0}$, or ($OR_{3-0}$)+1 to the GPU set. The $T_{3-0}$ outputs can present $SR_{3-0}$, ($SR_{3-0}$)+1, $OR_{7-4}$, or ($OR_{7-4}$)+1 to the GPU set. The 4-bit code which selects 2 of the above 8 possibilities is stored in the register select register by a microcode command (LDRS). The register select control word may be overridden but not lost by a logic 1 on the default input. In the default mode the R outputs reflect $SR_{7-4}$ and the T outputs reflect $SR_{3-0}$.

The BIO outputs are made active by a bus output microcommand. The Bus Output command has 6 possible modes which are:

(a) Decode $OR_{3-0}$ and output a one-of-eight decode for values of $OR_{3-0}$ between 0 and 7 inclusive.

(b) Decode $OR_{3-0}$ and output a one-of-eight decode for values of $OR_{3-0}$ between 8 and 15 inclusive.

(c) Output $OR_{7-0}$ on $BIO_{7-0}$.

(d) Output $OR_{3-0}$ on $BIO_{3-0}$ and output logic zero on $BIO_{7-4}$.

(e) Output logic zeros on $BIO_{7-0}$.

(f) Output the sign of OR (OR 7) on each line of $BIO_{7-0}$.

The micro-command "loop" which is used to iteratively alter the contents of the OR and SR registers has these modes:

(a) Decrement OR and store the result in OR.

(b) Decrement OR and store the result in OR and also store the result in one or both halves of SR. If enabled, $SR_{3-0}$ receives the lower 4-bits of the decremented result while $SR_{7-4}$, if enabled, receives the upper 4-bits of the decremented result.

(c) Transfer $OR_{7-0}$ to $SR_{7-4}$ and/or $SR_{3-0}$.

(d) Increment $OR_{7-4}$ and store in $OR_{7-4}$, $OR_{3-0}$ is unaffected.

(e) Increment $OR_{7-4}$ and store in $OR_{7-4}$ and $SR_{7-4}$, $OR_{3-0}$ and $SR_{3-0}$ are unaffected.

(f) Compare $OR_{7-4}$ to $OR_{3-0}$ and indicate the result on the compare status outut pin. If the two half registers are not equal, increment $OR_{7-4}$ and store in $OR_{7-4}$. $OR_{3-0}$ is unaffected.

(g) Same as 6 except the upper 4-bit result is stored in $SR_{7-4}$ as well as $OR_{7-4}$. $SR_{3-0}$ and $OR_{3-0}$ are unaffected.

(h) Compare $OR_{7-4}$ and $OR_{3-0}$ output the result on the compare status output. $SR_{3-0}$ and $OR_{3-0}$ are unaffected.

(i) Compare $OR_{7-4}$ and $OR_{3-0}$ as in (g) above, but transfer $OR_{7-4}$ to $SR_{7-4}$.

The loop status outputs from the RSU provide internal loop status information to the MCU. The "compare status output" is a logical 1 in the compare operations if $OR_{7-4}=OR_{3-0}$. The loop borrow out signal is the borrow output from the loop decrement operations. The loop borrow output is true if $OR_{7-0}$ is zero during a decrement operation or if $OR_{7-4}$ is 1111 during a compare without increment operation.

FIGS. 5(a), (b), (c) and (d) illustrate a detailed circuit diagram of the logic circuits of the RSU unit. The operations of the circuits will be obvious to a person of ordinary skill in the art in light of the disclosure of these drawings, and a detailed discussion of the circuits will not be given.

The Microcontroller Unit

Referring now to FIG. 7, a block diagram of a MCU unit is shown. The microcontroller (MCU) with micromemory has been designed to efficiently implement the entire control section of a computer. An extensive set of masking and data manipulation functions exist to provide for various combinations of external inputs to be mapped to the microaddress being generated. These types of functions are required to extract specific operation fields within macroinstructions, suboperation codes, and various combinations of status information. The MCU operations are determined by the microfield and synchronized by the clock. The MCU receives data from the bus input and the discrete I/O interface 128. The MCU generates a micromemory address output and certain discrete outputs.

The four stack registers (SR(3)-SR(0)) contained in stack register 116 allow linkages between various microsubroutines. The currently active stack register points to the next micromemory location to be executed. The MCU can go to a microsubroutine by pushing the stack and return from a subroutine by popping the stack. If too many levels of subroutine are called the stack wraps around and the oldest stack register is overwritten with the new stack value. A two bit Stack Pointer (SP) 117 keeps track of which SR is the currently used register.

The five operations Registers (R(4)-R(0)) contained in operations register 120 are dedicated to specific functions such as masking or saving common re-entry points. R(0) and R(1) are pointers to re-entry points that can be given control directly or conditionally. R(2) is a pair of 4-bit mapping registers that can be used to transfer execution to one of 16 micromemory locations depending on other conditions. R(3) is a maskable address register that can be loaded from microcode or from the external bus. R(4) is an address masking register.

The dual timer 118 is a pair of 16-bit counters that can be set up as inner and outer loop timers. Each timer is set up with a count and a set of branch conditions to be executed when the count runs out. Once started, a counter counts microcycles until terminated, pushed, or finished. The outer loop counter is suspended (pushed) by activiation of the inner loop counter. When the inner loop counter runs out, the outer loop counter starts counting on the count at which it was pushed.

The Address Generator 126 is used in determining the next address. The ability exists to mask and right justify (RJ) input fields, as needed, by implementing microcommand 3, the translate command; or microcommand 2, the map command. The control decode 122 of the MCU receives microcode input and based upon the bit structure, determines how the next address will be generated. It also determines which discretes and registers to use for the operations. The control decode section also indicates the proper stack register and governs the reading and writing of that register. It also starts, stops, resets, and restarts the dual timers. The Incrementer 124 receives code from the address generator and, in the normal mode, increments that address for the next microcode instruction. In the two's complement mode it acts as a counter and decrements the count.

Referring now to FIG. 8, the MCU has twelve (12) discrete inputs that connect various functions from other elements within the architecture that directly effect the flow of microcode. Examples of some of the signals that could be assigned to the discrete inputs are as follows: sign of the ALU output; overflow indication; carry out; indication of all zeros out of ALU; completion of load or store multiple; multiplier bits for sequential multiply operation; changing sign of dividend and sign of division for sequential divide operation; and interrupts.

A four bit register, loadable by four of the discrete inputs, is provided for machines requiring a condition code register (CCR). The MCU is the most efficient location for the CCR when discrete inputs are used for deriving status information. Means are also provided to load and store the contents of the CCR for exchange status requirements.

The translate command discussed below uses the discrete inputs to control the execution path. It offers the ability to select and move machine status information based on data from the GPU (or similar ALU) and other parts of the computer. Thus, status information is moved into an appropriate position for efficient micromemory address generation. The discrete inputs are organized as three (3) groups of four (4) bits each, and the CCR is considered a fourth group. The translate command selects one of the four groups and an immediate 4-bit mask identifies the specific bits within the group that are of interest. The masked bits are then right justified and merged into the appropriate low bits of the address pointer forming the next microaddress. The same structure is used by the conditional discrete setup command with the addition of a selected logical operation (AND, OR, XOR, XNOR) to be performed between the bits identified by the mask. A large selection of operand pair options are provided to minimize the number of set-up microinstructions required.

The discrete interface shown in FIG. 7 is further illustrated in FIG. 8. D(7)-D(0) are bidirectional signal pins while D(11)-D(8) are unidirectional inputs having a 4-bit register associated with them. The register bits indicate whether D(11)-D(8) are accepted in true or complement form. The ALU sign and overflow inputs to the controller are time multiplexed to contain the most significant shift input or output when required for the rotate function. Therefore, two pairs of discretes have the ability to pass data in either direction or complete the ALU circular shift macroinstruction.

The lower four discrete bits (D(3)-D(0)) are arranged for connecting the upper and lower shift bits of the GPUs (MXH(1)-(0)) and (MXL(1)-(0)). Under microcode control D(0) connects to D(2) and D(1) connects to D(3), or D(2) connects to D(0) and D(3) connects to D(1), or D(1) ex-or D(0) connects to D(2) and D(1) connects to D(3). The middle four discrete bits (D(7)-D(4)) are primarily used for storing and retrieving status bits. The Condition Code Register (CCR(3)-CCR(0)) can be output via D(7)-D(4) or can be loaded via D(7)-D(4). Alternatively, CCR(3)-CCR(0) can be loaded from (D(11)), D(10), D(1), (D(0)) or (D(11)), D(10), D(1), (D(1)-W-D(0)) or (D(11)), D(10), (D(1)-W-D(0), (DO).

Referring once again to FIG. 7, each MCU receives a 13-bit microcode control word from its associated micromemory unit. This control word is used to generate the next micromemory address. In addition to the microcode control word, each MCU receives an 8-bit data but input and several discrete signal inputs. The following Legend is a legend of the signals received by each MCU.

| LEGEND | |
|---|---|
| LABEL | DESCRIPTION |
| $MF_0$ | Control Word Input - $Bit_0$ |
| $MF_1$ | Control Word Input - $Bit_1$ |
| $MF_2$ | Control Word Input - $Bit_2$ |
| $MF_3$ | Control Word Input - $Bit_3$ |
| $MF_4$ | Control Word Input - $Bit_4$ |
| $MF_5$ | Control Word Input - $Bit_5$ |
| $MF_6$ | Control Word Input - $Bit_6$ |
| $MF_7$ | Control Word Input - $Bit_7$ |
| $MF_8$ | Control Word Input - $Bit_8$ |
| $MF_9$ | Control Word Input - $Bit_9$ |
| $MF_{10}$ | Control Word Input - $Bit_{10}$ |
| $MF_{11}$ | Control Word Input - $Bit_{11}$ |
| $MF_{12}$ | Control Word Input - $Bit_{12}$ |
| $BI_0$ | Bus Input - $Bit_0$ |
| $BI_1$ | Bus Input - $Bit_1$ |
| $BI_2$ | Bus Input - $Bit_2$ |
| $BI_3$ | Bus Input - $Bit_3$ |
| $BI_4$ | Bus Input - $Bit_4$ |
| $BI_5$ | Bus Input - $Bit_5$ |
| $BI_6$ | Bus Input - $Bit_6$ |
| $BI_7$ | Bus Input - $Bit_7$ |
| $DIO_0$ | Discrete Input/Output - $Bit_0$ |
| $DIO_1$ | Discrete Input/Output - $Bit_1$ |
| $DIO_2$ | Discrete Input/Output - $Bit_2$ |
| $DIO_3$ | Discrete Input/Output - $Bit_3$ |
| $DIO_4$ | Discrete Input/Output - $Bit_4$ |
| $DIO_5$ | Discrete Input/Output - $Bit_5$ |
| $DIO_6$ | Discrete Input/Output - $Bit_6$ |
| $DIO_7$ | Discrete Input/Output - $Bit_7$ |
| $DI_8$ | Discrete Input - $Bit_8$ |
| $DI_9$ | Discrete Input - $Bit_9$ |
| $DI_{10}$ | Discrete Input - $Bit_{10}$ |
| $DI_{11}$ | Discrete Input - $Bit_{11}$ |
| CLK | Input Clock |
| TSC | Tri-State Control |
| RST | Input Reset |
| $MAO_0$ | Memory Address Output - $Bit_0$ |
| $MAO_1$ | Memory Address Output - $Bit_1$ |
| $MAO_2$ | Memory Address Output - $Bit_2$ |
| $MAO_3$ | Memory Address Output - $Bit_3$ |
| $MAO_4$ | Memory Address Output - $Bit_4$ |
| $MAO_5$ | Memory Address Output - $Bit_5$ |
| $MAO_6$ | Memory Address Output - $Bit_6$ |
| $MAO_7$ | Memory Address Output - $Bit_7$ |
| $MAO_8$ | Memory Address Output - $Bit_8$ |
| $MAO_9$ | Memory Address Output - $Bit_9$ |

Each control word is decoded to generate one of eight possible MCU microcommands: (1) an unconditional branch immediate; (2) an unconditional branch immediate and link; (3) a map command; (4) a translate command; (5) a load registers command; (6) a conditional discrete operation; (7) a count command; and (8) a sub-operations command. The MCU control word is broken into 4 fields. The upper three bits (MF12-MF10) specify the microcommand. The next two bits (MF9-MF8) are page bits that are passed through the controller except during system reset, when they are forced to zero, and "same address", when previous value is used. (The page bits are used in systems having micromemory in excess of 256 words). The next 4-bit field (MF7-MF4) is either a branch address or a sub-command. The final 4-bit field (MF3-MF0) can be a branch address, a mask, or data to be loaded into a register half or counter half.

The following is a detailed discussion of each microcommand:

Unconditional Branch Immediate

Microcommand 0 is the unconditional branch command. The lower 10 bits (MF9-MF0) are the address of the next microinstruction. The lower 8-bit portion of the microcommand is incremented and loaded into the currently active stack register (SR).

The unconditional branch is the normal mode for the transfer of program control to a predetermined address in micromemory, other than the next sequential address, with no interest in returning to the present location. This instruction is conventional in most controllers.

UNCONDITIONAL BRANCH IMMEDIATE

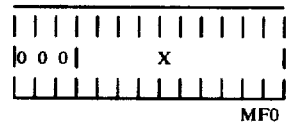

X = Immediate Address
OPERATION:
X → MAO (Memory Address Out)
(MAO) + 1 → SR (N) (Stack Register)

Unconditional Branch Immediate and Link

Microcommand 1 is the branch and link command. The lower 10 bits are the next address as in command 0. However, the stack pointer is incremented prior to loading the incremented lower 8-bit portion of the microcommand into a stack register. The normal effect of a branch and link command is to leave the previously active SR pointing to the location in micromemory just past the branch and link command. Execution then progresses using the new SR until a return is executed. A return causes the controller to pick the next address from the previously active SR. BRL is the MCU method of providing for a subroutine "CALL". In addition to preforming an unconditional branch, BRL saves the return address (address of the BRL instruction + 1) in its stack.

This instruction is used for the execution of frequently used sections of common code stored only once in the micromemory. An example of a subroutine entered in this manner would be one to perform normalization, which would be used by all floating point macroinstructions.

UNCONDITIONAL BRANCH IMMEDIATE & LINK

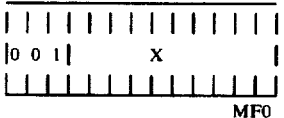

X = Immediate Address
OPERATION:
X → MAO
(MAO) + 1 → SR(N+1) (New Stack Register)

Map

Microcommand 2 is the map command. The lower 4-bits (MF3-MF0) are a mask and the second 4-bits (MF7-MF4) are sub-commands. The next micromemory address is determined as in Table 19. Any bits needed for the lower 4-bits of the microaddress that are not supplied by the masking operation are zeros. Table 20 shows an example of the masking operation for various mask values. The lower 8-bit portion of the address is incremented and loaded into the currently active SR.

The MAP instruction provides for making branches to one of several adjacent entry points based upon masked extraction from the contents of Registers R2 or R3, or the BUSIN data lines. Macroinstruction data is entered via the BUSIN port and contains a subset of execution codes (Add, Subtract, Multiply, etc.) of interest to the MCU. With the MAP instruction, the field of bits defining the subset is extracted and mapped to a predetermined section of micromemory. This technique is the most efficient means, from both space and speed considerations, of establishing a set of subroutine entry points.

MAP

```
| | | | | | | | | | | | |
|0 1 0| P |   C   |   M   |
|_|_|_|_|_|_|_|_|_|_|_|_|
                        MF0
```

P = Page bits (not required if Memory is 256 words or smaller)
C = Control
M = Immediate MASK
OPERATION:
C: MF4 - Selection of BusIN (3−0)/R3
  (3−0) for lower character source
  MF5 - Selection of Bus IN (7−4)/R3
  (7−4) for upper character source
  MF6 - (OR) mask with upper character/
  (AND) mask with lower character
  MF7 - Both selected character out -
  masking operation specified
  by MF6/ character defined by
  MF6 as lower character source
  masked by m - upper character
  supplied by R2 (7−4)

TABLE 19
COMMAND 2 SUBCOMMANDS
M=MASK=MF3-MF0

| MICRO-COMMAND MF7-MF4 | | NEXT MICRO ADDRESS BITS 7-4 | NEXT MICRO ADDRESS BITS 3-0 |
|---|---|---|---|
| 0 | 0000 | Bus In 7-4 VM | Bus In 3-0 |
| 1 | 0001 | Bus in 7-4 VM | R3 3-0 |
| 2 | 0010 | R3 7-4 VM | Bus In 3-0 |
| 3 | 0011 | R3 7-4 VM | R3 3-0 |
| 4 | 0100 | Bus In 7-4 | (Bus 3-0 M) RJ |
| 5 | 0101 | Bus In 7-4 | (R3 3-0 M) RJ |
| 6 | 0110 | R3 7-4 | (Bus In 3-0 M) RJ |
| 7 | 0111 | R3 7-4 | (R3 3-0 M) RJ |
| 8 | 1000 | R2 3-0 | (Bus In 3-0 M) RJ |
| 9 | 1001 | R2 3-0 | (R3 3-0 M) RJ |
| A | 1010 | R2 3-0 | (Bus In 7-4 M) RJ |
| B | 1011 | R2 3-0 | (R3 7-4 M) RJ |
| C | 1100 | R2 7-4 | (Bus In 3-0 M) RJ |
| D | 1101 | R2 7-4 | (R3 3-0 M) RJ |
| E | 1110 | R2 7-4 | (Bus In 7-4 M) RJ |
| F | 1111 | R2 7-4 | (R3 7-4 M) RJ |

RJ = RIGHT JUSTIFY
V = OR
∩ = AND

TABLE 20
MASKING OPERATION RESULTS FOR MICROCOMMAND 2

| MASK | BIT 4=0 | BIT 4=1 |
|---|---|---|
| 0 | 0 | 0 |
| 1 | $000B_0$(Bus In Bit 0) | $000R_3_0$ |
| 2 | $000B_1$ | $000R_3_1$ |
| 3 | $00B_1B_0$ | $00R_3_1R_3_0$ |
| 4 | $000B_2$ | $000R_3_2$ |
| 5 | $00B_2B_0$ | $00R_3_2R_3_0$ |
| 6 | $00B_2B_1$ | $00R_3_2R_3_1$ |
| 7 | $0B_2B_1B_0$ | $0R_3_2R_3_1R_3_0$ |
| 8 | $000B_3$ | $000R_3_3$ |
| 9 | $00B_3B_0$ | $00R_3_3R_3_0$ |
| A | $00B_3B_1$ | $00R_3_3R_3_1$ |
| B | $0B_3B_1B_0$ | $0R_3_3R_3_1R_3_0$ |
| C | $00B_3B_2$ | $00R_3_3R_3_2$ |
| D | $0B_3B_1B_0$ | $0R_3_3R_3_1R_3_0$ |
| E | $0B_3B_2B_1$ | $0R_3_3R_3_2R_3_1$ |
| F | $B_3B_2B_1B_0$ | $R_3_3R_3_2R_3_1R_3_0$ |

Translate

Microcommand 3 is the translate command. Bits 3-0 form a mask and Bits 7-4 comprise a subcommand field. In the subcommands, Bits 5 and 4 select one of the 3 sets of discrete inputs or the conduction code register (CCR). Bits 7 and 6 select one of four masking operations the sixteen possible operations the sixteen possible operations are delineated in Table 21.

In Table 21, SRN is the current stack register and the notation "SRN 3-x" indicates that bits are brought down from SRN to fill the slots not filled by the masking operation. An example of the mask and right justify operation is given in Table 22.

In subcommands 4-8 and C-F, the stack register is not updated. This feature allows a routine such as multiply or divide to be set up in which the controller is continuously translating until interrupted by one of the timers running out. Otherwise, the lower 8-bit portion of the address is incremented and loaded into the currently active SR.

The XLT instruction is probably the second most common instruction, after BR. This instruction performs branches to addresses derived from various portions of the current SR, the discrete I/O lines, the condition code register (CCR), and a microcode supplied mask. Its most common use is as a "computed go to" based on the value of some combination of discrete lines. Virtually every test within the microcode will be performed with an XLT, whether it be testing to determine if indexing is to be performed or checking a shift count for completion. Some instructions (multiply, divide, count ones) use long sequences of XLT instructions, each translating to another XLT instruction, until finally some condition causes termination.

TRANSLATE

```
| | | | | | | | | | | | |
|0 1 1| P |   C   |   M   |
|_|_|_|_|_|_|_|_|_|_|_|_|
                        MF0
```

P = Page bits
C = Control
M = Immediate MASK
OPERATION:
P → MAO (9−8)
C: MF4, MF5 - Input set selection -continued
TRANSLATE (D (3–0)/D (7–4)/D (11–8)/CCR)
MF6 - No Register Reference/Register Reference
MR7 - If Register Reference, MASK/BIAS
- Automatic Mask Selection of Input set selected
- Insertion of Discretes selected, right Justified, into SR(N).

TABLE 21
TRANSLATE COMMAND SUBCOMMANDS
Next Micro Address Out

| | B7-4 | MAO 7-4 | MAO 3-0 |
|---|---|---|---|
| 0 | 0000 | $SRN_{7-4}$ V0000 | $SRN_{3-x}$, $(D_{3-0} \cap M)$ RJ |
| 1 | 0001 | $SRN_{7-4}$ V0000 | $SRN_{3-x}$, $(D_{7-4} \cap M)$ RJ |
| 2 | 0010 | $SRN_{7-4}$ V0000 | $SRN_{3-x}$, $(D_{11-8} \cap M)$ RJ |
| 3 | 0011 | $SRN_{7-4}$ V0000 | $SRN_{3-x}$, $(CCR_{3-0} \cap M)$ RJ |
| 4 | 0100 | $SRN_{7-4}$ V M | $SRN_{3-x}$, $(D_{3-0} \cap R_{43-0})$ RJ |
| 5 | 0101 | $SRN_{7-4}$ V M | $SRN_{3-x}$, $(D_{7-4} \cap R_{43-0})$ RJ |
| 6 | 0110 | $SRN_{7-4}$ V M | $SRN_{3-x}$, $(D_{11-8} \cap R_{43-0})$ RJ |
| 7 | 0111 | $SRN_{7-4}$ V M | $SRN_{3-x}$, $(CCR_{3-0} \cap R_{43-0})$ RJ |
| 8 | 1000 | $SRN_{7-4}$ V0001 | $SRN_{3-x}$, $(D_{3-0} \cap M)$ RJ |
| 9 | 1001 | $SRN_{7-4}$ V0001 | $SRN_{3-x}$, $(D_{7-4} \cap M)$ RJ |
| A | 1010 | $SRN_{7-4}$ V0001 | $SRN_{3-x}$, $(D_{11-8} \cap M)$ RJ |
| B | 1011 | $SRN_{7-4}$ V0001 | $SRN_{3-x}$, $(CCR_{3-0} \cap M)$ RJ |
| C | 1100 | $SRN_{7-4}$ V $R_{47-4}$ | $SRN_{3-x}$, $(D_{3-0} \cap M)$ RJ |
| D | 1101 | $SRN_{7-4}$ V $R_{47-4}$ | $SRN_{3-x}$, $(D_{7-4} \cap M)$ RJ |
| E | 1110 | $SRN_{7-4}$ V $R_{47-4}$ | $SRN_{3-x}$, $(D_{11-8} \cap M)$ RJ |
| F | 1111 | $SRN_{7-4}$ V $R_{47-4}$ | $SRN_{3-x}$, $(CCR_{3-0} \cap M)$ RJ |

The current Stack Register ($SRN_{7-0}$) is updated for sub-ops 0–3 and 8–B, but is unchanged for sub-ops 4–7 and C–F.

TABLE 22
M-CONTROLLER TRANSLATE INSTRUCTION LOWER BITS

| MASK | RESULT | |
|---|---|---|
| 0 | $R_3R_2R_1R_0$ | $R_{3-0}$ is the current Stack Register (SRN) |
| 1 | $R_3R_2R_1D_0$ | |
| 2 | $R_3R_2R_1D_1$ | |
| 3 | $R_3R_2D_1D_0$ | |
| 4 | $R_3R_2R_1D_2$ | |
| 5 | $R_3R_2D_2D_0$ | |
| 6 | $R_3R_2D_2D_1$ | |
| 7 | $R_3D_2D_1D_0$ | |
| 8 | $R_3R_2R_3D_0$ | |
| 9 | $R_3R_3D_1D_0$ | |
| A | $R_3R_2D_3D_1$ | |
| B | $R_3D_3D_1D_0$ | |
| C | $R_3R_2D_3D_2$ | |
| D | $R_3D_3D_2D_0$ | |
| E | $R_3D_3D_2D_1$ | |
| F | $D_3D_2D_1D_0$ | |

Load

Microcommand 4 is the load command. This instruction allows the lower 4-bits of the command MF3-MF0 to be loaded into one of 16 half registers. The next micromemory address comes from the current SR. The current SR is then incremented. Table 23 is a list of the destination addresses.

The load command is used to preset the value of the general registers (R0-R4), CCR, the TC mask register, or the counter holding registers. Since LD only loads 4 bits per instruction, two instructions are normally required for each register. With the exception of the CCR and R3 (temporary for BUSIN) the contents are only changed with a load instruction. The registers should primarily be used to store values required by frequently entered routines (e.g., fetch, operand classification, etc.) that would be loaded during the initialization sequence.

LOAD

```
| | | | | | | | | | | | |
|1 0 0| P |   A   |   M   |
| | | | | | | | | | | | |
```

P = Page Bits
A = Register Selection
M = Immediate Data
OPERATION:
P, SR(N) → MAO9–0
MAO (7–0) + → SR(N)
M → (Register) A

TABLE 23
LOAD COMMAND SUBCOMMANDS

| MICROCOMMAND MF7-MF4 | DESTINATION OF MF3-MF0 |
|---|---|
| 0 | R0 lower |
| 1 | R0 upper |
| 2 | R1 lower |
| 3 | R1 upper |
| 4 | R2 lower |
| 5 | R2 upper |
| 6 | R3 lower |
| 7 | R3 upper |
| 8 | R4 lower |
| 9 | R4 upper |
| A | True/complement Mask for Discrete *11-8 |
| B | Condition Code Register (CCR3-CCR0) |
| C | Outer Timer Register lower holding register (TB3-TB0) |
| D | Outer Timer Register upper holding register (TB7-TB4) |
| E | Inner Timer Register lower holding register (TA3-TA0) |
| F | Inner Timer Register upper holding register (TA7-TA4) |

*0 = ) True
1 = ) Complemented

Conditional Discrete Operations

Microcommand 5 is the conditional discrete setup command. MF5-MF4 select one of four sets of four signals from the discrete interface section to be examined. MF3-MF0 is a mask that selects which of the four signals selected by MF5-MF4 are to be examined by the controller. MF7-MF6 select the logical operation to be performed on the selected inputs. If the mask is zero, the current CCR is used as a mask. MF7-MF4 and the mask are latched for later use. Table 24 lists the microcommand 5 operations.

Once a command 5 has set up a discrete operation, the result of the prescribed logical function is sampled during subsequent operations until a command 7 is executed. During command 7, the MCU examines the latest discrete operation result, and branches based on a portion of the command 7 code. Unless the resulting branch directs the MCU to repeat the instruction (i.e. branch to the same address) the discrete operation is cancelled at the start of the next instruction. If no discrete operation is pending, then command 7 takes the "true" branch.

Due to data path conflicts, the discrete operation result is not sampled during command 3 or during most of the command 7 subcommands. The F subcommand of command 7 allows discrete result sampling and immediate branching on the sampled result.

The CD instruction is the most flexible of the conditional testing operations. CD allows for four logical operations (OR, AND, XOR, XNOR) to be performed on any combination of discrete lines within a set ($D_{3-0}$, $D_{7-4}$, or $D_{11-8}$) or the CCR. The CD instruction does not itself initiate a branch operation, but rather establishes the conditions under which a branch will or will not later be taken. CD is most commonly used for such macro-level instructions as conditional jumps. Such macro-level instructions represent a large body of microcode, wherein each sequence is identical to the other except for the conditions to be tested (zero, less than zero, greater than or equal to zero, etc.). Using the CD instruction, a different set of conditional tests can be established (each in a single line of microcode) for each conditional jump. Once single sequence of microinstructions can then be executed to take the jump (or not), regardless of the conditions established for jumping.

CONDITIONAL DISCRETE OPERATIONS

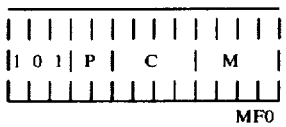

MF0
P = Page Bits (for next address)
C = Control & Selection
M = Immediate Mask
OPERATION:
C: MF5, MF4 - Input Set Selection
    (D(3−0)/D(7−4),/D(11−8)/CCR)
MF7, MF6 - Operation on masked inputs
    (OR, AND, XOR, XNOR)
P, SR(N) → MAO (9−0)
MAO (7-0) + 1 → SR(N)

TABLE 24

| COMMAND 5 OPTIONS | | | |
|---|---|---|---|
| | | MF7-MF6 | MF5-MF4 |
| 0 | 00 | OR | Discrete 3-0 |
| 1 | 01 | AND | Discrete 7-4 |
| 2 | 10 | XOR | Discrete 11-8 |
| 3 | 11 | XNOR | CCR 3-0 |
| MASK | | RESULT IF MF7-MF4 = 000 | |
| 0000 | | * | |
| 0001 | | $DI_0$ | |
| 0010 | | $DI_1$ | |
| 0011 | | $DI_1 \lor DI_0$ | |
| 0100 | | $DI_2$ | |
| 0101 | | $DI_2 \lor DI_0$ | |
| 0110 | | $DI_2 \lor DI_1$ | |
| 0111 | | $DI_2 \lor DI_1 \lor DI_0$ | |
| 1000 | | $DI_3$ | |
| 1001 | | $DI_3 \lor DI_0$ | |
| 1010 | | $DI_3 \lor DI_1$ | |
| 1011 | | $DI_3 \lor DI_1 \lor DI_0$ | |
| 1100 | | $DI_3 \lor DI_2$ | |
| 1101 | | $DI_3 \lor DI_2 \lor DI_0$ | |
| 1110 | | $DI_3 \lor DI_2 \lor DI_1$ | |
| 1111 | | $DI_3 \lor DI_2 \lor DI_1 \lor DI_0$ | |

* Operation depends on the CCR when the command 5 was executed.
DI = Discrete Interface Count Microcommand 6 is the immediate count command. Command 6 has two subcommands determined by MF7. If MF7 is a zero, a sequential count is initiated; if MF7 is a one, an iteration count is initiated. In a sequential count subcommand, a count of 1 to 16, determined by MF3-MF0, is loaded into the outer counter unless the outer counter is active, in which case it is loaded into the inner counter and branch conditions determined by MF6-MF4 are loaded into the branch register for that counter. Execution then continues in normal sequence (i.e. starting at the location following the sequential count subcommand and continuing as prescribed by the subsequent instructions) until the count runs out. When the count equals zero a flag is set and the next instruction is determined by the branch instructions that were set up in the sequential count subcommand.

In an iteration count subcommand, the count determined by MF3-MF0 is also loaded into an available counter. However, the branch condition determined by MF6-MF4 is taken immediately. The instruction that results from the branch is then repeated until the count runs out. Execution then continues sequentially from the instruction that was repeated.

The protocol between the inner and outer counter is such that it is not possible for the inner counter to be active unless the outer loop counter has a count sequence pending. Attempting to initiate a third count while the inner counter is activated is an error which will cause the GPU controller to shut off both counters and take the branch conditions associated with the outer counter.

The command 6 branch options are illustrated in Table 25. In the R1 branch option, the contents of R1 provides the next memory address ((R1) MA out). The memory address out is then incremented and the result is loaded into the currently active stack register (MA out + 1 SRn). In the MAP option, memory address bits 7 through 1 are provided by the currently active stack register. Memory address bit 0 is the exclusive-OR of discrete inputs D0 and D1. In the return option, the stack pointer is decremented (popped) and the memory address is provided with the content of the newly activated stack register. Execution continues using the newly activated stack register. In the link option, the stack is pushed by incrementing the stack pointer after having output a memory address from the currently active stack register. Link is used to go to a microsubroutine while RETURN is used to return from a microsubroutine. Finally, RETURN and LINK are used to return momentarily from a subroutine and go immediately back to the beginning of the subroutine, thus saving microcode when a subroutine must be executed multiple times.

The count/iterate instruction provides for two types of counting operations. Both types involve an initial count, which is counted down to zero, and a branch to a specified address, but differ as to the sequence in which these operations occur.

The count of the CNT instruction loads a counter and allows execution of microcode to continue at the next address. The specified branch is taken when the counter runs out, unless the count is terminated prematurely. Thus, the CNT instruction acts similar to "DO LOOPS" seen in some higher level languages, and can even be nested two deep. The CNT type of count is most useful in limiting sequences of microcode to a preset number of execution cycles, without consuming any time within the sequence to check for limits. Should the sequence terminate before the counter ends, the count can be forced to termination by the microcode. Specific uses for CNT involve the microcode sequences for such macro-level instructions as multiply and divide, where a known number of XLT instructions are to be executed before control is to be passed to a clean-up routine.

With the iterate or ITR instruction, the branch is taken immediately upon execution of the ITR. The instruction branched to is then executed "count" number of times, at which point execution continues in a normal fashion from the instruction which was repeated. A prime example of this involves the automatic repetition of a shift-one-bit instruction to make up a multibit shift.

```
                COUNT/ITERATE

| | | | | | | | | | | | |
|1 1 0| P |   C   | M        |
|_|_|_|_|_|_|_|_|_|_|_|_|_|
```

P = Page Bits
C = Control
M = Immediate Count
OPERATION:
    C: MF7 - Iteration (same
                address)/Sequential
    MF (4-6) - Address Sources (Same as
                True Condition Branch
                Options of Micro-
                command 7

If Iterate, bits 4–6 specify the location of the instruction to be iterated. At the conclusion of the iteration, execution follows the normal path specified by the instruction that was iterated.

If sequential, the branch conditions specified by bits 4–6 are stored and a count is started. The next microlocation is the next micro-address. Execution continues in a normal fashion until the count runs out. The previously stored branch conditions then control the next address.

sub-op 2 the CCR is loaded with the selected information during clock phase 2. In sub-op 2, CCR1 is set during phase 2 if D1+D0 is a logical one; however, CCR1 is not reset if D1 t D10 is a logical zero.

Sub-op 8 causes the currently active counter to start over from the count in its holding register. If no counter is active, the outer loop counter is started. The branch conditions to be used by the counter are determined by MF7-MF4 as in Table 27. Unlike most of the other command 7 sub-ops, sub-op 8 causes the MCU to proceed to the following micromemory address. Should an active counter run out while a sub-op 8 is being executed the result is the same as attempting to initialize a third counter register, i.e. all counters are disabled and the outer loop branch conditions are taken.

Sub-op 9 initiates a sequential count as in command 6, except that the count comes from the holding register. The next address and count run-out results are as in sub-op 8, above. Sub-op C stops all counters and does not branch on the stored counter branch conditions. Sub-op D enables an iteration count as in command 6, except that the count comes from the holding register for the activated counter. Sub-op E cancels the currently active counter without taking the branch associated with that counter. Sub-op F samples the discrete operation set up by command 5.

Table 27 shows the branch conditions taken by sub-ops other than sub-ops 8 and 9 when no discrete operation is pending. The meaning of the branch conditions are the same as those in Table 25. Table 28 shows the branch conditions taken by sub-ops other than sub-ops 8 and 9 when a discrete operations is pending. The discrete operation is not sampled during a command 7 sub-ops O-E or a comman 3 (translate).

The sub-operations command is a double directive consisting of a data operation and a branch directive. The data operation is used to load discrete input lines into the condition code register, to transfer data between various discrete lines, and to manipulate the count register. The microcode sequences for all arithmetic macro-level instructions terminate with a sub-operations command specifying four of the discrete

TABLE 25

| | MICROCOMMAND 6 BRANCH OPTIONS | |
|---|---|---|
| MF6-MF4 | BRANCH CONDITION | DESCRIPTION |
| 0 | R1 Branch | (R1) → MAout; MAout + 1 → SRn |
| 1 | Next Address | (SRn) → MAout; MAout + 1 → SRn |
| 2 | MAP | SRN (bits 7-1), DO ⩗ DI → MAout, SRn unchanged |
| 3 | Return | (n) − 1 → n, (SRn) → MAout; MAout + 1 → SRn |
| 4 | R1 Branch and Link | (R1) → MAout, (n) + 1 → n; MAout + 1 → SRn |
| 5 | R0 Branch | (R0) → MAout; MAout + 1 → SRn |
| 6 | Link | (SRn) → MAout; (n) + 1 → n, MAout + 1 → SRn |
| 7 | Return and Link | (n) − 1 → n, SRn → MAout; (n) + 1 → n MAout + 1 → SRn |

MAout = Memory Address out.
SRn = Stack Register pointed to by the Stack Pointer, n.
(R1) = The content of Register 1.
⩗ XOR

Sub-Operations

Microcommand 7 is the sub-op and branch command. MF3-MF0 determine one of 16 discrete and timer operations. MF7-MF4 determine the next address.

The discrete and timer sub-operations are outlined in Table 26. Sub-ops 0-3 are different methods of loading the condition code register (CCR). Except for CCR1 in lines to be loaded into CCR, setting the carry, overflow, negative, and not-zero flags.

The second field is a branch directive specifying one of 16 non-unique branch possibilities. If there is a CD operation pending, each of these branch possibilities will have a true/false option, raising the total of 32 possible branches. It is among these sub branches that the return-from-subroutine is located. Several other branch modes allow indirect branching on the contents of a register. Virtually all macro-level instruction emulation sequences should utilize an indirect branch on Register 1 to branch to the "FETCH" sequence. This allows the branch and the loading of CCR to occur in a single instruction, rather than the two that a BR would require.

```
           SUB-OPERATIONS

| | | | | | | | | | | | | |
|1 1 1| P |   C   |   S   |
|_|_|_|_|_|_|_|_|_|_|_|_|_|
                                  MF0
```

P = Page Bits
C = Next Address
S = Suboperation

TABLE 26

COMMAND 7 SUB OPERATIONS

| MF 3–0 | OPERATION |
|---|---|
| 0 | D11, D10, D1, D0 CCR3–CCR0 |
| 1 | D11, D10, D1, D1 D0 CCR3–CCR0 |
| 2 | D11, D10, (Di (D0∀D0) V CCR2, D0 → CCR3–CCR0 (see Text) |
| 3 | D7–D4 → CCR3–CCR0 |
| 4 | Output CCR3–CCR0 → D7–D4 |
| 5 | Output D1∀D0 → D2 |
| 6 | Output D3, D2 → D1, D0 |
| 7 | Output D0→D3 |
| 8 | Reload Sequential Count (see Text) |
| 9 | Enable Sequential Count (see Text) |
| A | NO-Operation |
| B | Bus In 7–0 → R3    V = XOR |
| C | Stop all counts    V = OR |
| D | Enable Iteration Count (see Text) |
| E | Stop Current Count |
| F | Sample Discrete Operation (set up by command 5) |

TABLE 27

COMMAND 7 BRANCH CONDITIONS (NO DISCRETE OPERATION PENDING)

| MF 7-4 | BRANCH |
|---|---|
| 0 | R1 Branch |
| 1 | Next Address |
| 2 | MAP |
| 3 | Return |
| 4 | R1 Branch and Link |
| 5 | R0 Branch |
| 6 | Link |
| 7 | Return and Link |
| 8 | R1 Branch |
| 9 | Next Address |
| A | Same Address |
| B | Return |
| C | R1 Branch |
| D | R0 Branch |
| E | Return |
| F | Return and Link |

Exception: If sub op 8 or 9, ignore MF7-4 and take next address.

TABLE 28

COMMAND 7 BRANCH CONDITIONS (DISCRETE OPERATION PENDING)

| MF7-MF4 | CONDITION TRUE | CONDITION FALSE |
|---|---|---|
| 0 | R1 Branch | Next Address |
| 1 | Next Address | Same Address |
| 2 | MAP | Next Address |
| 3 | Return | Next Address |
| 4 | R1 Branch & Link | Next Address |
| 5 | R0 Branch | Next Address |
| 6 | Link | Next Address |
| 7 | Return & Link | Next Address |
| 8 | R1 Branch | R0 Branch |
| 9 | Next Address | Return & Link |
| A | Same Address | Next Address |
| B | Return | R1 Branch & Link |
| C | R1 Branch | Same Address |
| D | R0 Branch | Return & Link |
| E | Return | Same Address |
| F | Return & Link | MAP |

Exception: If sub op 8 or 9, ignore MF7-4 and take next address. Attached hereto and marked as Exhibit A is a detailed circuit diagram of one implementation of the MCU unit discussed above, which is incorporated herein by reference for all purposes.

The Bus Interface Unit (BIU)

Turning now to FIG. 11, a block diagram of a typical bus interface unit (BIU), such as BIU 58, is shown. The primary functions provided by the BIU circuit are: (1) to provide a unidirectional interface to a bidirectional bus; (2) to provide a temporary storage for pipelining or ALU extension; (3) to provide protocol and priority for controlling bus activities; (4) to provide a path for transfers from one bus to another; and (5) to shift the temporarily stored data for floating point normalization or accumulator extension. FIGS. 12(a), (b), (c), (d) and (e) illustrate a detailed circuit diagram of a typical BIU circuit. It will be appreciated by one of ordinary skill in the art having the benefit of these drawings and the following disclosure how these circuits operate. Accordingly, a detailed discussion of the BIU circuit of FIG. 12 will not be given.

Still referring to FIG. 11, the BIU circuit is a dual 4-bit slice with one half connecting to the address bus and the other half connecting to the data bus. The unidirectional side of the transfer circuit is an integral part of the CPU data paths. The bi-directional side would be the common connection between the CPU, memory, I/O processor, etc. The source of output for each side of the transfer circuit is selectable from the opposite input of the same circuit, the register associated with each side (Register A 178 or Register B 174), or the selected input of the corresponding transfer circuit in the other 4-bit group (see FIG. 1, BIU 60, 62 64). The latter source allows the transfer of information from one bus to another.

The two sides of the BIU are identified as A and B. The sources of external data are the A and B bus unidirectional input (AI and BI) ports, and the A and B bus bidirectional (AIO and BIO) ports. The AIO and BIO ports both receive and transmit data using tri-state drivers. To complete the interface are two sets of transmit only ports which also incorporate tri-state drivers. These are the A and B bus unidirectional output (AO and BO).

Each of the two registers is identified with one 4-bit side i.e., Register A 178 and Register B 174. This means that data entering the BIU from either defined input (bidirectional or unidirectional) can be immediately loaded into its corresponding register only. When a register is selected as the source for an output, it will be the register associated with that output port. There are also means for transfer of data from one register to the other.

The shifter 182 in the BIU is used to shift the contents of either register. The input to the shifter 182 is selected to be either register A 178 or register B 174 and the destination is also selectable to be either register A or register B. Therefore, the contents of either register can be transferred to the other register via the shifter. There is no provision for exchange. The shifter has the ability to shift its input right 4, right 2, right 1, left 4, left 3, left 2, left 1, or no shift.

The protocol control lines are designed to establish controlled access to the bidirectional bus and eliminate the requirement for a bus scheduler in a less complex system of three or four interactive elements tied to the bus. A BIU circuit contains one set of control lines that are defined to be either send or receive by hardwiring one of the pins to VCC or ground. Therefore, a 16-bit bus interface using 4 BIU circuits will contain 4 sets of control lines that may be defined as required.

One set of control lines defined as "SEND" in one interface to the bus would be wired to and capable of establishing a link with another set of control lines defined as "RECEIVE" in another interface to the bus. These are permanent wiring and functional assignments within a given system. If information must be transferred in both directions between two interfaces on the bus, two sets of control lines are required—one set to establish the link in each direction.

A priority line serially connects all of the BIU circuits within an interface and resolves multiple requests of the same interface. The BIU at the top (most significant position, BIU 58 of FIG. 1) has the highest priority. In the sequence of establishing a link between two interfaces, the remaining sets of control modules in both interfaces are disabled from establishing any higher on lower priority links until the established link has been released.

The receive control (action to be taken by the receiving interface after a link has been established) is previously loaded and stored within a BIU circuit. The interface can therefore be set up by microcontrol to automatically store the information being received into the associated register under the interface link control. The information can then be taken from the register when required. This feature allows low overhead parallel operations required in high performance computers. Alternatively, information can be loaded into the registers and a send command given. The interface link and priority control will automatically complete the transfer when the bus is available.

One input pin of the BIU defines the control input to be either multiple format for microcontrol or single format for specific function control. In the single format mode the abilities do not exist to transfer data between the A and B side, to previously store the receive control word, or to use the shifter. The BIU circuits in the single mode can be set up as a reduced capability interface, such as that desirable for the memory, or can be used as a storage register tied to the CPU bus. In this latter mode, the BIU circuits are being used to implement the two status registers.

Referring still to FIG. 11, an 8-bit control word (CW7-0) selects various operations of the BIU. The most significant bit (CW7) determines whether the remaining bits have multiple definitions to utilize all the capability of the BIU or single definition for specific applications. $CW_7$ is intended to be permanently wired as appropriate. The multiple format control word is intended for use under direct micro-control. The single format mode does not have all of the functions available but requires less active control inputs because some can be hardwired to describe the specific operation.

In single format, CW7 is a logical zero. The other bits are defined as follows:

(a) $CW_0$ allows loading of register B 174 if $CW_0$ = logic 1.

(b) $CW_1$ allows loading of register A 178 if $CW_1$ = logic 1.

(c) $CW_2$ selects either AI or AIO as the input to the A section and BI or BIO as the input to the B section. Logic 1 = bidirectional, logic 0 = unidirectional.

(d) $CW_3$ either register A 174 or AIO as the source for AO and either register A or AI as the source for AIO. Logic 1 = circuit input, logic 0 = register.

(e) $CW_4$ selects AIO and BIO to be either inputs or outputs. Logic 0 = bidirectional output enable.

(f) $CW_5$ chooses either AIO only or both AIO and BIO to be outputs. Logic 0 = output A part only, logic 1 = output A and B parts.

(g) $CW_6$ chooses either register B 174 or BIO as the source for BO and either register B 174 or BI as the source for BIO. Logic 1 = circuit input, logic 0 = register.

The multiple format control word, defined when $CW_7$ is a logical one, selects one of four functions:

(a) Data Flow (DFLO).
(b) Shift.
(c) Load Register and Send Control (LDTR).
(d) Receive Control (LDRC).

The DFLO format defines the sources and flow direction of data. $CW_4$ selects either AI and BI or AIO and BIO as the input data sources. $CW_3$ and $CW_2$ define which of AI, AIO, register A 178, BI or BIO will be output on AO or AIO. $CW_1$ and $CW_0$ control the BO or BIO outputs in the same way, selecting the sources to be BI, BIO, register B 174, AI or AIO.

The shift control format governs the function of the shifter. The contents of register A 178 can be shifted right one bit, right two bits, left one bit or left two bits. $CW_{3-0}$ respectively define these functions. $CW_4$ is not used.

The LDTR format commands are used to initiate a send and also to load register A 178 and register B 174. $CW_4$ initiates a send. $CW_3$ determines whether a read or write operation is being initialized. The other bits control the load operations. The possible operations are:

(a) Load register A 178, register B 174 or both and output on the respective IO.

(b) Output register A 178, register B 174 or both on the respective IO without loading.

(c) Pass data from AI to AIO, BI to BIO or both.

There is also a provision that if the microcode has initiated a send and the microcode is changed before the bus link is established, then register A 178 and register B 174 will default to be the sources for their respective outputs when the link is established.

The function of the LDRC format is to load a 3-bit receive control register ($RC_{3-1}$) normally done during initialization. These bits in conjunction with the "operation input" determine the destination of data received by the BIU via established protocol link. Either $C_1$ or $C_2$ control can be used. The four functions selectable are:

(a) Load both register A 178 and register B 174 from AIO.

(b) Load register A 178 from AIO and register B 174 from BIO.

(c) Output AIO on AO and BIO on BO.

(d) Output AIO on both AO and BO.

$CW_4$ is a bit used to initialize the protocol section, and $CW_0$ is not used.

Protocol

The bus protocol and control section establishes and controls BIU bus operation. The two directional lower and upper signals used to complete the shift paths between circuits are also used to unify the operation of all BIU circuits that make up the interface. The bus interface is disabled when the BIUs are being controlled by the shift format. Each BIU can set up the interface to either receive or send data. The corresponding status information is generated by the establishing BIU and received by the others. The four status states decoded from the two interconnecting signals are:

(a) C0: the wait state.

(b) C1: a receive state in which the BIU expects a response (as in a memory read)

(c) C2: a receive state in which no response is expected (as in a memory read).

(d) C3: the send state.

The BIU will always be in one of these states unless a shift is taking place. The shift functions use the same two interconnecting signals between BIUs.

Each BIU circuit contains eight protocol signals used to establish a link to transfer data to another like interface. One of the signals is hardwired (DIR) to program the remaining seven signals for sent protocol or receive protocol signals. The seven signals are defined as follows:

(a) $\overline{A/RI}$ (Acknowledge/Request In).

(b) $\overline{R/DAI}$ (Response/Data Available IN).

(c) $\overline{RESET/OPIN}$ (Reset/Operation IN).

(d) $\overline{R/AO}$ (Request/Acknowledge Out).

(e) $\overline{OP/RO}$ (Operation/Response Out).

(f) $\overline{DAO}$ (Data Available Out); used only for send.

(g) Clock In (same for both).

Each set of protocol signals would be wired to the corresponding set of protocol signals in another interface between which data is to be transferred via the bidirectional driver. If either interface is already in use, as determined by the state to be other than "C0", the protocol will hold until the interface is free and then establish the link. The linking protocol along with the receive control word automatically sets the flow direction, source, and destination of data for the respective interfaces.

Each BIU hs a set of protocol signals wired to either send or receive. Therefore, a 16-bit interface has four sets of protocol. Two sets of protocol at each interface are required to establish data transfers for both directions. A serial priority line and the status lines resolve simultaneous requests and prevent takeover of an ongoing transfer. FIG. 13 illustrates a possible protocol connection scheme for a three interface bus system.

The Address Selection Unit

Referring now to FIG. 9, a block diagram of a typical ASU unit is shown. There are four primary functions provided by the ASU unit. First, each ASU unit provides resolution and synchronization of address inputs from two independent MCU units to a single section of micromemory 21. Second, each ASU unit provides storage of the current micromemory address while the next micromemory address is being generated in the MCUs. Third, each ASU unit operates to control the duration of the microcycle by controlling the duration of the microcycle clock signal outputted by the ASU. Fourth, each ASU unit provides clock offset for circuits requiring clock delay in relation to other circuits.

Each ASU contains the clock control and the microaddress control circuits for the emulator system. A 10-bit address can be received from two independent microcontrollers, MCU1 32 and MCU2 34 as A and B. The ASU selects the address and clock control bits from the A and B source according to the corresponding request bits and current status. There are three WAIT inputs which can stop the clock outputted by the ASU unit and two HOLD outputs that reflect the STATUS information to other ASUs.

The ASU selects the corresponding pair of bits to control the clock period. BP2 and BP1 are reflected by B selection, while AP2 and AP1 correspond to the A selection. For a clock of 8 MHz (125 nonosecond period) these bits control the clock cycle as shown in Table 29. Synchronized with the clock output is the enabling of the latch to hold the selected address (AO-9 or BO-9). The latches are disabled during phase one and are enabled during phase two of the clock period.

TABLE 29

| AP1/BP1 | AP2/BP2 | CLOCK OUTPUT | |
|---|---|---|---|
| | | Phase 1 (0) | Phase 2 (1) |
| 0 | 0 | 125 ns | 125 ns |
| 0 | 1 | 125 ns | 250 ns |
| 1 | 0 | 250 ns | 125 ns |
| 1 | 1 | 250 ns | 250 ns |

Determination by the ASU as to which address period and inputs to select is controlled by the corresponding request inputs. Examples of control change based on Request sequences is illustrated in Table 30.

TABLE 30

| CURRENT CYCLE | | NEXT CYCLE | | RESULT |
|---|---|---|---|---|
| REQ. A | REQ. B | REQ. A | REQ. B | (Next Cycle) |
| 0 | 0 | 0 | 0 | no change |
| 0 | 0 | 0 | 1 | B control |
| 0 | 0 | 1 | 0 | A control |
| 0 | 0 | 1 | 1 | A control |
| 0 | 1 | 0 | 0 | B control |
| 0 | 1 | 0 | 1 | B control |
| 0 | 1 | 1 | 0 | A control |
| 0 | 1 | 1 | 1 | B control |
| 1 | 0 | 0 | 0 | A control |
| 1 | 0 | 0 | 1 | B control |
| 1 | 0 | 1 | 0 | A control |
| 1 | 0 | 1 | 1 | A control |

In Table 30, "no change" means that whatever bit had control, will maintain control. In all cases, whenever a request occurs, it will not be honored until the end of the current cycle. Two HOLD outputs provide select STATUS information in the following manner. If the A/B request is received while a B/A request is being honored, then the AHOLD/BHOLD signal will be output until the A/B request is honored. This select status will remain until the B/A request has been dropped.

The three WAIT inputs are used to STOP the clock low. AWAIT received ruing phase one of the clock period will hold the clock low until the WAIT is released. A WAIT occurring in phase two of the clock period will allow the current cycle to finish and then hold the clock low. The address output is selected from the port (A or B) that had control when the WAIT occurred. After the WAIT is released, the current clock control and request bits determine how long the clock will remain in phase one.

There is an exception to the above cases that occurs when both WAIT 3 and REQUEST B are received. In this instance, the output clock is stopped as with any WAIT, and the B inputs are automatically selected. The B selection occurs even if the request A input is currently active. This function is used for immediate B-controller "takeover" without the A-side execution of an additional microinstruction.

The clock output of each ASU is normally used for the clock input of the same circuits being controlled by the section of micromemory the ASU is addressing. A delayed clock output is generated to circuits required to be stable until after the new microword is stable. The ROM ENABLE output is the NOR function of both clock signals and is used to skew the center transition of the cycle allowing more time for ROM access.

FIGS. 10(a) and (b) illustrate a detailed circuit diagram of an ASU unit. It will be appreciated by those of ordinary skill in the art having the benefit of the disclosures of these drawings and the specification how the circuits illustrated therein operate. Therefore, a detailed discussion will not be given.

The Interrupt Unit (ICU)

Turning now to FIG. 14, in which a block diagram of the ICU 38 is shown, the ICU circuit contains an 8-level priority interrupt system and an 8-bit counter. Both functions are directly expandable with the additional circuits. Some of the features of the ICU are as follows: (1) incoming interrupt requests can either be strobed or captured as selected; (2) contains interrupt mask register, read and write via Bus I/O; (3) on chip storage of interrupt enable bit for multiple chip/class implementation; (4) internal enables and identification comparisons for common microcontrol in multiple ICU implementation; (5) contains 8-level concatenatable priority circuit with 3-bit encode of output; (6) storage of interrupt status while sampling vector; (7) separate input for counter clock; (8) counter can be read or written via Bus I/O; and (9) counter is directly concatenatable.

The ICU can be divided into four functional sections. The first to be described is the interrupt processing section which contains a mask register 214, vector generation, a circuit enable with internal storage, priority resolution, and interrupt request and acknowledge protocol circuitry. There are eight interrupt request lines (IRI 7-0) and eight corresponding acknowledge lines (IAO 7-0). Two inputs (IDI-0) are provided for chip identification.

The interrupt processing section can handle eight levels of interrupts with request 0 having the highest priority. When an interrupt request is received and its corresponding mask bit is true, all of the lower priority interrupts are inhibited. The interrupt system can be selected to operate in either a strobe or save mode. If the MODE line is true, interrupt requests are saved; if false, the device which initiates an interrupt request must hold it until the corresponding interrupt acknowledge is received. Interrupt requests may be initiated at any time. During an output vector instruction, the current interrupt status is latched and later incoming requests are isolated from the priority chain. The interrupt with highest priority is encoded into a three bit vector (V2-0). The interrupt acknowledge is then generated during phase two. This internally disables that incoming request from generating another interrupt until it has cycled. A 5-bit register 228, loadable from the bus is provided to extend the 3-bit interrupt vector to 8-bits.

The clear interrupt input will clear all pending interrupt requests being held and output all the Interrupt acknowledges. The interrupt acknowledge outputs can also be generated via an 8-bit input which comes from the bus as a control operation.

An internally stored interrupt system enable is provided for multiple circuit implementations requiring some circuits to be disabled. The enable or status bit is input and output via a separate bidirectional line. With the interrupt system disabled, the circuit will function like it is removed or shorted out. A priority input will be passed directly as the priority output and the circuit will not respond to a vector output instruction.

In a multiple ICU system with all circuits enabled, the last priority out signal indicates a pending interrupt. With the vector output control instruction requested by all the circuits, only those with an active interrupt request and no priority input (indicating a high priority interrupt) will respond by outputting the corresponding vector on the bidirectional bus.

Also included in the ICU circuits is an 8-bit synchronous up counter 210. The counter is intended for timer application and, therefore, has an independent clock input. The counter is also expandable by connecting the counter out of one circuit into the counter in of the next. The counter is loaded and read via the bidirectional bus with a control instruction input. Control instructions also enable and disable the counter.

The ICU incorporates a bidirectional bus interface. Inputs from the bus are loadable to the mask register 219, vector extension register 228, interrupt acknowledge outputs via request clear 230, and counter 210. Outputs from the ICU are derived from the mask register 214, interrupt vector 226 and 228 and counter 210.

A 6-bit control word (CB5-CB0) specifies which operation the ICU is to perform. CB5 and CB4 are compared to ID1 and ID0 (normally hardwired) respectively to select the circuit in which the operation denoted by CB3-0 is carried out. Table 31 is a list of control instructions and their corresponding operations. The clear interrupts instruction 2 overrides the MODE line so that pending interrupts that have been saved will be cleared and all interrupt acknowledge outputs will be cycled. Instruction 3 causes the state of the interrupt enable status register to be output.

The interrupt enable load instruction 4 loads the internal register from the bidirectional pin. Instruction 5 loads the mask register from the BIO. Instruction 6 outputs an interrupt acknowledge signal on all of the IAO lines for which the corresponding BIO bit is set. Instruction 7 loads the five-bit vector extension register (V7-3) from BIO bits 7-3. Each of these four operations is performed during phase two of the clock.

The instruction (8-B) output the designated contents onto the bidirectional bus. If the output vector instruction B is requested, the ICU output is enabled only if an interrupt request is pending, there is not a higher priority in, and the system is enabled. The control enable comparison (ID1, ID0 compared to CB5 and CB4) has no effect during instruction B.

The counter instructions C-F define operations to control the counter. A load instruction C will store BI0 7-0 into the counter register and hold until the next logic 0 to logic 1 transistion of the timer clock. It must be emphasized that the timer clock may or may not have any correlation with the clock which controls ICU control operations. An enable/disable instruction will start/stop the counter when the timer clock is low. If the instruction is received during the appropriate part of the time clock period, the action is taken immediately. If the instruction is received during the other half of the period, the action takes place after the next timer clock transition. A load and enable instruction loads the counter and enables it with the next logic 0 to logic 1 transition. Also implemented on the ICU circuit is a bidirectional switch and a tri-state driver.

TABLE 31

| CB3-0 | ICU INSTRUCTIONS OPERATION |
|---|---|
| 0,1 | No operation |
| 2 | Clear Interrupts |
| 3 | Output Status |
| 4 | Load Status Register |
| 5 | Load Mask Register from BIO |
| 6 | Channel Acknowledge from BIO |
| 7 | Load Vector Extension Register from BIO |
| 8,9 | Output Counter Register to BIO |
| A | Output Mask Register to BIO |
| B | Output Vector to BIO |
| C | Disable Counter |
| D | Load & Disable Counter |
| E | Enable Counter |
| F | Load & Enable Counter |

Figure 15B:
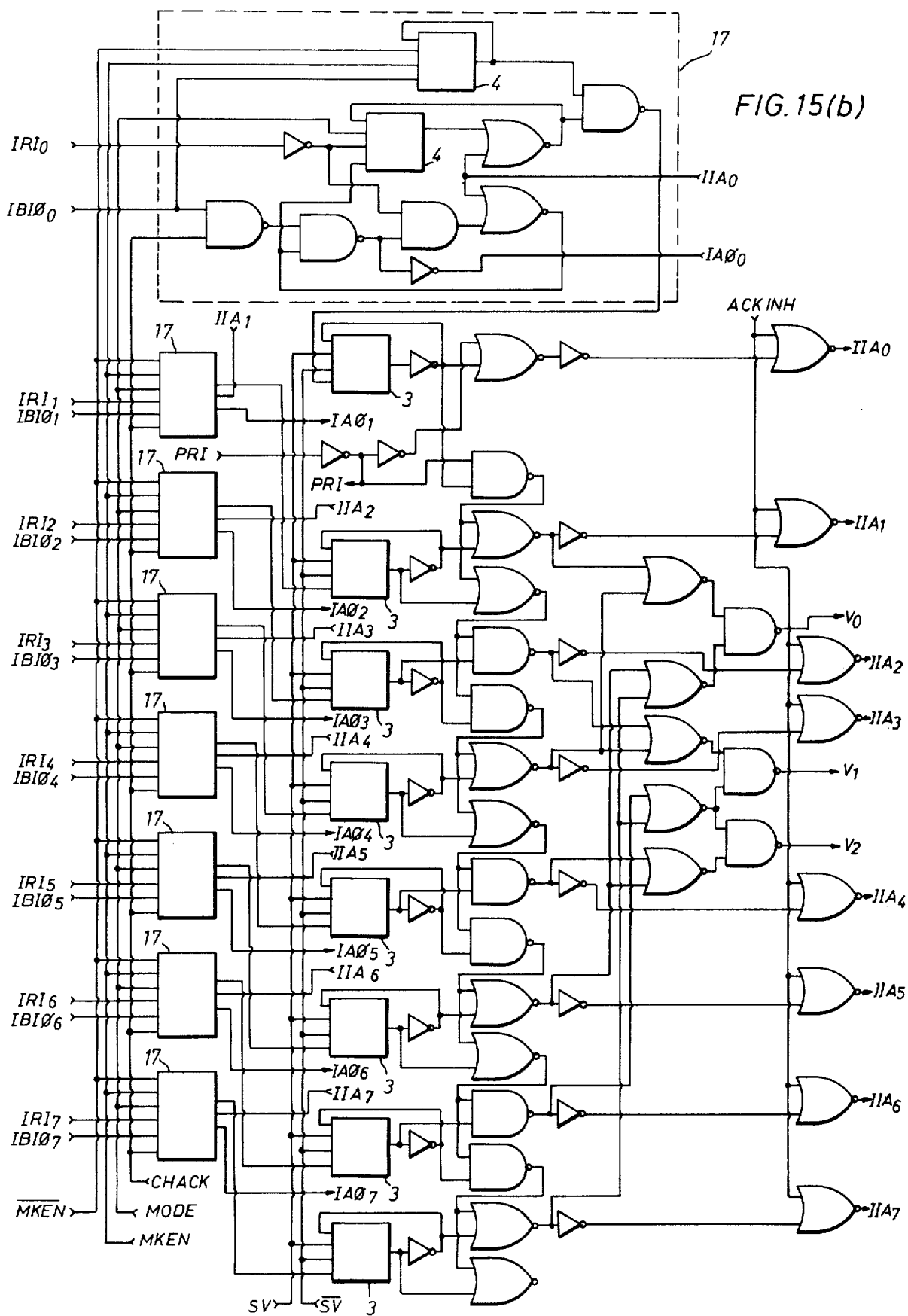
Figure 15C:
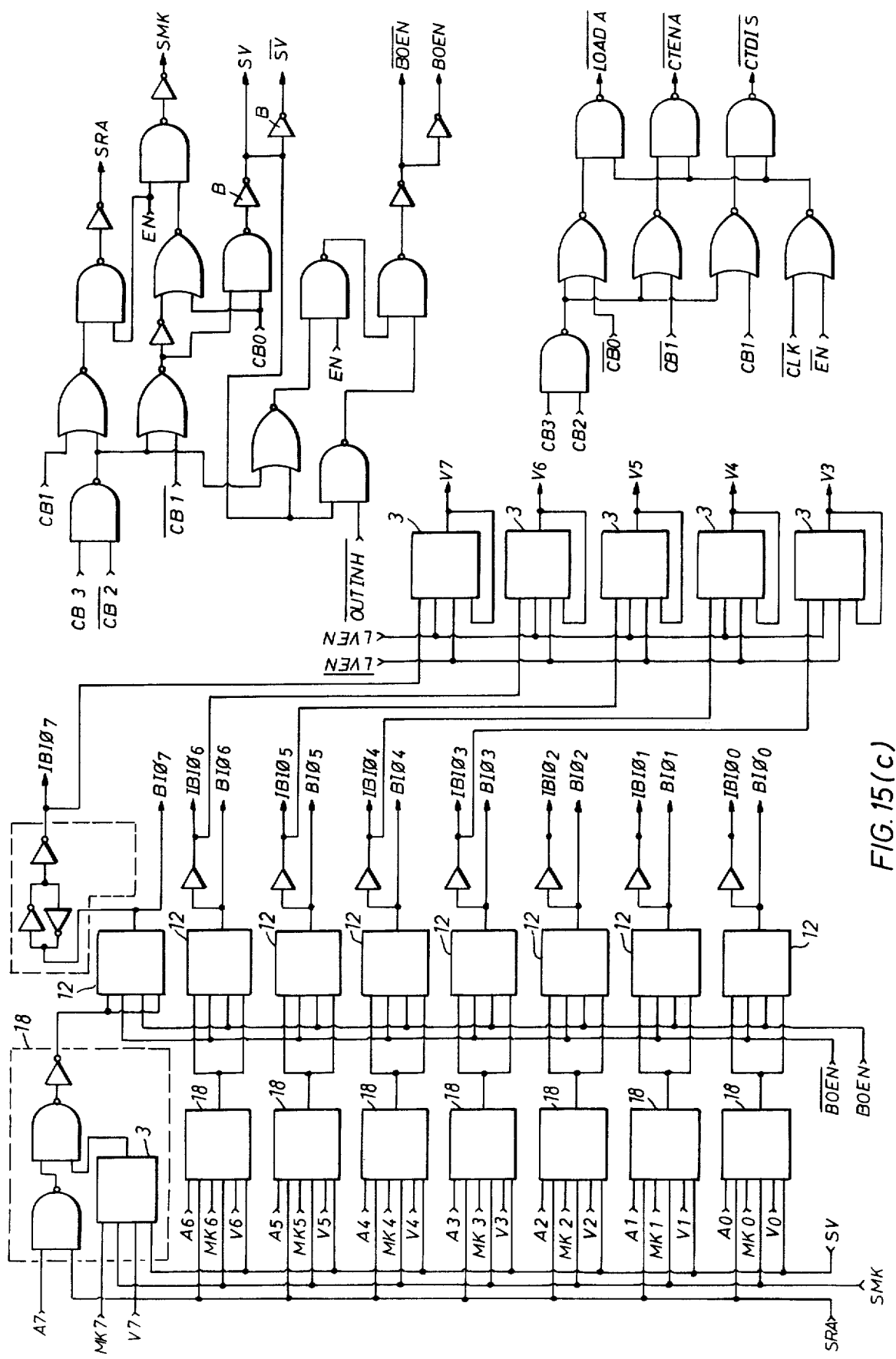

FIGS. 15(a), (b) and (c) illustrate a detailed circuit diagram of an ICU unit. It will be appreciated by a person of ordinary skill in the art having the benefit of these drawings and the above detailed disclosure how the circuits of FIG. 15 operate. Accordingly, a detailed discussion of these circuits will not be given.

The Microcode

The following discussion describes the microcode, how the bits were distributed, and how the instructions are performed. Each microcode word consists of 112 bits divided into 7 banks of 16 bits each. These 7 banks are in turn divided into three sections of memory, one for each of the three address select units (ASU's). The left section (LM 20) is comprised of banks 1, 2 and 3, and is concerned chiefly with the arithmetic computations of UYK-20 macroinstructions. The right section (RM 24) is comprised of banks 5, 6 and 7, and is responsible for the address and addressing mode computation of the macroinstructions. The middle section of micromemory (MM 22) consists of bank 4 only, and is always slaved to either LM or RM. The micromemory breakdown by section and their associated bit assignments are shown in Table 32. MM 22 contains not only important control bits for LM's 20 GPU pairs and RSUs, but also the control field for the vital BIU, and is required by either side needing to communicate with macromemory. Either side of the emulator may request control of no banks, itself, itself and MM 22, or of all three sections as needed for computations. Further, execution by either side may be temporarily suspended pending availability of resources or data. Most noteably, instructions which require significant address computations prior to execution of the arithmetic function almost always suspend operation of LM 20 until the instruction operand has been obtained. This conserves micromemory, and simplifies arithmetic computations.

TABLE 32

| Bit | Name | Description | Destination | Bank |
|---|---|---|---|---|
| 96 | MX8 | MCU page LSB | MCU1 | 1 |
| 95 | MC2 | MCU command | MCU1 | 1 |
| 94 | MC1 | " | MCU1 | 1 |
| 93 | MC0 | " | MCU1 | 1 |
| 92 | MX7 | MCU operand | MCU1 | 1 |
| 91 | MX6 | " | MCU1 | 1 |
| 90 | MX5 | " | MCU1 | 1 |
| 89 | MX4 | " | MCU1 | 1 |
| 88 | MX3 | " | MCU1 | 1 |
| 87 | MX2 | " | MCU1 | 1 |
| 86 | MX1 | " | MCU1 | 1 |
| 85 | MX0 | " | MCU1 | 1 |
| 84 | LNG | 32 bit/long clock low | GPU1,2 | 1 |
| 83 | ECI | Execute carry-in | GPU1,2 | 1 |
| 82 | DU2 | Data type (upper) | GPU2 | 1 |
| 81 | DU1 | " | GPU2 | 1 |
| 80 | DU0 | " | GPU2 | 2 |
| 79 | DL2 | Data type (lower) | GPU1 | 2 |
| 78 | DL1 | " | GPU1 | 2 |
| 77 | DL0 | " | GPU1 | 2 |
| 76 | MU2 | Destination (upper) | GPU2 | 2 |
| 75 | ML2 | Destination (lower) | GPU1 | 2 |
| 74 | M1 | Destination (common) | GPU1,2 | 2 |
| 73 | M0 | " | GPU1,2 | 2 |
| 72 | CA2 | Connect code (M.S. GPU) | GPU2 | 2 |
| 71 | CA1 | " | GPU2 | 2 |
| 70 | CA0 | " | GPU2 | 2 |
| 69 | CB1 | Connect code (CB2 = CD2 = 0) | GPU1,2 | 2 |
| 68 | CC2 | " | GPU1,2 | 2 |
| 67 | CC1 | " | GPU1,2 | 2 |
| 66 | CC0 | " | GPU1,2 | 2 |
| 65 | CD1 | Connect code (CB0 = CD0 = 1) | GPU1,2 | 2 |
| 64 | RQL | Request left bank | ASU1 (REQA) | 3 |
| 63 | A1 | ALC control | GPU1,2 | 3 |
| 62 | A0 | " | GPU1,2 | 3 |

TABLE 32-continued

| Bit | Name | Description | Destination | Bank |
|---|---|---|---|---|
| 61 | RQM | Request middle bank | ASU2 (REQB) | 3 |
| 60 | RQR | Request right bank | ASU3 (REQB) | 3 |
| 59 | DFU | RSU default (upper) | RSU2 | 3 |
| 58 | DFL | RSU default (lower) | RSU1 | 3 |
| 57 | MF8 | RSU MC (combined) | RSU1,2 | 3 |
| 56 | MF7 | RSU operand (combined) | RSU1,2 | 3 |
| 55 | MF6 | " | RSU1,2 | 3 |
| 54 | MF5 | " | RSU1,2 | 3 |
| 53 | MF4 | " | RSU1 | 3 |
| 52 | MF3 | " | RSU1 | 3 |
| 51 | MF2 | " | RSU1 | 3 |
| 50 | MF1 | " | RSU1 | 3 |
| 49 | MF0 | " | RSU1 | 3 |
| 48 | MFIEU | RSU MFIE (upper) | RSU2 | 4 |
| 47 | MFIEL | RSU MFIE (lower) | RSU1 | 4 |
| 46 | S1 | Source Select | GPU1,2 | 4 |
| 45 | S0 | " | GPU1,2 | 4 |
| 44 | BIL | RSU BIL (common) | RSU1,2 | 4 |
| 43 | LSHU | RSU BSD (upper) | RSU2 | 4 |
| 42 | LSHL | RSU BSD (lower) | RSU1 | 4 |
| 41 | LDB | RSU BLD (common) | RSU1,2 | 4 |
| 40 | L35 | Execute GPU tri-state | GPU1 | 4 |
| 39 | CW6 | BIU command | BIU1,2,3,4 | 4 |
| 38 | CW5 | " | BIU1,2,3,4 | 4 |
| 37 | CW4 | " | BIU1,2,3,4 | 4 |
| 36 | CW3 | " | BIU1,2,3,4 | 4 |
| 35 | CW2 | " | BIU1,2,3,4 | 4 |
| 34 | CW1 | " | BIU1,2,3,4 | 4 |
| 33 | CW0 | " | BIU1,2,3,4 | 4 |
| 32 | R2 | R select | GPU3 | 5 |
| 31 | R1 | " | GPU3 | 5 |
| 30 | R0 | " | GPU3 | 5 |
| 29 | CIA | Carry-in | GPU3 | 5 |
| 28 | S1 | Source Select | GPU3 | 5 |
| 27 | S0 | " | GPU3 | 5 |
| 26 | D2 | Data type | GPU3 | 5 |
| 25 | D0 | " | GPU3 | 5 |
| 24 | A1 | ALC control | GPU3 | 5 |
| 23 | M2 | Destination | GPU3 | 5 |
| 22 | M1 | " | GPU3 | 5 |
| 21 | M0 | " | GPU3 | 5 |
| 20 | EXWT | Execute wait | ASU3 (WA173) | 5 |
| 19 | EQL | Request left bank | ASU1 (REQB) | 5 |
| 18 | RQM | Request middle bank | ASU2 (REQA) | 5 |
| 17 | RQR | Request right bank | ASU3 (REQA) | 5 |
| 16 | R3 | R select (R3) | GPU3 | 6 |
| 15 | MC2 | MCU command | MCU3 | 6 |
| 14 | MC1 | " | MCU3 | 6 |
| 13 | MC0 | " | MCU3 | 6 |
| 12 | MX7 | MCU operand | MCU3 | 6 |
| 11 | MX6 | " | MCU3 | 6 |
| 10 | MX5 | " | MCU3 | 6 |
| 9 | MX4 | " | MCU3 | 6 |
| 8 | MX3 | " | MCU3 | 6 |
| 7 | MX2 | " | MCU3 | 6 |
| 6 | MX1 | " | MCU3 | 6 |
| 5 | MX0 | " | MCU3 | 6 |
| 4 | MF3 | RSU2 | RSU2 | 6 |
| 3 | MF2 | " | RSU2 | 6 |
| 2 | MF1 | " | RSU2 | 6 |
| 1 | MF0 | " | RSU2 | 6 |
| x16 | T3 | T select | GPU3 | 7 |
| x15 | T2 | " | GPU3 | 7 |
| x14 | T1 | " | GPU3 | 7 |
| x13 | T0 | " | GPU3 | 7 |
| x12 | A0 | ALC control | GPU3 | 7 |

Execution of AN/UYK-20 emulation microcode begins at microlocation 000 (INIT) following power-up or RESET. Various hardware registers are initialized and the macroinstruction at location 0000 is fetched. Control is then transferred to microlocation 010 (FETCH) for instruction decoding. Several functions are performed at FETCH, some of which are necessary to decode the current instruction, others are useful in the later instruction execution.

(a) Load R3 of both MCUs with the respective outputs of the op-code transform ROM 36. This device maps the 6 bits of the "op-code" and the 2 bits of the "f" field into two addresses representing the instruction function (ADD, SUBTRACT, etc.) and the instruction addressing mode (RL, RR, RX, RI-2, RI-1, or RK).

(b) Load the OR and SR registers of both RSU's with the "a", "m" field of the macroinstruction.

(c) Preset the register select states in both RSUs.

(d) Transfer the contents of the UYK-20 register Rm to the RM holding register.

(e) Initiate a read for the contents of macromemory Pc+1.

(f) Branch to the address received from the op-code transform ROM (with control of MM 22 possessed by RM 24), or to the interrupt processing routine if an active interrupt is present.

Upon transfer from FETCH the RM 24 begins computation of the instruction operand, suspending or taking over control of the LM 20 as necessary. Once the operand is available the LM 20 is allowed to perform whatever operations were called for by the macroinstruction. Any necessary cleanup is performed, and control is returned to FETCH.

The LM-RM splitting of functions allows for a substantial savings in micromemory, while at the same time causing no reduction in macroinstruction execution speed. Because the LM 20 need only be concerned with the functional operation of the instruction, and not with the addressing mode, the same LM microcode can usually be used for all instructions performing the same function. For example, AR, AI, AK, and LA all perform the add function using the exact same microinstructions in LM 20. Further, AK, SUK, CK, LK, etc., all have their operand calculated by the same RM 20 microinstructions. This gives us an instruction matrix, with instruction function representing one ordinate, and addressing mode the other; and a minimum of total microcode. As a further bonus, where operand cleanup and instruction function computation do not require overlapping resources, both sides may operate simultaneously to improve macroinstruction throughput times.

The following Table 33 lists the contents of the micromemory 21 for emulating various macroinstruction of the AN/UYK-20.

TABLE 33

| | AN/UYK-20 Emulation Microcode | | | | | | | | |
|---|---|---|---|---|---|---|---|---|---|
| | Bank Number | | | | | | | Left | Right |
| Addr. | 1 | 2 | 3 | 4 | 5 | 6 | 7 | Entry | Entry |
| 00 | 0010 | 0C00 | 063F | 4060 | 02D7 | 0010 | 0000 | INIT | |
| 01 | 4310 | 4E22 | FF1E | E070 | EA50 | 4314 | 7000 | | |
| 02 | 4200 | 0C00 | 0600 | 0000 | 0057 | 4200 | 0000 | | |
| 03 | 4A80 | 0C00 | 0600 | 0000 | 0047 | 4A00 | 0000 | | |
| 04 | 06E0 | 0C00 | 0600 | 0015 | 0047 | 06E0 | 0000 | | |
| 05 | 7AA2 | 4C42 | 6718 | E000 | CBC7 | BA90 | E000 | RXSUB | RXSUB |
| 08 | 7AA2 | 4C42 | 6600 | 2000 | ABC7 | BA80 | 0000 | | |
| 09 | 7AA0 | 0C00 | 072A | 4098 | 4757 | 3B40 | 6000 | | |
| 0A | 7AA0 | 0C00 | 072F | 4000 | 0047 | 00B0 | 0000 | | |
| 0B | 7AA0 | 0C00 | 0600 | 0E92 | 0047 | 7130 | 0000 | | |
| 0C | 63B2 | 4D22 | DE00 | 0057 | 42CF | 3B30 | 2800 | MR | |
| 0D | 1C72 | 4E22 | DC00 | 0046 | 0040 | 7AA0 | 0000 | | |
| 0E | 00F2 | 4C22 | DF23 | C000 | 0950 | 06E9 | 0000 | | |
| 0F | 7802 | 4042 | 6000 | 1013 | 0043 | 7AA0 | 0000 | MLBFLY | MLBFLY |
| 10 | 71B0 | 0C00 | 0600 | 0912 | 1257 | 71B0 | 0000 | FETCH | |
| 11 | 2302 | 4C22 | 872A | C057 | 2603 | 2309 | 0000 | | |
| 14 | 0000 | 0000 | 0000 | 0098 | 475F | 0080 | 1000 | | |
| 15 | 2300 | 0C00 | 8600 | 0098 | 4AD3 | 73A0 | 2800 | | |
| 16 | 0000 | 0000 | 0000 | 0098 | 4ADF | 0080 | 2800 | | |
| 18 | 0000 | 0000 | 0000 | 0057 | 526F | 00A0 | 2000 | | |
| 19 | 2300 | 0C00 | 8744 | C000 | 0043 | 73A4 | 0000 | | |
| 1A | 2300 | 0C00 | 8744 | C000 | 0043 | 73A4 | 0000 | | |
| 1B | 0000 | 0000 | 0000 | 0057 | 526F | 00A0 | 2000 | | |
| 1C | 0000 | 0000 | 0000 | 0000 | C2DF | 0090 | 2000 | | |
| 1D | 7AA2 | 4C42 | 6600 | 0000 | CAD7 | 0090 | 6800 | | |
| 1E | 0000 | 0000 | 0000 | 0000 | C2DF | 0090 | 1800 | | |
| 1F | 7AA3 | FC42 | 6000 | 0000 | CAD7 | 0090 | 6800 | | |
| 23 | 0000 | 0000 | 0000 | 0098 | 6A59 | 4D10 | 3000 | | |
| 24 | 3033 | F126 | 0400 | 0080 | 5251 | 4CF0 | 2000 | | |
| 25 | 0C23 | F222 | 9C00 | 0080 | 5250 | 71D0 | 2000 | | |
| 26 | 3033 | F126 | 0400 | 0080 | 5251 | 71A0 | 2000 | | |
| 27 | 0C23 | F222 | 9C00 | 0080 | 0047 | 0C20 | 0000 | | |
| 28 | 0290 | 0C00 | 9400 | 0098 | 6A51 | 0280 | 3000 | | |
| 29 | 7173 | F122 | 6600 | 0028 | 0047 | 71A0 | 0000 | | |
| 2A | 71A2 | 7D22 | 0600 | 2098 | 0047 | 71A0 | 0000 | | |
| 2B | 7803 | CD42 | 0600 | 2093 | 0047 | 0350 | 0000 | | |
| 2C | 3930 | 0C00 | 9F14 | 0680 | 0040 | 70AE | 0000 | OP-40 | |
| 2E | 0000 | 0000 | 0000 | 2012 | 0040 | 0350 | 0000 | | |
| 2F | 71B0 | 0C00 | 0000 | 0000 | 4257 | 78A0 | 0000 | WJFETCH | |
| 30 | 70A0 | 0C00 | 0000 | 0000 | 0047 | 70A0 | 0000 | | |
| 31 | 0280 | 0C00 | 9000 | 0000 | 0041 | 0400 | 0000 | | |
| 32 | 0852 | CD22 | E714 | F098 | 6A53 | 0854 | 3000 | | |
| 33 | 0246 | 4C22 | 8714 | E000 | 4853 | 0234 | 2000 | | |
| 34 | 0000 | 0000 | 0000 | 0000 | 0040 | 7800 | 0000 | | RR-SP (DUP) |
| 35 | 78A0 | 0C00 | 0000 | 00C5 | 6267 | 78A0 | 3000 | FETCHHELD | |
| 36 | 70A0 | 4C22 | FA00 | 0000 | 2A50 | 78A0 | 1000 | J40RR | |
| 37 | 02F0 | 0C00 | 0000 | 0057 | 0267 | 02F0 | 1000 | | |
| 39 | 0000 | 0000 | 0000 | 0098 | 2B5B | 3250 | 1000 | | |
| 3A | 0000 | 0000 | 0000 | 0045 | 226B | 03B0 | 1000 | | |
| 3B | 0000 | 0000 | 0000 | 2012 | 0040 | 06E0 | 0000 | | |
| 3E | 70A0 | 0C00 | 9800 | 0018 | 2A50 | 78A0 | 1000 | J40RK | |
| 3F | 02F0 | 0C00 | 0000 | 0057 | 0267 | 02F0 | 1000 | | |

TABLE 33-continued

AN/UYK-20 Emulation Microcode

| Addr. | Bank Number 1 | 2 | 3 | 4 | 5 | 6 | 7 | Left Entry | Right Entry |
|---|---|---|---|---|---|---|---|---|---|
| 40 | 7802 | DF42 | 6600 | 2013 | 0047 | 7AA0 | 0000 | XRBF | |
| 41 | 78A2 | 4022 | 6000 | 1013 | 0047 | 7AA0 | 0000 | BUTFLY2 | |
| 43 | 78A0 | 0C00 | 0611 | 0000 | 6047 | 78A0 | 2000 | WAITFETCH | |
| 44 | 0000 | 0000 | 0000 | 0098 | 6A5B | 0450 | 3000 | | |
| 45 | 0000 | 0000 | 0000 | 0057 | 324B | 0460 | 1000 | | |
| 46 | 0000 | 0000 | 0000 | 0000 | 224B | 0470 | 1000 | | |
| 47 | 0000 | 0000 | 0000 | 0098 | 4A5B | 0480 | 2000 | | |
| 48 | 0000 | 0000 | 0000 | 0057 | 23CB | 0490 | 1000 | | |
| 49 | 0000 | 0000 | 0000 | 0000 | 004B | 04A0 | 0000 | | |
| 4A | 0000 | 0000 | 0000 | 0045 | 43CB | 04B0 | 2000 | | |
| 4B | 0000 | 0000 | 0000 | 209A | 0040 | 0350 | 0000 | | |
| 4C | 39F0 | 0C00 | 9F14 | C000 | 0040 | 70AE | 0000 | OP-02 | |
| 4D | 5C13 | FC22 | 9600 | 0080 | 0041 | 04E0 | 0000 | | |
| 4E | 7003 | FC22 | 9E00 | 0080 | 0040 | 70A0 | 0000 | | |
| 4F | 7805 | BD42 | 0600 | 0000 | 0047 | 70A0 | 0000 | | |
| 50 | 04D0 | 0C00 | 0600 | 0000 | 0047 | 04D0 | 0000 | | |
| 51 | 7003 | FC42 | 0400 | 0000 | 4A57 | 0910 | 2000 | RR | |
| 52 | 7805 | BD42 | 0600 | 0000 | 0040 | 70A0 | 0000 | TCR | |
| 53 | 7801 | BD42 | 0600 | 0000 | 0040 | 70A0 | 0000 | OCR | |
| 54 | 7807 | FD42 | 0600 | 0000 | 0040 | 70A0 | 0000 | IROR | |
| 55 | 0830 | 0C00 | 8602 | C000 | 0043 | 0832 | 0000 | IRTR | |
| 56 | 70A0 | 0C00 | 0600 | 0000 | 0040 | 70A0 | 0000 | ILLEGAL INSTRUCTION | |
| 57 | 70A0 | 0C00 | 0600 | 0000 | 0040 | 70A0 | 0000 | | |
| 58 | 04D0 | 0C00 | 0600 | 0000 | 0047 | 0790 | 0000 | NR | |
| 59 | 70A0 | 0C00 | 0600 | 0000 | 0040 | 70A0 | 0000 | ILL. INST. | |
| 5A | 780D | BD42 | 0400 | 0000 | 0047 | 0A30 | 0000 | TCDR | |
| 5B | 70A0 | 0C00 | 0600 | 0000 | 0040 | 70A0 | 0000 | ILL. INST. | |
| 5C | 7800 | 9E42 | 0714 | E000 | 0040 | 70A4 | 0000 | DROR | |
| 5D | 0830 | 0C00 | 86FE | C000 | 0043 | 083E | 0000 | DRTR | |
| 5E | 70A0 | 0C00 | 0600 | 0000 | 0040 | 70A0 | 0000 | | |
| 5F | 70A0 | 0C00 | 0600 | 0000 | 0040 | 70A0 | 0000 | | |
| 60 | 0000 | 0000 | 0000 | 0000 | 004B | 0610 | 0000 | RK-DBL-SHIFT | |
| 61 | 0000 | 0000 | 0000 | 0098 | C7D3 | 32C0 | 7000 | | |
| 62 | 0000 | 0000 | 0000 | 0057 | 126B | 0690 | 0000 | | |
| 63 | 0000 | 0000 | 0000 | 0057 | 126F | 0430 | 0000 | | |
| 64 | 0000 | 0000 | 0000 | E000 | C7D3 | 32C0 | 7000 | RL-DBL-SHIFT | |
| 65 | 0000 | 0000 | 0000 | 0000 | 004B | 0690 | 0000 | | |
| 67 | 0000 | 0000 | 0000 | 0000 | 004F | 7A80 | 0000 | | |
| 68 | 0690 | 4C22 | 071C | 0000 | C7D3 | 32C0 | 7000 | LRDR | RR-DBL-SHIFT |
| 69 | 7A03 | F262 | 6400 | 0000 | D05B | 5280 | 6000 | | |
| 6A | 06B0 | 4C22 | 071C | 0000 | D253 | 71F0 | 6000 | ASDR | |
| 6B | 7A03 | F282 | 6400 | 0000 | 004F | 0A30 | 0000 | | |
| 6C | 06D0 | 4C22 | 071C | E000 | C7D3 | 32C0 | 7000 | ALDR | RL-SNGL-SH |
| 6D | 7A23 | F123 | 6400 | 0000 | 004B | 0710 | 0000 | | |
| 6E | 06F0 | 4C22 | 071C | 0057 | 1257 | 0430 | 0000 | CLDR | FTCHIN |
| 6F | 7A73 | F122 | 6400 | 0000 | 004F | 7A80 | 0000 | | |
| 70 | 0710 | 4C22 | 071C | 0000 | C7D3 | 32C0 | 7000 | LLRS-LRS-LRSR | RR-SNGL-SHIFT |
| 71 | 7A03 | F266 | 6600 | 0000 | D05B | 5280 | 6000 | | |
| 72 | 0730 | 4C22 | 071C | 0000 | D253 | 71F0 | 6000 | ARS-LARS-ARSR | |
| 73 | 7A03 | F288 | 6600 | 0000 | 004F | 78A0 | 0000 | | |
| 74 | 0750 | 4C22 | 071C | 0000 | 004B | 0750 | 0000 | ALS-LALS-ALSR | RK-SNGL-SHIFT |
| 75 | 7A23 | F133 | 6600 | 0098 | C7D3 | 32C0 | 7000 | | |
| 76 | 0770 | 4C22 | 071C | 0057 | 126B | 0710 | 0000 | CLS-LCLS-CLSR | |
| 77 | 7A73 | F122 | 6600 | 0057 | 126F | 0430 | 0000 | | |
| 78 | 0000 | 0000 | 0000 | 0000 | 004B | 0A60 | 0000 | RI2-STORE-DBL | |
| 79 | 5013 | FC42 | 9600 | 0080 | 0040 | 04E0 | 0000 | | |
| 7B | 7802 | 4E42 | 0600 | 2012 | 0040 | 0350 | 0000 | | |
| 7C | 07D0 | 0C00 | 0124 | 0000 | 004B | 07D0 | 0000 | LXI — LXI | |
| 7D | 07B7 | FD22 | 0000 | 0098 | 6A5B | 07E0 | 2000 | | |
| 7E | 07F3 | FC22 | E74D | C0D7 | 2240 | 07F4 | 1000 | SDI | |
| 7F | 0AA0 | 0C00 | 8746 | 0080 | 3250 | 07B0 | 1000 | | |
| 80 | 7802 | 4E42 | 671C | 0000 | 004B | 0810 | 0000 | LL-LR-LI-LK | RI2 |
| 81 | 0000 | 0000 | 0000 | 0098 | 6A5B | 0AA0 | 2000 | | |
| 82 | 7802 | DE42 | 071C | 0000 | 0041 | 73A0 | 0000 | LA-AR-AI-AK | |
| 83 | 7802 | DE42 | 071E | E000 | 0040 | 70A5 | 0000 | | |
| 84 | 7804 | 9E42 | 071C | 0000 | 0040 | 7800 | 0000 | SUK-LSU-SUR-SUIRR-SNGL-MATH | |
| 85 | 08A3 | FC22 | 9714 | 0046 | 0041 | 08A4 | 0000 | | |
| 86 | 0872 | 4C22 | F71C | 0000 | 0041 | 69D0 | 0000 | LC-CR-CI-CK | IT15 |
| 87 | 7804 | 9C42 | B600 | 0000 | 0041 | 0820 | 0000 | | |
| 8A | 3040 | CE22 | 6600 | 3028 | 0041 | 1400 | 0000 | | |
| 8B | 3047 | CE22 | 0600 | 3028 | 0047 | 0350 | 0000 | | |
| 8C | 0400 | EE22 | DE00 | 0000 | 004B | 08D0 | 1000 | XORK-XORR-XORIRI2-SNGL-MATH | |
| 8D | 0000 | 0000 | 0000 | 0098 | 6A5B | 08E0 | 3000 | | |
| 8E | 0000 | 0000 | 0000 | 00D7 | 224B | 08F0 | 1000 | | |
| 8F | 0000 | 0000 | 0000 | 0000 | 004B | 02E0 | 0000 | | |
| 90 | 7802 | DE42 | 4600 | 0000 | 0000 | 0000 | 0000 | ANDK-ANDR-ANDI | |
| 91 | 0000 | 0000 | 0000 | 0000 | 424F | 5C10 | 2000 | | |
| 92 | 7802 | DE42 | 6600 | 0000 | 004F | 70A0 | 0000 | ORK-ORI-ORR | |

TABLE 33-continued

| | AN/UYK-20 Emulation Microcode | | | | | | | | |
|---|---|---|---|---|---|---|---|---|---|
| | Bank Number | | | | | | | Left | Right |
| Addr. | 1 | 2 | 3 | 4 | 5 | 6 | 7 | Entry | Entry |
| 93 | 7807 | FD42 | 0600 | 0000 | 0047 | 70A0 | 0000 | | |
| 94 | 780C | 9C42 | 0600 | 0000 | 004B | 0390 | 0000 | CDR-CDI | RK-SNGL-MATH |
| 9C | 790C | 9E42 | 9C00 | 0000 | 004B | 0440 | 0000 | SUDI-SUDR | RI2-DBL-MATH |
| 9D | 0412 | 4C22 | 9723 | D000 | 0040 | 7AA9 | 0000 | BUTERFLY | |
| 9E | 790A | DE42 | 9C00 | 0000 | 004B | 0350 | 0000 | ADR-ADI | |
| 9F | 0412 | 4C22 | 9F23 | D000 | 0040 | 7AA9 | 0000 | | |
| A0 | 0AE2 | 4C22 | C714 | E000 | 0040 | 78A4 | 0000 | LAD | RL-SNGL-MATH |
| A1 | 710C | 9D42 | 851C | E098 | 0040 | 0A24 | 0000 | | |
| A2 | 0A73 | CF22 | E600 | 2093 | 0047 | 78A0 | 0000 | | |
| A3 | 0412 | 4C22 | 9F23 | D000 | 0040 | 0109 | 0000 | BTFLY | |
| A4 | 0A50 | 0C00 | 0000 | 0000 | 0047 | 48F0 | 0000 | OP-40RK | RK40JMP |
| A5 | 03D0 | 0C00 | 011E | 4080 | 0047 | 35E0 | 0000 | | |
| A6 | 78A2 | 4C22 | 4714 | 0098 | 6A5B | 0A70 | 3000 | SZI | |
| A7 | 78A2 | 7F22 | 3000 | C0DF | 23C0 | 0AED | 1000 | | |
| A8 | 0A12 | 4C22 | C714 | E014 | 0040 | 0A14 | 0000 | LSUD | RL-DBL-MATH |
| AA | 78A3 | FD22 | 6714 | E05F | 0240 | 09E4 | 1000 | STORE | STORE |
| AB | 0352 | 4E22 | 0600 | 0000 | 004B | 0350 | 0000 | | |
| AC | 0AD0 | 0C00 | 0000 | 0000 | 0047 | 48F0 | 0000 | OP-40-RR-JMP | RR40JMP |
| AD | 0350 | 0C00 | 011E | C080 | 0047 | 35EE | 0000 | | |
| AE | 7102 | DD42 | 851C | C000 | 3253 | 0AA6 | 1000 | | |
| AF | 0A73 | CF22 | E600 | 0000 | 0000 | 0000 | 0000 | | |
| B0 | 5283 | FC52 | 0600 | 0080 | 0047 | 0B10 | 0000 | JZ-JXR | RR44-47JMP |
| B1 | 0363 | FC52 | 0600 | 0080 | 0047 | 0360 | 0000 | | |
| B2 | 5213 | FC52 | 0600 | 0000 | 0000 | 0000 | 0000 | JP-JPR | |
| B4 | 5E83 | FC52 | 0600 | 0080 | 0047 | 0B50 | 0000 | JNZ-JNZR | RK44-47JMP |
| B5 | 0360 | FC52 | 0600 | 0080 | 0047 | 03E0 | 0000 | | |
| B6 | 5E13 | FC52 | 0600 | 0000 | 0000 | 0000 | 0000 | JN-JNR | |
| B8 | 7802 | DE42 | 6718 | E000 | 0043 | 78A0 | 0000 | SBR | |
| B9 | 70A3 | FC42 | 6600 | 0000 | C5D0 | F0A0 | D800 | | |
| BA | 7800 | 9E42 | 4718 | 0000 | 0000 | 0000 | 0000 | CBR | |
| BB | 0AB0 | 0C00 | 8746 | C012 | 0047 | 03F6 | 0000 | | |
| BC | 7802 | DC42 | 4718 | 0000 | 004F | 1050 | 0000 | TBR | RX-SPMATH |
| BD | 0000 | 0000 | 0000 | 0057 | 42CB | 0BE0 | 2800 | | |
| BE | 790A | 4D42 | FC00 | 0000 | 004B | 03B0 | 0000 | LDI | |
| BF | 0412 | 4C22 | 9723 | D000 | 0040 | 0359 | 0000 | | |
| C0 | 0C13 | FC22 | FF24 | 0000 | 0000 | 0000 | 0000 | SXI | |
| C1 | 0357 | FD22 | 9E00 | 0000 | 0040 | 0350 | 0000 | | |
| C2 | 0C33 | CD22 | FF4D | E093 | 0040 | 71CD | 0000 | | |
| C3 | 0BB3 | CF22 | F94D | E045 | 0040 | 0BBD | 0000 | | |
| C4 | 39F0 | 0C00 | 9F1E | C000 | 0040 | 010E | 0000 | OP-03 | OP-03 |
| C5 | 7AA0 | 0C00 | 0655 | C000 | 42A0 | 0C65 | C800 | | |
| C6 | 0B92 | 4C42 | 6714 | E000 | A7D0 | 8B9E | 2000 | | |

The Op-Code Transform ROM 36

Referring once again to FIG. 1, op-code transform ROM 36 operates to strip the operand address information and the instruction op-code from each macroinstruction. On the basis of this information, ROM 36 generates two 8-bit addresses, one to each MCU unit. An 8-bit address obtained from the 6-bit op-code followed by the 2-bit "f" field of the UYK-20 macroinstructions is used to address ROM 36. Each address location outputs the following 12-bit address field that is used to generate the 8-bit addresses to the MCUs.

| L | L | L | L | L | C | R | R | R | R | R |
|---|---|---|---|---|---|---|---|---|---|---|
| 7 | 6 | 5 | 4 | 3 | 2 | 1 | 6 | 5 | 4 | 3 | 2 |

The address for the left MCU 32 is comprised of (L7 . . . L1)*2, while the address for the right MCU 34 is comprised of (L7, R6 . . . R2)*4.

The following Table 34 is a listing of the contents of ROM 36 for selected ones of the UYK-20 macroinstructions. While all of the macroinstructions to emulate the entire instruction set for the UYK-20 is not given in Table 34, those given, when taken in conjunction with the microcode contained in micromemory 21 and listed in Table 33, should serve as an illustrative example of how the ROM 36 is programmed.

TABLE 34

| Op | Valu | Instruction | Op | Valu | Instruction |
|---|---|---|---|---|---|
| 15 | 7DF | LXI | 52 | 865 | CK |
| 18 | BAE | CBR | 53 | 86F | C |
| 1C | BCE | TBR | 58 | 0CD | MR |
| 20 | 71C | LRSR | 59 | F43 | MI |
| 22 | 71D | LRS | 5A | CC5 | MK |
| 24 | 73C | ARSR | 5B | CCF | M |
| 25 | AA0 | SI | 60 | 901 | ANDR |
| 26 | 73D | ARS | 61 | 903 | ANDI |
| 28 | 69A | LRDR | 62 | 905 | ANDK |
| | | | 63 | 90F | AND |
| 2A | 698 | LRD | 64 | 921 | ORR |
| 2C | 6BA | ARDR | 65 | 923 | ORI |
| 2E | 6B8 | ARD | 66 | 925 | ORK |
| 30 | 75C | ALSR | 67 | 92F | OR |
| 32 | 75D | ALS | 68 | 8C1 | XORR |
| 34 | 77C | CLSR | 69 | 8C3 | XORI |
| 36 | 77D | CLS | 6A | 8C5 | XORK |
| 38 | 6DA | ALDR | 6B | 8CF | XOR |
| 3A | 6D8 | ALD | 80 | ACB | J4OR |
| 3C | 6FA | CLDR | 94 | 8C5 | JNZR |
| 3D | A60 | SZI | C0 | 61B | LRSL |
| 3E | 6F8 | CLD | C1 | 73B | ARSL |
| 40 | 841 | SUR | C2 | 699 | LRDL |
| 41 | 843 | SUI | C3 | 6B9 | ARDL |
| 42 | 845 | SUK | C4 | 75B | ALSL |
| 43 | 84F | SU | | | |
| 44 | 9C1 | SUDR | C5 | 77B | CLSL |
| 45 | 9C7 | SUDI | C6 | 6D9 | ALDL |

TABLE 34-continued

| Op | Valu | Instruction | Op | Valu | Instruction |
|----|------|-------------|----|------|-------------|
| 48 | 821  | AR          | C7 | 6F9  | CLDL        |
| 49 | 823  | AI          | C8 | 848  | SUL         |
| 4A | 825  | AK          | C9 | A88  | SUDL        |
| 4B | 82F  | A           | CA | 828  | AL          |
| 4C | 9E1  | ADR         | CB | A08  | ADL         |
| 4D | 9E7  | ADI         | CC | 808  | LL          |
| 50 | 861  | CR          | CD | 868  | CL          |
| 51 | 863  | CI          | CE | F08  | LMUL        |

A Macroinstruction Emulation Example

Table 35 illustrates a typical sequence in micromemory addresses and ASU clock signals during the emulation of a particular macroinstruction of the AN/UYK-20 computer. The macromemory address and the contents of the addressed location (the macroinstruction) is illustrated in Table 35 opposite the LM 20 and the RM 24 addresses; the logic levels of the clock signals outputted by each ASU unit (LC, MC, RC); and the ownership of each of the three ASU units, i.e., which MCU, the right R or the left L, has control of the ASU and is specifying the micromemory address.

The following discussion refers to the corresponding number reference identified in Table 35 and identifies the functions which are being performed in those microcycle.

(1) The UYK-20 instruction (fetched previously) is LK R2, '41 'X (load next word into R2). Cleanup from previous instruction is performed. Fetch (read) of next UYK-20 word is initiated. Right MCU in total control.

(2) The current instruction op-code and mode field for LK ($06_{16}$) is passed through op-code transform ROM 36. Each MCU controls his respective side. Middle is controlled by right MCU 34.

(3) Each MCU goes to perform its respective function: the left to perform a "load", the right to perform an $R_k$-mode operand derivation. Neither side is aware of what the other will be doing. However, the right MCU 34 knows that execution of the instruction (whatever it may be) cannot proceed until operand derivation is complete. Therefore, the right MCU 34 forces the left MCU 32 (and entire left side of the machine) to go to sleep, i.e., no LC is generated from ASU 26.

(4) The right MCU 34 checks for possible register indexing. Note that the left ASU's 32 clock does not change (i.e. asleep).

(5) Operand is available. Left side is allowed to awaken and complete load operation (clock change shows up at next instruction).

(6) The left MCU, awake and having completed the load, attempts to return to FETCH (address 10). The right MCU 34 however, realizes that another read of macromemory is necessary since the last read produced data rather than another instruction.

(7) The right MCU takes control of the entire machine to await completion of the read.

(8) The right MCU 34 forces all three parts of the machine back through FETCH to process th new instruction (another "load", but indexed; LK R3, '33' X, R2).

(9) Same as (4), except register indexing is specified. Address 3A adds contents of R2 to operand.

TABLE 35

| | LAD | RAD | LC MC RC | ASU OWNERSHIP L M R | MACRO MEMORY ADDRESS | MACRO MEMORY DATA | COMMENT |
|---|-----|-----|----------|---------------------|----------------------|-------------------|---------|
|   | 010 | 010 | 111 | LLR | 0000 | 0620 | - LK Instruction |
|   | 010 | 010 | 000 | LLR | 0000 | 0620 | Execution Begins |
|   | 011 | 011 | 111 | RRR | 0000 | 0620 | |
| 1.| 011 | 011 | 000 | RRR | 0000 | 0620 | |
| 2.| 206 | 206 | 111 | LRR | 0001 | 0041 | - Fetch of Next Word |
|   | 206 | 206 | 000 | LRR | 0001 | 0041 | |
| 3.| 080 | 094 | 111 | LRR | 0001 | 0041 | |
|   | 080 | 094 | 000 | LRR | 0001 | 0041 | |
| 4.| 080 | 039 | 011 | LRR | 0001 | 0041 | - Not Indexed |
|   | 080 | 039 | 000 | LRR | 0001 | 0041 | |
| 5.| 080 | 03B | 011 | LRR | 0001 | 0041 | - Data Stored in Register |
|   | 080 | 03B | 000 | LRR | 0001 | 0041 | 2 |
| 6.| 010 | 06E | 111 | LRR | 0001 | 0041 | |
|   | 010 | 06E | 000 | LRR | 0001 | 0041 | |
| 7.| 043 | 043 | 111 | RRR | 0002 | 0632 | - Next Instruction Fetched |
|   | 043 | 043 | 000 | RRR | 0002 | 0632 | |
| 8.| 010 | 010 | 111 | RRR | 0002 | 0632 | - LK Instruction |
|   | 010 | 010 | 000 | RRR | 0002 | 0632 | Execution Begins |
|   | 011 | 011 | 111 | RRR | 0002 | 0632 | |
|   | 011 | 011 | 000 | RRR | 0002 | 0632 | |
|   | 206 | 206 | 111 | LRR | 0003 | 0033 | - Fetch of Next Word |
|   | 206 | 206 | 000 | LRR | 0003 | 0033 | |
|   | 080 | 094 | 111 | LRR | 0003 | 0033 | |
|   | 080 | 094 | 000 | LRR | 0003 | 0033 | |
|   | 080 | 039 | 011 | LRR | 0003 | 0033 | - Indexed |
|   | 080 | 039 | 000 | LRR | 0003 | 0033 | |
| 9.| 080 | 03A | 011 | LRR | 0003 | 0033 | - Index Added to Operand |
|   | 080 | 03A | 000 | LRR | 0003 | 0033 | |
|   | 080 | 03B | 011 | LRR | 0003 | 0033 | - Operand Plus Index |
|   | 080 | 03B | 000 | LRR | 0003 | 0033 | Stored in Register 2 |
|   | 010 | 06E | 111 | LRR | 0003 | 0033 | |
|   | 010 | 06E | 000 | LRR | 0003 | 0033 | |
|   | 043 | 043 | 111 | RRR | 0004 | 0523 | |
|   | 043 | 043 | 000 | RRR | 0004 | 0523 | |
|   | 010 | 010 | 111 | RRR | 0004 | 0523 | |

LEGEND
LAD = Left Micromemory Address
RAD = Right Micromemory Address

TABLE 35-continued

```
LC  = Left Clock from Left ASU
MC  = Middle Clock from Middle ASU
RC  = Right Clock from Right ASU
ASU Ownership (L=left, M=middle, R=right) = Microcontroller specifying
                                            address out of ASU (L=left
                                            microcontroller, R=right
                                            microcontroller)
```

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. A microcoded central processing unit (CPU) for emulating the macroinstructions of a target computer by splitting each macroinstruction into operand address derivation and instruction execution phases, the CPU including a main memory for storing the macroinstructions of the target computer, and an address/data bus for coupling the CPU to the main memory, some of the macroinstructions capable of referencing operand address locations, the CPU comprising:

(a) a micromemory having an address space, comprising a plurality of micromemory units including at least a right, a middle, and a left micromemory unit with each memory unit separately addressed and each controlling separate CPU resources, for storing the microcoded instructions;

(b) a first microcontroller associated with said right micromemory unit and responsive to the microcode stored therein, for generating the micromemory address of the next microcoded instruction to be output from said right micromemory unit, said first microcontroller associated with the operand address derivation phase of the macroinstruction;

(c) a second microcontroller associated with said left micromemory unit and responsive to the microcode unit and responsive to the microcode stored therein, for generating the micromemory address of the next microcoded instruction to be output from said left micromemory unit, (i) said second microcontroller being associated with the execution phase of the macroinctruction, the micromemory address generated by either said first or second microcontroller capable of being used to address each said micromemory unit, including the middle micromemory unit whereby each said microcontroller may obtain control of the CPU resources associated with said middle micromemory unit when those resources are needed to perform the operations for its respective phase, and (ii) said right and left controllers capable of operating concurrently and in parallel during the operand address derivation and execution phases of each macroinstruction;

(d) a plurality of address selection units each responsive to the microcode and to the addresses from said microcontrollers, and each addressing an associated one of said plurality of micromemory units, (i) for temporarily storing and outputting to its associated micromemory unit, a micromemory address from a selected one of said microcontroller, and (ii) for generating clocking signals to the CPU resources controlled by the microcode stored in its associated micromemory unit, and (iii) where selected ones of said address selection units are inhibited for a period of time from generating their clocking signals when the microcode from a micromemory unit requests CPU resources controlled by another micromemory unit and those resources are not available for use by the requesting microcode;

(e) an op-code mapping means responsive to the macroinstructions, for mapping each macroinstruction into the micromemory address space at the starting addresses of microcoded routines which will control the operand address derivation and instruction execution phases for each macroinstruction;

(f) a bus interface means responsive to the microcode, for coupling main memory and the peripherals to the CPU; and (g) first and second processing means respectively associated with said first and second microcontrollers and responsive to said bus interface means and to the microcode, each said processing unit including an arithmetic logic unit for performing logical operations on the digital signals of the CPU, whereby the emulation of the macroinstructions is obtained.

2. A microcoded computer emulator for executing instructions of a target computer where the instructions are stored in a memory and each instruction is capable of referencing an operand address location, comprising:

(a) a micromemory including a right, a middle and a left micromemory unit for storing microcode which controls the resource circuits of the emulator, (i) each said micromemory unit controlling separate emulator resources and each responsive to a separate micromemory address, (ii) the emulator executing each instruction by dividing each instruction into an operand address derivation phase and an instruction execution phase, and (iii) where said left micromemory unit is associated with the execution phase and said right micromemory unit is associated with the operand address derivation phase, with said middle micromemory unit providing shared microcode therebetween;

(b) a pair of microcontrollers, one associated with the operand address derivation phase and one associated with the instruction execution phase, and each responsive to said microcode for generating the next micromemory address for each micromemory unit;

(c) a plurality of address selection units each responsive to the microcode and to the micromemory address from said microcontrollers, and each addressing an associated one of said micromemory units, for temporarily storing and outputting to its associated micromemory unit; a micromemory address from either one of said microcontrollers whereby each said microcontroller may obtain control of the emulator resource circuits associated with said middle micromemory unit when those resources are needed to perform the operations for its respective phase;

(d) an op-code mapping means responsive to the instructions, for mapping each instruction into said micromemory at the starting addresses of microcoded routines which will control the operand address derivation and instruction execution phases for each instruction; and (e) a processing means responsive to the microcode for performing the logical operations required in each phase to emulate the instructions of the target computer.

3. The computer emulator of claim 2 wherein each said microcontroller may obtain control of the entire resources of the emulator to the exclusion of the other microcontroller when those resources are required to carry out the operations of its respective phase.

4. The computer emulator of claim 3 wherein each said address selection unit includes means for generating clocking signals to the emulator resource circuits controlled by the associated said micromemory unit, and where each of said address selection units is inhibited from generating its clocking signals when the microcode from its associated micromemory unit requests emulator resources being controlled by another micromemory unit and those resources are not available for use by the requesting microcode, the requesting microcontroller obtaining control when the resources are available.

5. The computer emulator of claims 2 or 4 wherein said microcontrollers operate independently and in parallel during the operand address derivation and instruction execution phases of each macroinstruction.

6. The computer emulator of claim 2 wherein said processing means includes a pair of general processing units, one associated with each said microcontroller and each including an arithmetic logic unit for performing the logical operations upon the digital data signals of the instructions and the digital signals of the emulator.

7. The computer emulator of claim 5 further including a data bus interface means responsive to the microcode for coupling the memory to the resource circuits of the emulator.

* * * * *

UNITED STATES PATENT AND TRADEMARK OFFICE
CERTIFICATE OF CORRECTION

PATENT NO. : 4,370,709                    Page 1 of 2
DATED     : January 25, 1983
INVENTOR(S) : Robert E. Fosdick It is certified that error appears in the above—identified patent and that said Letters Patent are hereby corrected as shown below:

Column 1, between lines 34 and 35, insert the following paragraph:

--The Government has rights in this invention pursuant to Contract No. N00123-78-C-0915 awarded by the United States Department of the Navy.--

Column 2, line 24, delete "deviation" and insert therefor --derivation--.

Column 14, line 43, delete "sero" and insert therefor --zero--.

Column 15, line 38, delete "if" and insert therefor --it--.

Column 19, line 24, delete "if" and insert therefor --is--.

Column 20, line 37, after "function" add --of--.

line 41, delete "on ebit" and insert therefor -- one bit--.

Column 23, line 15, delete "when P1B 78".

Column 32, line 27, delete the first instance of "the sixteen possible operations".

Column 33, line 6, delete "MR7" and insert therefor --MF7--.

UNITED STATES PATENT AND TRADEMARK OFFICE
CERTIFICATE OF CORRECTION

PATENT NO. : 4,370,709

DATED : January 25, 1983

INVENTOR(S) : Robert E. Fosdick

It is certified that error appears in the above-identified patent and that said Letters Patent are hereby corrected as shown below:

Column 34, line 14, insert space between MAO9-0 to read --MAO 9-0--.

Column 35, line 18 delete "Once" and insert therefor --One--.

Column 38, line 34, delete "comman" and insert therefor --command--.

Column 39, line 29 delete "(Di (Dc" and insert therefor --(D1--.

Column 42, line 16 insert after $_3$ and before either--selects--.

Column 43, line 54 delete "hs" and insert therefor --has--.

Column 44, line 67 delete "ruing" and insert therefor --during--.

Column 57, lines 20-21, delete "outputted" and insert therefor --outputed--.

Column 58, line 28, delete "th" and insert therefor --the--.

Signed and Sealed this

Twenty-sixth Day of June 1984

[SEAL]

Attest:

Attesting Officer

GERALD J. MOSSINGHOFF

Commissioner of Patents and Trademarks